(12) United States Patent
Wilson, Jr. et al.

(10) Patent No.: US 12,062,090 B2
(45) Date of Patent: Aug. 13, 2024

(54) BLOCKCHAIN-ENABLED ELECTRONIC FUTURES TRADING SYSTEM WITH OPTIONAL COMPUTERIZED DELIVERY OF CRYPTOCURRENCY

(71) Applicant: Cboe Exchange, Inc., Chicago, IL (US)

(72) Inventors: Donald R. Wilson, Jr., Chicago, IL (US); Joel D. Nordell, Chicago, IL (US); David Z. Werblowsky, New Rochelle, NY (US); Michael A. Riddle, Jr., Palatine, IL (US)

(73) Assignee: Cboe Exchange, Inc., Chicago, IL (US)

( * ) Notice: Subject to any disclaimer, the term of this patent is extended or adjusted under 35 U.S.C. 154(b) by 460 days.

(21) Appl. No.: 16/554,002

(22) Filed: Aug. 28, 2019

(65) Prior Publication Data

US 2020/0074547 A1 Mar. 5, 2020

Related U.S. Application Data

(60) Provisional application No. 62/723,847, filed on Aug. 28, 2018.

(51) Int. Cl.
*G06Q 40/04* (2012.01)
*G06Q 20/02* (2012.01)
(Continued)

(52) U.S. Cl.
CPC ........... *G06Q 40/04* (2013.01); *G06Q 20/023* (2013.01); *G06Q 20/3674* (2013.01);
(Continued)

(58) Field of Classification Search
CPC ...... G06Q 40/04; G06Q 20/42; G06Q 20/023; G06Q 20/3674; G06Q 20/3829;
(Continued)

(56) References Cited

U.S. PATENT DOCUMENTS 7,873,571 B1 1/2011 Wehmer
7,933,821 B1 4/2011 Bent
(Continued)

FOREIGN PATENT DOCUMENTS

CN 107395403 A * 11/2017 ............. G06Q 40/04
WO WO-2016032567 A1 * 3/2016 ........... G06Q 20/065

OTHER PUBLICATIONS

International Search Report, in International Application No. PCT/US2019/048583, dated Oct. 24, 2019.
(Continued)

*Primary Examiner* — Neha Patel
*Assistant Examiner* — Chunling Ding
(74) *Attorney, Agent, or Firm* — Fish & Richardson P.C.

(57) ABSTRACT

A blockchain enabled electronic futures trading system and method provided which allows for optional computerized delivery of cryptocurrency. A trade determination system allows a buyer and seller computer system to trade a future on a cryptocurrency such as bitcoin. Additionally, the trade determination system communicates with a central clearing computer system that allows the seller to provide, using the block chain, an amount of bitcoin equal to or greater than the underlying future by transferring the bitcoin from a seller bitcoin wallet associated with the seller computer system to a central clearing bitcoin wallet associated with the central clearing computer system. Upon the expiration date of the future, the seller may optionally select to provide to the buyer the bitcoin that was previously transferred to the central clearing bitcoin wallet instead of fiat currency.

20 Claims, 55 Drawing Sheets

(51) Int. Cl.
  *G06Q 20/36* (2012.01)
  *G06Q 20/38* (2012.01)
  *G06Q 20/42* (2012.01)
  *H04L 9/06* (2006.01)
(52) U.S. Cl.
  CPC ......... *G06Q 20/3829* (2013.01); *G06Q 20/42* (2013.01); *H04L 9/0637* (2013.01); *G06Q 2220/00* (2013.01); *H04L 2209/56* (2013.01)
(58) Field of Classification Search
  CPC ........... G06Q 2220/00; G06Q 20/0655; G06Q 20/381; G06Q 20/389; H04L 9/0637; H04L 2209/56; H04L 9/3247; H04L 2209/38; H04L 9/3239; H04L 9/50
  See application file for complete search history.

(56) References Cited

U.S. PATENT DOCUMENTS

| | | | |
|---|---|---|---|
| 8,290,860 | B1 | 10/2012 | Bent |
| 8,566,200 | B1 | 10/2013 | Bent |
| 9,892,460 | B1 | 2/2018 | Winklevoss et al. |
| 9,898,730 | B2 | 2/2018 | Flitcroft et al. |
| 10,217,102 | B2 | 2/2019 | Pitroda |
| 10,229,396 | B2* | 3/2019 | Shtylman ............. G06Q 20/381 |
| 10,373,158 | B1 | 8/2019 | James et al. |
| 10,387,957 | B2 | 8/2019 | Haines et al. |
| 10,423,961 | B1 | 9/2019 | El Defrawy et al. |
| 10,540,654 | B1 | 1/2020 | James et al. |
| 10,915,895 | B1 | 2/2021 | Fogg |
| 10,924,489 | B2 | 2/2021 | Xu et al. |
| 10,929,842 | B1 | 2/2021 | Arvanaghi et al. |
| 10,929,931 | B1 | 2/2021 | Bryant |
| 11,087,313 | B1 | 8/2021 | Winklevoss et al. |
| 11,200,568 | B2 | 12/2021 | Baratam |
| 11,200,569 | B1 | 12/2021 | James et al. |
| 11,455,642 | B1 | 9/2022 | Jameson et al. |
| 11,769,154 | B1 | 9/2023 | Cash et al. |
| 11,836,717 | B2 | 12/2023 | Madisetti et al. |
| 2012/0265666 | A1* | 10/2012 | Hirani .................... G06Q 40/04 705/37 |
| 2013/0013483 | A1* | 1/2013 | Dale ....................... G06Q 40/04 705/37 |
| 2014/0258073 | A1* | 9/2014 | Hunn ...................... G06Q 40/04 705/37 |
| 2015/0170112 | A1 | 6/2015 | Decastro |
| 2015/0206108 | A1* | 7/2015 | Taylor ..................... G06Q 20/384 705/39 |
| 2015/0262139 | A1* | 9/2015 | Shtylman ............. G06Q 20/386 705/37 |
| 2015/0262176 | A1* | 9/2015 | Langschaedel .... G06Q 20/3678 705/44 |
| 2016/0117669 | A1 | 4/2016 | Pitroda et al. |
| 2016/0140653 | A1 | 5/2016 | McKenzie |
| 2016/0180338 | A1 | 6/2016 | Androulaki et al. |
| 2016/0226812 | A1* | 8/2016 | Attolini .................. G06Q 50/01 |
| 2016/0292672 | A1* | 10/2016 | Fay ......................... G06Q 20/06 |
| 2016/0342989 | A1* | 11/2016 | Davis ........................ H04L 9/50 |
| 2016/0371771 | A1 | 12/2016 | Serrano et al. |
| 2017/0005804 | A1 | 1/2017 | Zinder |
| 2017/0011460 | A1 | 1/2017 | Molinari et al. |
| 2017/0046638 | A1 | 2/2017 | Chan et al. |
| 2017/0061396 | A1* | 3/2017 | Melika ................ G06Q 20/3829 |
| 2017/0124647 | A1* | 5/2017 | Pierce .................... G06Q 40/04 |
| 2017/0132630 | A1 | 5/2017 | Castinado et al. |
| 2017/0154331 | A1 | 6/2017 | Voorhees |
| 2017/0228705 | A1* | 8/2017 | Sandor .................... H04L 63/10 |
| 2017/0228731 | A1* | 8/2017 | Sheng .................... G06Q 20/36 |
| 2017/0230189 | A1 | 8/2017 | Toll et al. |
| 2017/0232300 | A1 | 8/2017 | Tran et al. |
| 2017/0293898 | A1 | 10/2017 | Rampton |
| 2017/0300978 | A1 | 10/2017 | Narasimhan et al. |
| 2018/0006831 | A1* | 1/2018 | Toll ....................... G06F 21/602 |
| 2018/0068359 | A1 | 3/2018 | Preston |
| 2018/0176202 | A1* | 6/2018 | Ro ........................ H04L 63/067 |
| 2019/0066065 | A1 | 2/2019 | Wright et al. |
| 2019/0130463 | A1* | 5/2019 | Bolla .................. G06Q 30/0607 |
| 2019/0156313 | A1* | 5/2019 | Persaud ............. G06Q 20/2295 |
| 2019/0180273 | A1* | 6/2019 | Cummings ............ G06Q 20/02 |
| 2019/0188657 | A1* | 6/2019 | Arora ............... G06Q 20/38215 |
| 2019/0325407 | A1 | 10/2019 | Zhou et al. |
| 2019/0333051 | A1* | 10/2019 | Brogger ................ H04L 9/3239 |
| 2019/0385166 | A1* | 12/2019 | Daetz .................... G06F 16/951 |
| 2020/0013055 | A1* | 1/2020 | Sandor ............... G06Q 20/0658 |
| 2020/0134656 | A1 | 4/2020 | Padmanabhan |
| 2021/0133722 | A1* | 5/2021 | Hoffman .............. G06Q 20/227 |
| 2021/0272203 | A1* | 9/2021 | Co ........................ G06Q 20/023 |
| 2022/0172195 | A1 | 6/2022 | Wilson, Jr. |

OTHER PUBLICATIONS

Written Opinion of the International Searching Authority, in International Application No. PCT/US2019/048583, dated Oct. 24, 2019.
International Search Report, in International Application No. PCT/US2020/035610, dated Sep. 1, 2020.
Written Opinion of the Searching Authority, in International Application No. PCT/US2020/035610, dated Sep. 1, 2020.
bitcoin.it [online], "Proof of Work," available on or before May 22, 2019, via Internet Archive: Wayback Machine URL <http://web.archive.org/web/20190522022121/https://en.bitcoin.it/wiki/Proof of work>, retrieved on Mar. 17, 2203, URL<https://en.bitcoin.it/wiki/Proof_of_work>, 2 pages.
Cieplak et al., "Smart Contracts: A Smart Way to Automate Performance," 1 Geo. I. Tech. Rev. 417, 2017, 11 pages.
Ethereum.org [online], "Welcome to Ethereum," available on or before May 30, 2019, retrieved on Mar. 16, 2023, retrieved from URL <http://ethdocs.org/en/latest/contracts-and-transactions/accessing-contracts-andtransactions.html>, 15 pages.
Europa.eu [online], "The ECB's monetary policy: past and present—Speech by Peter Praet, Member of the Executive Board of the ECB, at the Febelfin Connect event, Brussels/Londerzeel, Mar. 16, 2017," Mar. 2017, retrieved on Mar. 16, 2023, retrieved from URL <https://www.ecb.europa.eu/press/key/date/2017/html/sp170316.en.html>, 8 pages.
European Extended Search Report in European Application No. 20814353.7, mailed on Jan. 2, 2023, 7 pages.
Gemini.com [online], "Gemini Dollar," available on or before May 20, 2019, via Internet Archive: Wayback Machine URL <http://web.archive.org/web/20190520230728/https://gemini.com/dollar/>, retrieved on Mar. 16, 2023, URL <https://gemini.com/dollar/#reports>, 8 pages.
Github.com [online], "Centre Fiat Token," available on or before Dec. 26, 2018, via Internet Archive: Wayback Machine URL <http://web.archive.org/web/20181226151807/https://github.com/centrehq/centre-tokens/blob/master/doc/tokendesign.md>, retrieved on Mar. 17, 2023, URL <https://github.com/centrehq/centre-tokens/blob/master/doc/tokendesign.md>, 6 pages.
Github.com [online], "eip-20.md," Nov. 19, 2015, retrieved on Mar. 16, 2023, retrieved from URL <https://github.com/ethereum/EIPs/blob/master/EIPS/eip-20.md>, 5 pages.
github.com [online], "Eip-721.md," Jan. 24, 2018, retrieved on Mar. 16, 2023, retrieved from URL <https://github.com/ethereum/EIPs/blob/master/EIPS/eip-721.md>, 15 pages.
Github.com [online], "Ethereum—Solidity," available on or before May 28, 2019, via Internet Archive: Wayback Machine URL <https://github.com/ethereum/solidity>, 3 pages.
Github.com [online], "Ethereum Development Tutorials," available on or before Aug. 27, 2018, via Internet Archive: Wayback Machine URL <http://web.archive.org/web/20180827133941/https://github.com/ethereum/wiki/wiki/Ethereum-Development-Tutorial>, retrieved on Mar. 16, 2023, URL <https://github.com/ethereum/wiki/wiki/Ethereum-Development-Tutorial>, 14 pages.
Github.com [online], "Ethereum Virtual Machine (EVM) Awesome List," available on or before Apr. 3, 2019, via Internet Archive: Wayback Machine URL <http://web.archive.org/web/20190403171951/https://github.com/ethereum/wiki/wiki/Ethereum-Virtual-Machine-(EVM)-Awesome-List>, retrieved on Mar. 17, 2023, URL <https://

(56) References Cited

OTHER PUBLICATIONS ethereum.org/en/developers/docs/evm/>, including new location URL <https://ethereum.org/en/developers/docs/evm/>, 12 pages.

Github.com [online], "Proof of Stake FAQ," available on or before May 28, 2019, via Internet Archive: Wayback Machine URL <http://web.archive.org/web/20190528141656/https://github.com/ethereum/wiki/wiki/Proof-of-Stake-FAQ>, retrieved on Mar. 17, 2023, URL <https://github.com/ethereum/wiki/wiki/Proof-of-Stake-FAQ>, including new location URL <https://ethereum.org/en/developers/docs/consensus-mechanisms/pos/>, 16 pages.

International Preliminary Report on Patentability in International Application No. 3, mailed on Mar. 2, 2021, 4 pages.

International Preliminary Report on Patentability in International Application No. PCT/US2020/035610, mailed on Dec. 9, 2021, 6 pages.

mas.gov.sg [online], " MAS working with industry to apply Distributed Ledger Technology in securities settlement and cross border payments," Mar. 9, 2017, retrieved on Mar. 17, 2023, retrieved from URL <https://www.mas.gov.sg/news/media-releases/2017/mas-working-with-industry-to-apply-distributed-ledger-technology>, 2 pages.

masterthecrypto.com [online], "Guide to Consensus Algorithms: What is the Consensus Mechanism?," available on or before May 30, 2019, retrieved on Mar. 17, 2023, retrieved from URL <https://masterthecrypto.com/guide-to-consensus-algorithms-what-is-consensus-mechanism/>, 8 pages.

TrustToken.com [online], "TrustToken on TrueFi," available on or before May 30, 2019, retrieved on Mar. 16, 2023, retrieved from URL <https://blog.trusttoken.com/june302019-db0ea4de7022>, 7 pages.

\* cited by examiner

Position held to maturity (seller delivers cryptocurrency):

Position held to maturity (seller does not deliver):

Position traded in / out:

Cryptocurrency (e.g. BTC) Withdrawal Process Flowchart

Continued from above — 1260

| Notification Data |
|---|
| asset_type |
| amount |
| fees |
| address |
| num_blocks |

Central Clearing Bitcoin Wallet counts the number of blocks in the blockchain following the new transaction.

Central Clearing Bitcoin Wallet sends a Notification (n) to the Central Clearing System notifying of the new transaction, including the amount, destination address, fees paid, and number of blocks mined following the transaction.

1262

| Field Name | Value |
|---|---|
| journal_id | new UUID |
| business_date | current date |
| time | current time |
| observed_at | current time |
| description | e.g., "WITHDRAW {amount} {asset_type}" |
| account_id | r.account_id |
| asset_type | currency type being withdrawn, e.g. 'BTC' |
| amount | r.amount |
| fee_amount | n.fees |

Central Clearing System generates a WithdrawalJournal (j) and saves it in the Ledger Transaction Database.

1264

| Field Name | Value |
|---|---|
| posting_id | new UUID |
| journal_id | j.journal_id |
| account_id | j.account_id (CustomerAccount) |
| asset_type | j.asset_type |
| amount | j.amount*-1 |

| Field Name | Value |
|---|---|
| posting_id | new UUID |
| journal_id | j.journal_id |
| account_id | w.account_id (WalletAccount) |
| asset_type | j.asset_type |
| amount | j.amount |

Central Clearing System generates SimplePostings to record the withdrawal and saves them in the Ledger Transaction Database.

1268

| Field Name | Value |
|---|---|
| posting_id | new UUID |
| journal_id | j.journal_id |
| account_id | CLEARINF_FEE_ACCOUNT |
| asset_type | j.asset_type |
| amount | j.fee_amount*-1 |

| Field Name | Value |
|---|---|
| posting_id | new UUID |
| journal_id | j.journal_id |
| account_id | w.account_id (WalletAccount) |
| asset_type | j.asset_type |
| amount | j.fee_amount |

Central Clearing System generates SimplePostings to record the fees paid and saves them in the Ledger Transaction Database.

FIG. 12D    1270

Contract Specifications:

| | Bitcoin | Bitcoin Cash | Ethereum | Litecoin |
|---|---|---|---|---|
| Base Currency | Bitcoin | Bitcoin Cash | Ethereum | Litecoin |
| Symbol | BTC | BCH | ETH | LTC |
| | CBTC-[Cap] | CBCH-[Cap] | CETH-[Cap] | CLTH-[Cap] |
| Quote Currency | USD | | | |
| Quote Convention | 1 Coin | | | |
| Cap Price | Cap level set at the time of issue | | | |
| Cap Price Rounding | $ 1,000 | $ 100 | $ 100 | $ 50 |
| Collateral Withheld | Buyer: No. of Contracts * Contract Size * (Trade Price - 0) | | | |
| | Seller: No. of Contracts * Contract Size * (Cap Price - Trade Price) | | | |

BLOCKCHAIN-ENABLED ELECTRONIC FUTURES TRADING SYSTEM WITH OPTIONAL COMPUTERIZED DELIVERY OF CRYPTOCURRENCY

CROSS-REFERENCE TO RELATED APPLICATIONS

The present application claims the benefit of U.S. Provisional Application No. 62/723,847, filed Aug. 28, 2018, entitled "BLOCKCHAIN-ENABLED ELECTRONIC FUTURES TRADING SYSTEM WITH OPTIONAL COMPUTERIZED DELIVERY OF CRYPTOCURRENCY", which is hereby incorporated by reference in its entirety.

BACKGROUND OF THE INVENTION

The present invention generally relates to a cryptocurrency futures trading system. More particularly, the present invention relates to a futures trading system allowing a seller of a future to transfer cryptocurrency to the system using the blockchain, wherein said cryptocurrency may optionally be transferred to a buyer using the blockchain at the expiration of the future.

BRIEF SUMMARY OF THE INVENTION

One or more of the embodiments of the present invention provide a blockchain enabled electronic futures trading system and method provided which allows for optional computerized delivery of cryptocurrency. A trade determination system allows a buyer and seller computer system to trade a future on a cryptocurrency such as bitcoin. Additionally, the trade determination system communicates with a central clearing computer system that allows the seller to provide, using the block chain, an amount of bitcoin equal to or greater than the underlying future by transferring the bitcoin from a seller bitcoin wallet associated with the seller computer system to a central clearing bitcoin wallet associated with the central clearing computer system. Upon the expiration date of the future, the seller may optionally select to provide to the buyer the bitcoin that was previously transferred to the central clearing bitcoin wallet instead of fiat currency.

BRIEF DESCRIPTION OF THE DRAWINGS

FIGS. 12A, 12B, 12C, and 12D illustrates a Cryptocurrency Withdrawal Process Flowchart for withdrawing cryptocurrency (e.g. BTC) from the clearing system according to embodiments of the present invention.

FIG. 19 illustrates exemplary futures contract specifications for trading in the present trading system according to one or more embodiments of the present invention.

DETAILED DESCRIPTION OF THE INVENTION

Figure 1:
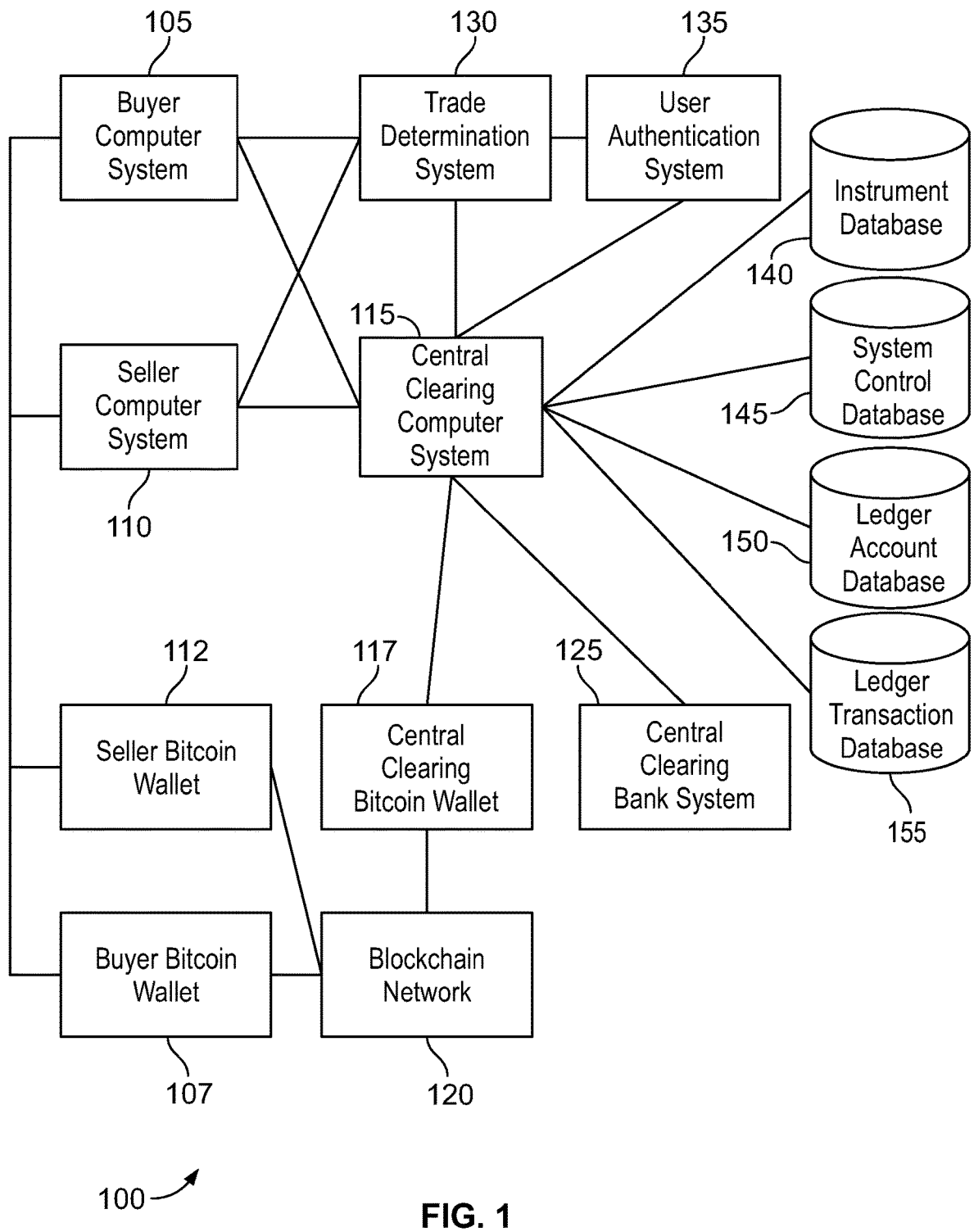
FIG. 1 illustrates a blockchain-enabled electronic futures trading system with optional computerized delivery of cryptocurrency according to one or more embodiments of the present invention.

FIG. 1 illustrates a blockchain-enabled electronic futures trading system 100 with optional computerized delivery of cryptocurrency according to one or more embodiments of the present invention. The blockchain-enabled electronic futures trading system 100 includes a Buyer Computer System 105 and an associated Buyer Bitcoin Wallet 107, Seller Computer System 110 and an associated Seller Bitcoin Wallet 112, a Central Clearing Computer System 115 and an associated Central Clearing Bitcoin Wallet 117, a Central Clearing Bank System 125, a Trade Determination System 130, a User Authentication System 135, an Instrument Database 140, a System Control Database 145, a Ledger Account Database 150, and a Ledger Transaction Database 155. Individual components of the blockchain-enabled electronic futures trading system 100 are discussed below and further discussed in the following flowcharts detailing embodiments of the operation of the blockchain-enabled electronic futures trading system 100.

In operation, the Buyer Computer System 105 and Seller Computer System 110s may be any type of computer system capable of exchanging information with the central clearing system. Additionally, the Buyer Computer System 105 and Seller Computer System 110s are designated as "buyer" and "Seller" for convenience of explanation herein. In practice, both the Buyer Computer System 105 and Seller Computer System 110 can place trades representing buying and selling futures on a wide variety of instruments and positions available for trading through the Central Clearing Computer System 115. Additionally, it is envisioned that a large number of user/trader computers will be initiating one or more purchase or sale trades through the present system.

The Seller Bitcoin Wallet 112, Buyer Bitcoin Wallet 107, and Central Clearing Bitcoin Wallet generally function as standard bitcoin wallets, with some exceptions and alternatives noted herein. All are able to interact with the blockchain network, which is the Bitcoin BTC blockchain in one embodiment herein.

More specifically, the Central Clearing Bitcoin Wallet 117 is a bitcoin wallet software application that adheres to the BIP32 bitcoin protocol standard. It is responsible for interfacing with the blockchain, both for inbound and outbound transactions. Functions provided by the Central Clearing Bitcoin Wallet 117, used by the Central Clearing Computer System 115, include:

1. Send transaction: Given a destination address and amount, the Central Clearing Bitcoin Wallet 117 produces a transaction, signs it, and publishes it to the Bitcoin blockchain as further described herein.

2. Create address: Using the BIP32 standard, one Bitcoin wallet can produce a virtually unlimited number of derived addresses. Given the Central Clearing Bitcoin Wallet 117 master public/private keypair and an index number, the Central Clearing Bitcoin Wallet 117 uses the process described in BIP32 to produce a derived address. The Central Clearing Bitcoin Wallet 117 software keeps track of the last index used, for example by storing it in memory. Each time this function is called, the Central Clearing Bitcoin Wallet 117 software increments the index and returns the resulting next derived address in the sequence.

3. Transaction notification: The Central Clearing Bitcoin Wallet 117 scans the blockchain network for new transactions. When a transaction is detected that has one of the Central Clearing Bitcoin Wallet 117 addresses as either a sending address or receiving address, the Central Clearing Bitcoin Wallet 117 software sends a notification to the Central Clearing Computer System 115. The notification includes the blockchain transaction ID and details of the transaction including amount, blockchain depth (number of blocks following this transaction in the chain), sending addresses, and receiving addresses. The Central Clearing Bitcoin Wallet 117 may optionally be configured to send multiple notifications for the same transaction, as more blocks are mined, to indicate the new transaction blockchain depth.

Although the Central Clearing Bitcoin Wallet 117 is described herein as using bitcoin in a first embodiment, in other embodiments, wallets for other cryptocurrencies may be employed to deliver the functionality described herein. For example, Ethereum, may alternatively be employed.

In one embodiment, a single Central Clearing Bitcoin Wallet 117 may be used for both deposits and withdrawals. In an alternate embodiment, the functionality of the single wallet may be segmented into multiple wallets. In one example, a first wallet may be used for receiving deposits and a second wallet may be used for sending withdrawals. In another example, a first wallet may be used for receiving deposits, a second wallet may be used for sending withdrawals, and a third wallet may be used to store deposits after receipt. In one embodiment, the third wallet may be kept offline to increase the security of the storage of the bitcoin contained therein.

The Central Clearing Bank System 125 is a computerized electronic system provided by the clearing organization's custodial bank. It provides an electronic interface for the Central Clearing Computer System 115 to initiate outbound transactions and receive account transaction reports.

User Authentication System 135 serves to authenticate the Buyer and Seller Computer System 110s before they are allowed to interact with the Central Clearing Computer System 115 and/or Trade Determination System 130. In one embodiment, the Authentication System may employ passwords and/or secondary levels of authentication such as tokens or multi-factor authentication such as transmitting a temporary access code to an e-mail or mobile device.

The Trade Determination System 130 receives proposed trades from the buyer and Seller Computer System 110 and operates with the Central Clearing Computer System 115 to match buyers and sellers and execute their trades.

The Central Clearing Computer System 115 is the central processing hub of much of the functionality of the present system and interacts with the Instrument Database 140, System Control Database 145, Ledger Account Database 150, Ledger Transaction Database 155, and other elements of the present system as described below.

Interaction between the Buyer and Seller Computer Systems to the Trade Determination System and/or the Central Clearing Computer System may be achieved in multiple ways, including by the use of a Graphical User Interface (GUI), or by an Application Programming Interface (API).

Turning now to the Data Structures, one embodiment described herein includes clearing accounts. In one embodiment Buyers and Sellers are each represented within the system as one Clearing Account. Multiple accounts, each acting as different Buyers or Sellers, may be owned by the same legal entity. In another embodiment, buyers and sellers each have one Clearing Account and the Clearing Account ID is used to identify the Buyer or Seller to the Trade Determination System 130 and the Central Clearing System. In an alternate embodiment, different identifiers may be used for Buyers and Sellers in the Trade Determination System 130 and Central Clearing System. In such an embodiment, a database for storing and correlating the identifiers is provided, along with additional entities such as Firm to group them together.

In addition, in one embodiment the Trade Determination System 130 and/or Central Clearing System require user authentication. In one embodiment, the Clearing Account ID is used as a user identifier, along with a password. The process of authenticating and authorizing IDs and passwords is performed by an authentication system that performs in accordance with standard computerized authentication system.

In an alternate embodiment, different user identifiers are employed, such as username or email address, and/or different methods for authorizing a user session are employed including host-based authentication, key-based challenge/response mechanisms, one-time passwords, or other techniques.

The System Control Database 145 contains configuration parameters that the Clearing System uses to set certain thresholds, designate certain accounts for certain functions, and other purposes as further described below. When a process refers to retrieving information from configuration parameters, that means the system retrieves a configuration parameter from the System Control Database 145.

Table 1 illustrates one embodiment of the parameter names and descriptions stored in the System Control Database 145.

TABLE 1

| Parameter Name | Type | Description |
| --- | --- | --- |
| bank_account_number | String | The account number, as defined by the custodial bank, of the account owned by the clearing organization. |
| wallet_id | String | The identifier, as defined by the Central Clearing Bitcoin Wallet 117, of the wallet used for withdrawing cryptocurrency assets. |
| CLEARING_RESERVE_ACCOUNT | String | The account ID, internal to the central clearing system, of the ledger account designated to hold reserve assets (collateral and coins reserved for delivery). |
| CLEARING_BANK_ACCOUNT_ID | String | The account ID, internal to the central clearing system, of the ledger account that maps to the custodial bank account. |
| CLEARING_WALLET_ACCOUNT_ID | String | The account ID, internal to the central clearing system, of the ledger account that maps to the Central Clearing Bitcoin Wallet 117 used for depositingcryptocurrency assets. |
| delivery_notify_time | Date/Time | In one embodiment, this is the time that Sellers are notified about expiring instruments, prior to final delivery, in order to ensure they have a chance to deliver if desired. In an alternative embodiment, there may not be any notification, and this parameter may not be used. In a further embodiment, this may be the same as the market close time, or another designated time. |
| delivery_window_duration | Duration | Amount of time after delivery_notify_time on maturity date of an instrument that the Final Delivery Process is run. In one embodiment, this represents the period of time during which Sellers may choose to deliver coins. |

In another embodiment, there may be an additional parameter named "delivery_time" representing the time that the final delivery process begins, as a separate time from the "delivery_window_durarion" which may determine the deadline for Sellers to indicate their delivery preference.

The Instrument Database 140 stores data regarding the capped futures contracts that are traded in the Trade Determination System 130. In one embodiment, the Central Clearing system is the authority for these instruments, which are administratively defined. In another embodiment, the Trade Determination System is the authority for these instruments, which are administratively defined, and are transmitted to the Central Clearing System.

In one embodiment, an administrator creates and causes to be stored the Instrument records within the Central Clearing System, including defining attributes such as symbol, base_type, quote_type, maturity_date, cap_px, and multiplier. In another embodiment, an administrator creates Instrument records within the Trade Determination System, and the Trade Determination System transmits the Instrument data structure to the Central Clearing System where it is stored. In yet another embodiment, the Instruments may be generated by the Trade Determination System according to a schedule, and the cap price (cap_px) may be determined by: retrieving historical market data (either from the Trade Determination System itself or from an external database), evaluating historical volatility of the underlying digital asset (BTC), and choosing a cap_px which is a multiple such as 2 or 3 standard deviations higher than the last traded price.

Before market open, the Clearing system sends this data to the Trade Determination System 130 to define which markets are available for trading. Alternatively, the "instrument" in "Instrument Database 140" may be thought of as "contract" or "product".

Table 2 illustrates one embodiment of the field names, field types, and descriptions for each of the plurality of instruments that are stored in the Instrument Database 140.

TABLE 2

Instrument Data Structure

| Field Name | Field Type | Description |
| --- | --- | --- |
| symbol | String | Unique identifier for this instrument. |
| base_type | String | Identifier for the base currency type, e.g. "BTC" |
| quote_type | String | Identifier for the quoted (price) currency type, e.g. "USD" |
| maturity_date | Date | Expiration date for this contract |
| cap_px | Decimal | Cap price (in terms of quote_type) |
| multiplier | Decimal | Contract multiplier - number of units of base currency, e.g. "BTC", which is represented by one contract qty. (e.g. a value of 0.1 here means one contract = 0.1 BTC) |

Figure 2:
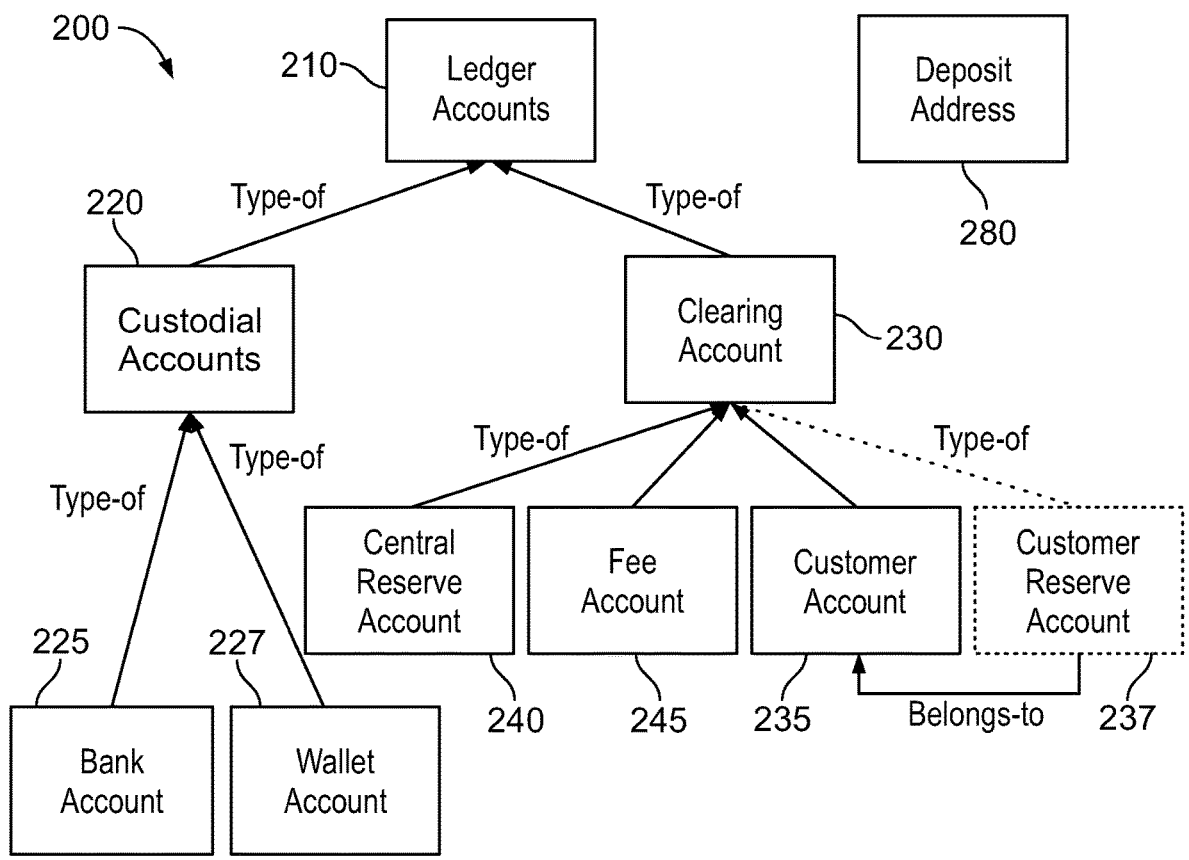
FIG. 2 illustrates a diagram of the data structures contained in the Ledger Account Database 150 and their relational data elements.

FIG. 2 illustrates a diagram of the data structures 200 contained in the Ledger Account Database 150 and their relational data elements. The Ledger Account Database 150 includes two collections of data: LedgerAccounts 210 and DepositAddresses 280. A LedgerAccount 210 is an account used in the Central Clearing system that designates balances of assets and open positions. There are two main types of LedgerAccount 210: CustodialAccount 220 and ClearingAccount 230.

CustodialAccounts map directly to real-world accounts owned by the Clearing Organization, for example bank accounts 225 and blockchain wallets 227. For example, CustodialAccounts may be the digital representation of the real-world accounts within the clearing computer system. Custodial Accounts may contain negative balances which offset the balances of their associated real-world accounts. For example, it is anticipated that both Buyers and Sellers will have bank accounts and/or accounts with other financial institutions outside of the current system—and the identity of such an external account is represented in the current system as a Custodial Account. When all CustodialAccount balances are aggregated together, the total at all times should offset the aggregated positive balances of all ClearingAccounts.

ClearingAccounts designate ownership of assets and positions. Orders are placed into the Trade Determination System 130 within the context of one CustomerAccount 235. For example, in one embodiment, orders are placed into the Trade Determination System by a Buyer or Seller computer system that has authenticated its customer account to the Trade Determination System. Individual Buyers and Sellers each have their own CustomerAccount. In a different embodiment, there may be multiple CustomerAccounts for each Buyer or Seller CentralReserveAccount 240 and FeeAccount 245 are used by the Central Clearing Computer System 115. They are identified by CLEARING_RESERVE_ACCOUNT and CLEARING_FEE_ACCOUNT respectively CustomerAccounts are used by Buyer and Seller Computer System 110s.

In another embodiment, a CustomerAccount may be associated with a Customer Reserve Account 237. The Customer Reserve Account 237 is associated with a CustomerAccount and represents the balance of collateral held in reserve for that customer.

Table 3 illustrates one embodiment of the field names, field types, and descriptions for the ledger account data structure.

TABLE 3

| Field Name | Field Type | Description |
| --- | --- | --- |
| LedgerAccount Data Structure | | |
| account_id | LedgerAccount ID | Unique identifier for the Ledger Account |
| label | String | Human-friendly label (used for display) |
| external_account_id | String | [used for Custodial Accounts (Bank and Wallet))] External account identifier defined by provider of external Wallet or Bank account, e.g. bank account number or blockchain wallet ID. |
| deposit_addresses | List of DepositAddress | [used for CustomerAccount] Unique addresses associated with this account for making deposits (one for each asset type) |
| contact_info | Contact Information: email, phone, etc. | [used for CustomerAccount] Contact information for the customer who owns this account |
| DepositAddress Data Structure | | |
| asset_type | String | Asset type for this deposit address, e.g. 'BTC' or 'USD' |
| account_id | LedgerAccount ID | ID of the Ledger Account associated with this deposit address (should be a Customer Account) |
| instrument_id | Instrument ID | Alternate Embodiment: in one embodiment, DepositAddresses may be associated with an account AND instrument, and used to indicate a combined deposit & reserve process. In that embodiment, the associated instrument ID is recorded here, and the presence of a value in this field indicates this DepositAddress record is used for the combined deposit & reserve process. The absence of a value in this field indicates this DepositAddress record is used for depositing, but not for reserving for delivery. |
| address | String | Blockchain address or Wire transfer identifier (format is dependent on specific asset type) |

Figure 3:
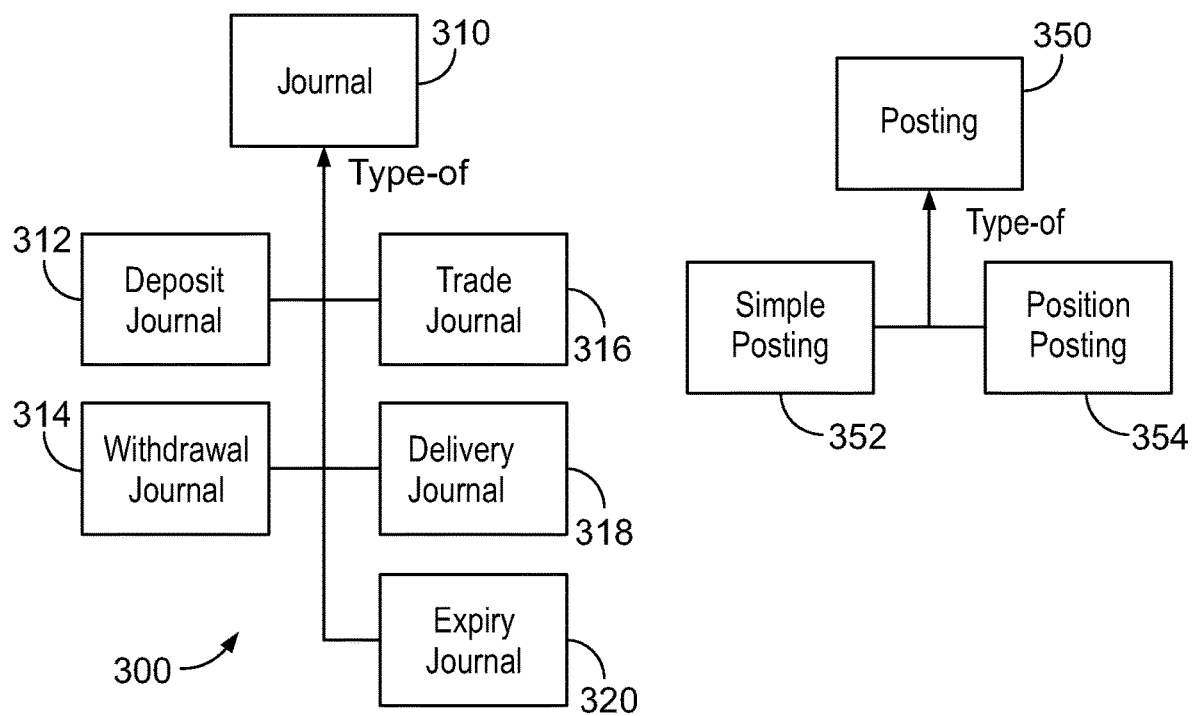
FIG. 3 illustrates a diagram of the data structures contained in the Ledger Transaction Database 155 and their relational data elements.

FIG. 3 illustrates a diagram of the data structures 300 contained in the Ledger Transaction Database 155 and their relational data elements. The Ledger Transaction Database 155 includes two data collections: Journals 310 and Postings 350. Within the Journals 310 collection, several different types of Journals may be included, such as: Deposit Journal 312, Withdrawal Journal 314, Trade Journal 316, Delivery Journal 318, and Expiry Journal 320. Within the Postings 350 data collection, Simple Postings 352 and Position Postings 354 may be included. The data contents of the Journals 312-320 are further described in Table 4 below.

TABLE 4

Journal Data Structure

| Field Name | Field Type | Description |
| --- | --- | --- |
| journal_id | Journal ID | Unique identifier (UUID) for the Journal |
| business_date | Date | Business date this Journal should apply to |
| time | Time | Original time of the event (e.g. trade time for TradeJournal) |
| observed_at | Time | Timestamp when the system observed the event |
| description | String | Human-readable event description |
| account_id | LedgerAccount ID | Used in Deposit, Withdrawal, Delivery, and Expiry Journals |
| asset_type | String | Used in Deposit or Withdrawal Journals |
| amount | Decimal | Used in Deposit or Withdrawal Journals |
| buyer_account_id | LedgerAccount ID | Used in Trade Journals |
| seller_account_id | LedgerAccount ID | Used in Trade Journals |
| instrument_id | Instrument ID | Used in Trade, Delivery, and Expiry Journals |
| px | Decimal | Used in Trade Journals |
| qty | Decimal | Used in Trade Journals |
| position_id | Position ID | Used in Delivery and Expiry Journals |
| deliver_qty | Decimal | Used in Delivery and Expiry Journals |

The data contents of Postings are further described in Table 5 below. Simple Postings may only use the first set of fields, and Position Postings may use all the fields.

TABLE 5

Posting Data Structure

| Field Name | Field Type | Description |
| --- | --- | --- |
| posting_id | Posting ID | Unique identifier (UUID) for the Posting |
| journal_id | Journal ID | Associated Journal ID |
| account_id | Clearing Account ID | Associated ClearingAccount |
| asset_type | String | Asset type identifier (can be a currency code such as 'BTC', 'USD', or can be an Instrument ID such as 'BTCUSD') |
| amount | Decimal | Amount of asset_type to credit/debit from associated account |
| creates | Position | (optional; used in Position Posting) Single new Position that this posting opens |
| closes | List of Position ID, Decimal | (optional; used in Position Posting) List of Positions and quantities that this posting closes or partially closes. Negative qty closes a long position, and positive qty closes a short position. |
| delivers | List of Position ID, Decimal | (optional; used in Position Posting) List of Positions and quantities for which this posting indicates full or partial physical delivery. Quantity is always positive. |

The data contents of the Position Data Structure, which represents an aggregation of Position Postings, are further described in Table 6 below.

TABLE 6

Position Data Structure

| Field Name | Field Type | Description |
| --- | --- | --- |
| position_id | Position ID | Unique identifier (UUID) for the Position record |
| account_id | ClearingAccount ID | Associated ClearingAccount |
| instrument_id | Instrument ID | Identifier for instrument this position is in |
| qty | Decimal | Number of contracts in this Position (positive for LONG, negative for SHORT) expressed in terms of instrument base unit. (e.g. if instrument multiplier is 0.1, then a position of one traded contract would have qty of 0.1) |
| px | Decimal | Traded price for this Position |
| qty_delivered | Decimal | (SHORT positions only) Number of base units (e.g. BTC) that have been already provided by seller for delivery at expiration |

In one embodiment, Journals and Postings are stored as immutable, append-only records in the Ledger Database. Each Journal has multiple associated Postings. For a given Journal, all associated Postings' amounts should sum to exactly zero. In one embodiment, available (unreserved) balance is not stored in the database, but instead is computed for a given account and asset_type as follows:

```
function getUnreservedBalance(account_id, asset_type)
    select postings where posting.account_id = account_id and
                          posting.asset_type = asset_type
        return sum of posting.amount in selected postings
end
```

Figure 16:
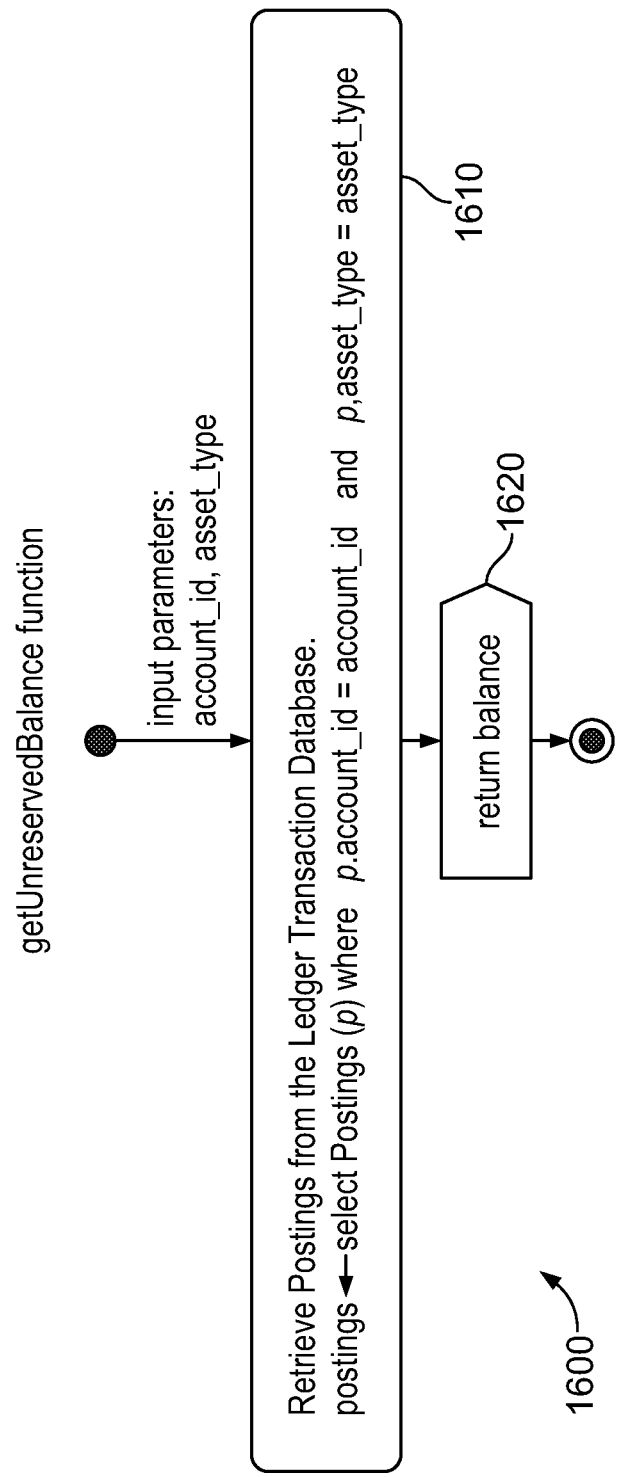
FIG. 16 illustrates a getUnreservedBalance function flowchart according to embodiments of the present invention.

FIG. 16 illustrates a getUnreservedBalance function flowchart 1600 according to embodiments of the present invention. The flowchart 1600 receives as input parameters the account_id and asset_type. The Central Clearing system then retrieves postings from the Ledger Transaction Database where the positing have a stored account_id the same as the supplied account_id and a stored asset_type the same as the supplied asset_type. The sum of the posting amount is then returned in response to the function call.

For Positions, as described in Table 6, open interest can be determined as the balance of the instrument, using the above balance function, and providing the instrument_id as the asset_type parameter. However, additional details about current positions may be computed for a given account and instrument_id as follows:

To compute the complete details of positions, returning a set of Position data structures (as described in Table 6) which include additional information about the Positions beyond simply open interest (as described in) including the traded price of the Position and the amount of base units (e.g. BTC) that have been delivered already, the following function may be used:

```
function getPositions(account_id, instrument_id)
    select postings where posting.type = PositionPosting and
                          posting.account_id = account_id and
                          posting.asset_type = instrument_id
    for each posting (p) in selected postings:
        if p.creates:
            positions[p.creates.position_id] := p.creates
        for each position (position_id, qty) in p.closes:
            subtract qty from positions[position_id].qty
            if positions[position_id].qty is 0, delete positions[position_id]
        for each position (position_id, qty) in p.delivers:
            add qty to positions[position_id].qty_delivered
    })
    return positions
end
```

Figure 17:
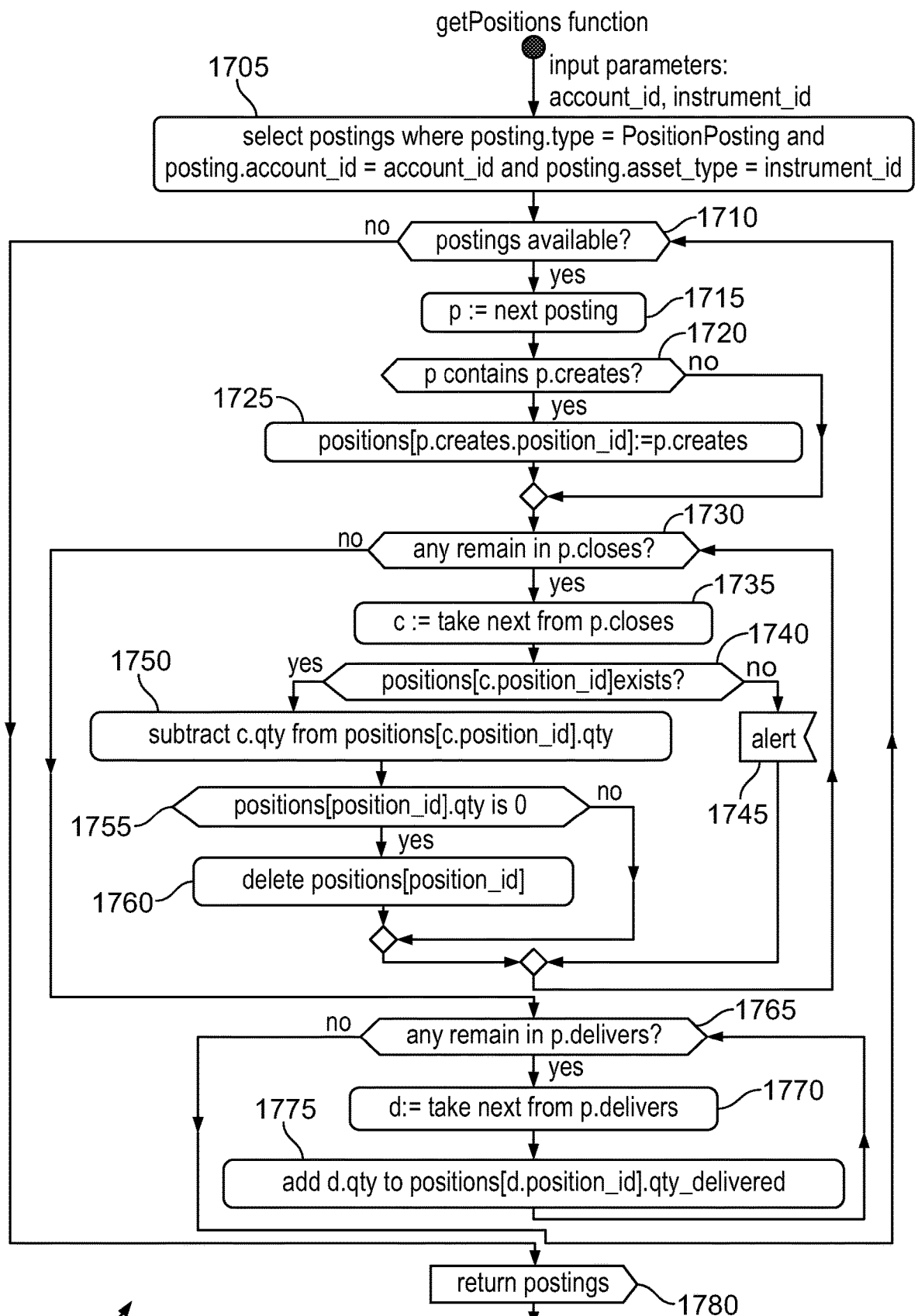
FIG. 17 illustrates a getPositions function flowchart according to embodiments of the present invention.

FIG. 17 illustrates a getPositions function flowchart 1700 according to embodiments of the present invention. As shown in the flowchart 1700, the account_id and instrument_id are received as input parameters. At step 1705, postings are selected where the posting-type is PositionPosting and the stored account_id is the same as the supplied account_id as well as the stored asset_type being the same as the supplied instrument_id. Next, at step 1710, it is determined whether any posting are available by evaluating the length of the returned list of postings. When no postings are available, the process proceeds to step 1780 and the accumulated postings (which is an empty list) are returned. Otherwise, the process proceeds to step 1715 and increments the current posting to the next posting (starting with the first one).

Next, at step 1720, the process determines whether the current posting has a stored value in its Creates field. When not, the process proceeds to step 1730. Otherwise, then there is a value in the stored creates field, the process proceeds to step 1725 and the value of the creates field is stored as a new unique position_id in the accumulated set of postings.

At step 1730, the process determines whether the current position has any remaining data stored in its closes field. When not, the process proceeds to step 1765. Otherwise, the process removes the next value from the current position's closes field and assigns it to a variable c at step 1735. Then, at step 1740, it is determined whether there are currently any positions already stored that have already been assigned the position_id from variable c. When so, the process proceeds to step 1745 and an alert in initiated in the system. Otherwise, the process proceeds to step 1750 and the value in the quantity field of the c variable is subtracted from the value of the quantity field in the position having the position_id equal to the value of position_id in c. The process then proceeds to step 1755 where it is determined whether the current value quantity field of the positions for the current position_id is equal to zero, and when so, the current position with the position_id is deleted. Otherwise, the process proceeds to step 1730.

At step 1765, the process determines whether p.delivers includes any remaining positions. When not, the process proceeds to step 1710. Otherwise, the process proceeds to step 1770 and the next position stored in the delivers field is removed from the delivers field and is assigned to a variable d. The process then proceeds to step 1775 and the quantity value associated with d is added to the quantity delivered value for the current position_id from d.

Some situations may require the clearing system to determine the total available balance plus collateral previously reserved for all open positions. For example, to compute an interest payment for reserved and unreserved collateral held by the central clearing bank account, the following function may be used:

```
function getReservedBalance(account_id, asset_type)
    instruments := select instruments where quote_type = asset_type
    total := 0
    for each instrument (i) in instruments:
        for each position (p) in positions(account_id, i.instrument_id):
            if (p.qty < 0): // short position
                add ((p.instrument.cap_px - p.px) * ((p.qty*-1) -
                p.qty_delivered)) to total
            else if (p.qty > 0): // long position
                add (p.px * p.qty) to total
    return total
end
```

Figure 18:
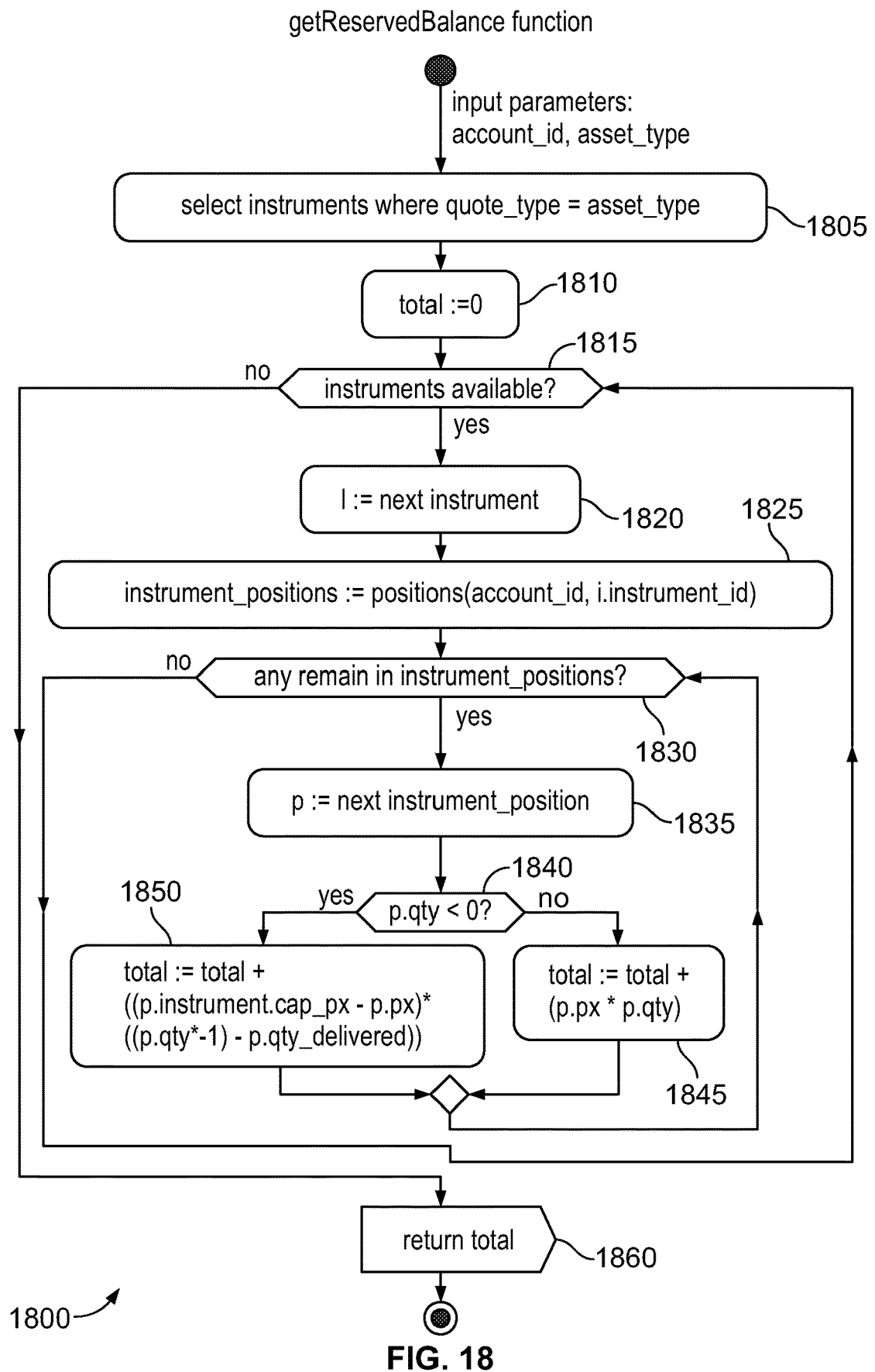
FIG. 18 illustrates a getReservedBalance function flowchart according to embodiments of the present invention.

FIG. 18 illustrates a getReservedBalance function flowchart 1800 according to embodiments of the present invention. However, in some embodiments of the present invention, such as the CustomerReserve embodiment, the present flowchart is not needed. As shown in the flowchart, the process receives as its input parameters an account_id and an asset_type. Next, at step 1805, the process selects instruments where the stored quote_type is the same as the provided asset_type. Then, at step 1810, the variable total is set to zero. Next, at step 1815, the process determines whether there are any instruments available. When not, the process proceeds to step 1860 and the total is returned. Otherwise, the process proceeds to step 1820 and the instrument variable is incremented to be the next instrument, which is removed from the working set of instruments.

Next, at step 1825, the process determines all positions associated with the provided account_id and instrument_id from the instrument variable and assigns those positions to the set of instrument_positions. Then, at step 1830, it is determined whether any instrument positions are remaining. When not, the process proceeds to step 1815. Otherwise, the process proceeds to step 1835 and the variable p is assigned the value of the next instrument_position, which is removed from the set of instrument_positions.

At step 1840, it is determined whether the quantity field associated with p is less than zero. When not, the process proceeds to step 1845 and the total is set equal to the current total plus the multiplied value of the quantity field and price field for the current position. Otherwise, the process proceeds to step 1850 wherein the total is set equal to the current total added to a first factor comprised of the cap price for the current position minus the price of the current position multiplied by a second factor comprised of the inverse of the current position's quantity minus the current position's quantity_delivered value. The process then proceeds back to step 1830.

For improved performance, balance and position snapshots may be maintained in persistent records, and updated whenever Postings are created.

In the embodiment described herein, unless otherwise noted, the convention of 1 contract=1 BTC (BTC=Bitcoin) is used. Other embodiments may use a multiplier to implement other contract sizes such as 1 contract=5 BTC, 1 contract=0.1 BTC, or any other amount as desired.

In an alternate embodiment, CustomerReserveAccounts are used to track collateral reserved by each customer. The CustomerReserveAccount may be identified by appending a constant, such as ".reserve" to the end of the associated CustomerAccount account_id. In this embodiment, the sum of the CustomerAccount postings represents the combined total reserved and unreserved balance, and the sum of the associated CustomerReserveAccount postings represents the reserved amount as a negative number. For this embodiment, alternate implementations of getUnreservedBalance and getReservedBalance are as follows:

```
function getUnreservedBalance(account_id, asset_type)
    select postings where (
                posting.account_id = account_id or
                posting.account_id = account_id +
                ".reserve" ) and
                posting.asset_type = asset_type
    return sum of posting.amount in selected postings
end
function getReservedBalance(account_id, asset_type)
    select postings where posting.account_id = account_id + ".reserve"
                and posting.asset_type = asset_type
    return 0 - sum of posting.amount in selected postings
end
```

In this embodiment, the sum of the CustomerAccount postings represents the combined total reserved and unreserved balance, and the sum of the associated CustomerReserveAccount postings represents the reserved amount as a negative number.

Figure 4:
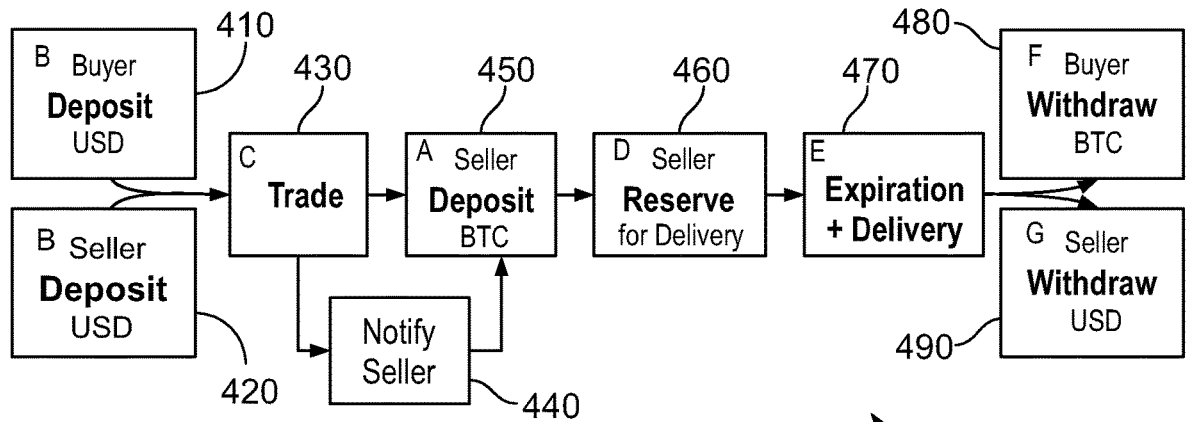
FIG. 4 illustrates a process when a trading position is held to maturity and the seller delivers cryptocurrency.
Figure 5:
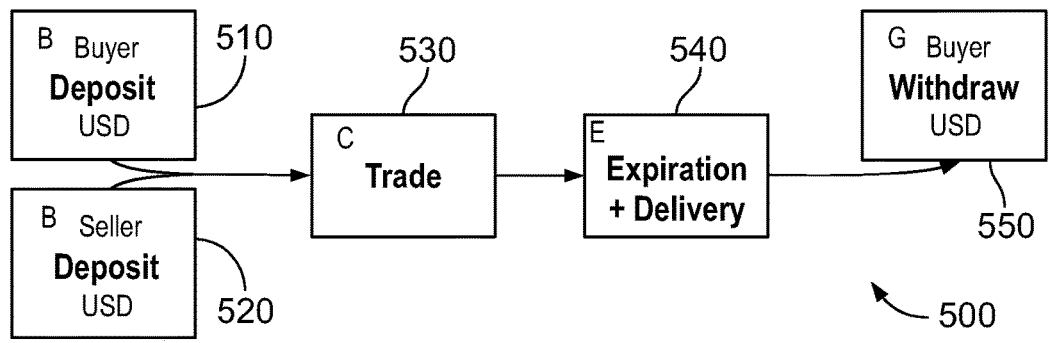
FIG. 5 illustrates a process where a position is held to maturity and the seller does not deliver cryptocurrency.
Figure 6:
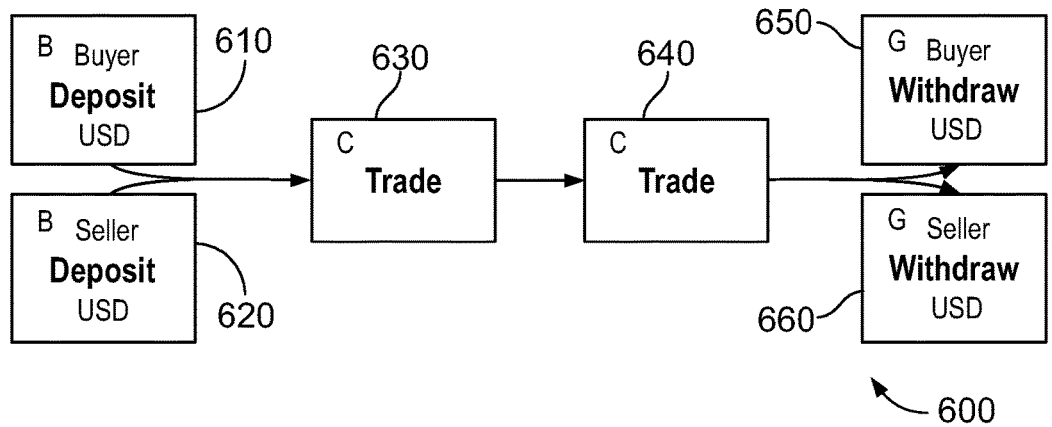
FIG. 6 illustrates a process where a trading position is traded in and then traded out.
Figure 7A:
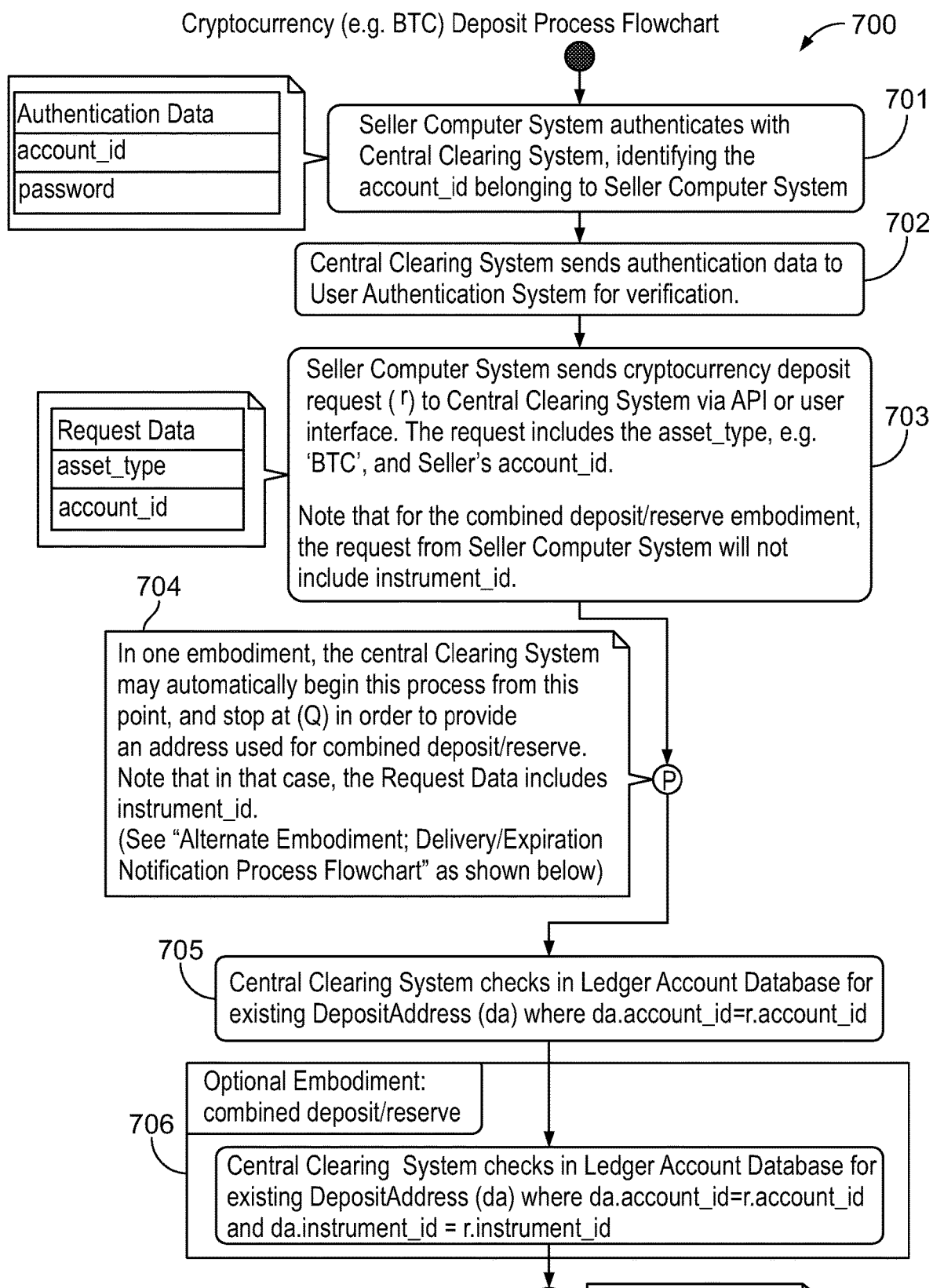
FIGS. 7A, 7B, 7C, 7D, 7E, 7F, and 7G illustrate the cryptocurrency and U.S. dollar (USD) deposit process for depositing cryptocurrency (e.g. BTC) into the clearing system according to embodiments of the present invention.
Figure 7B:
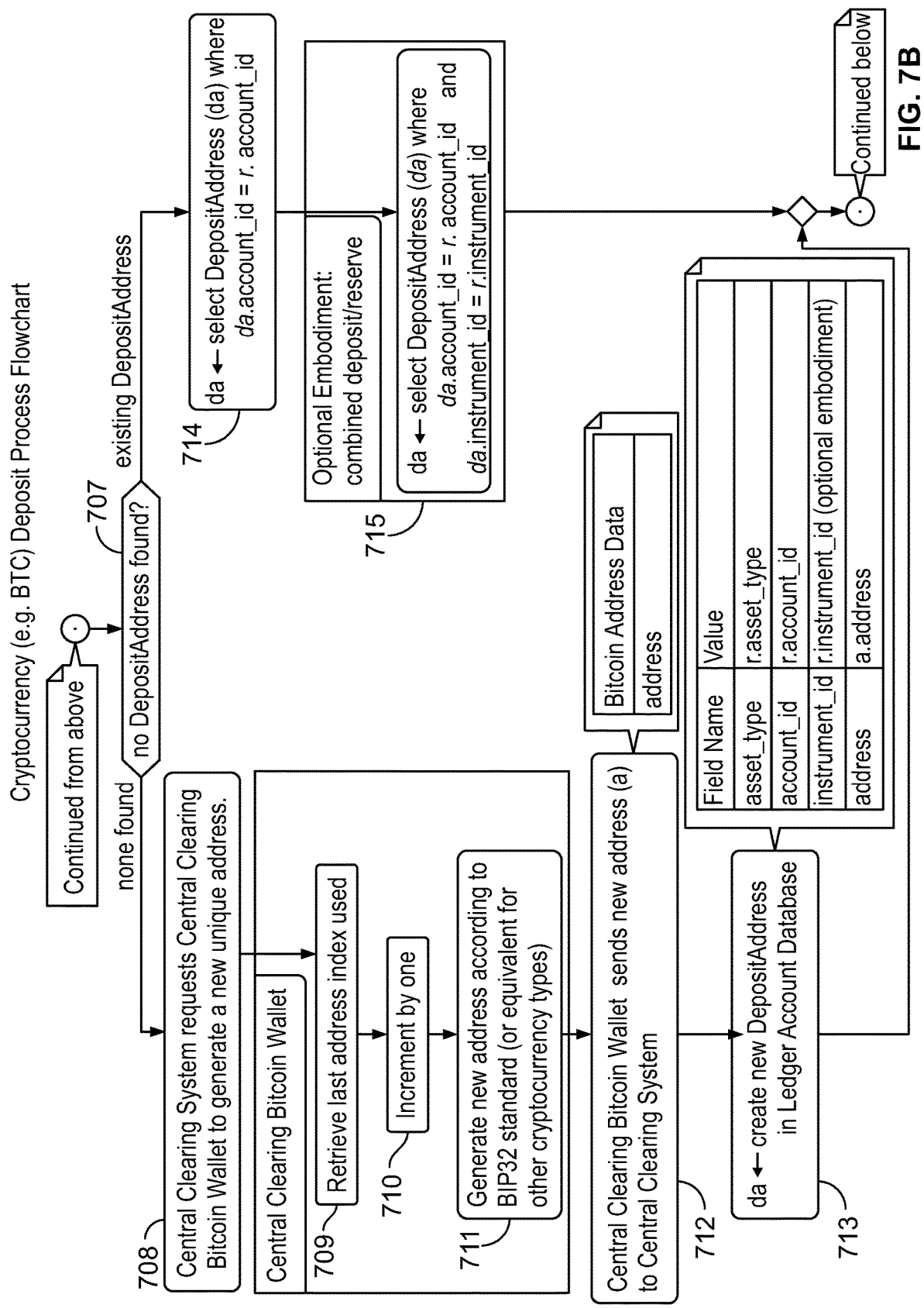
Figure 7C:
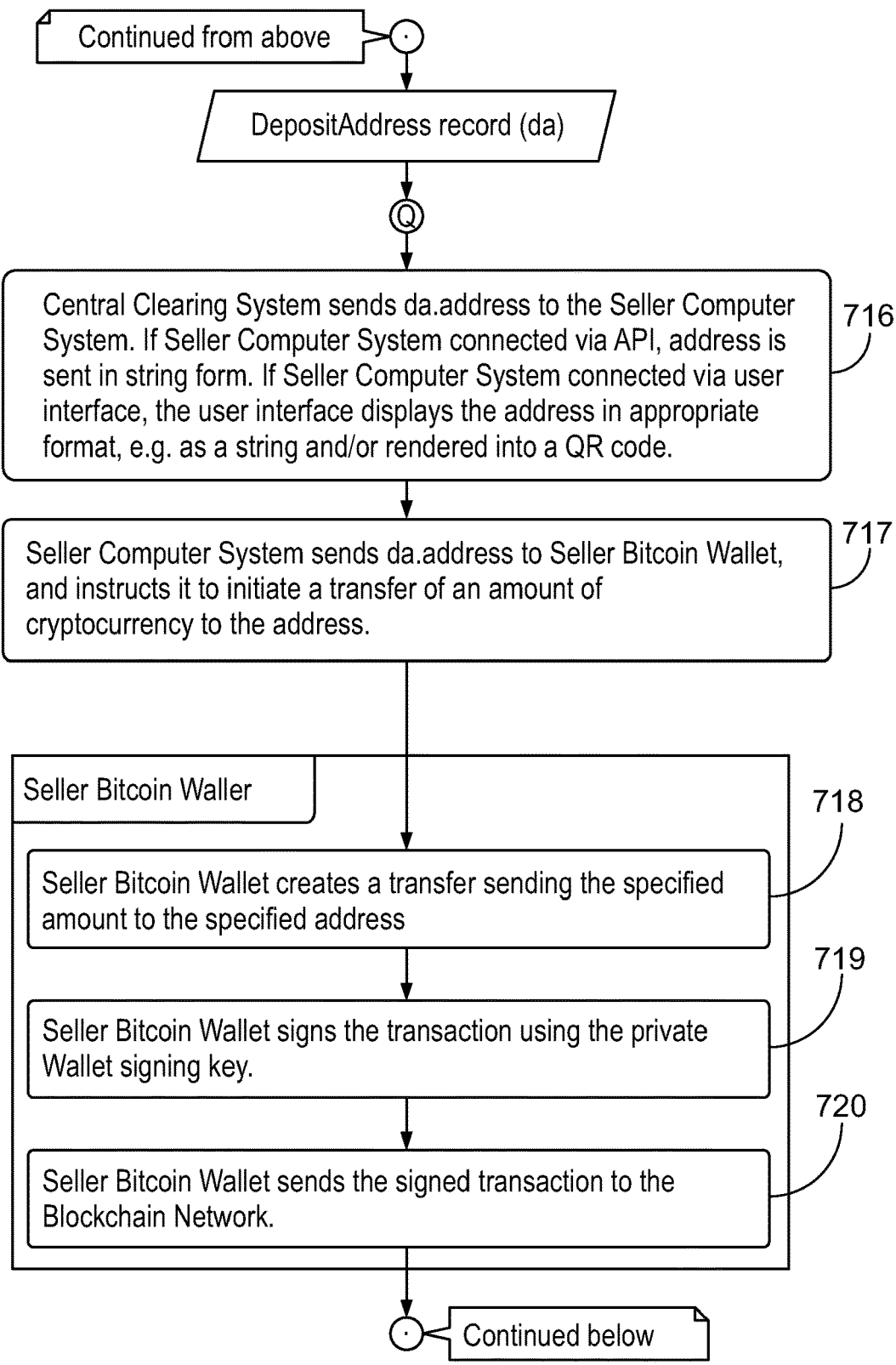
Figure 7D:
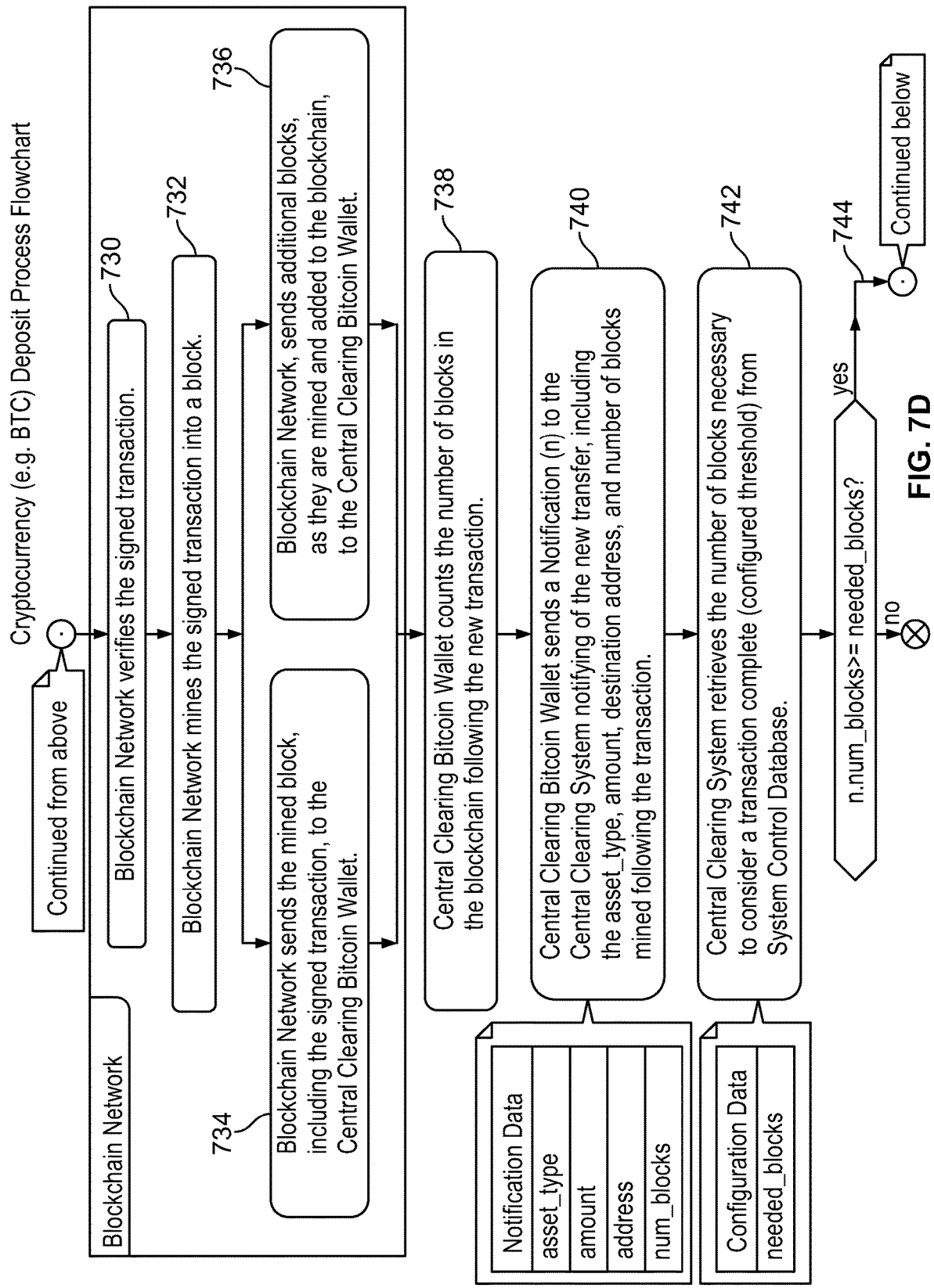
Figure 7E:
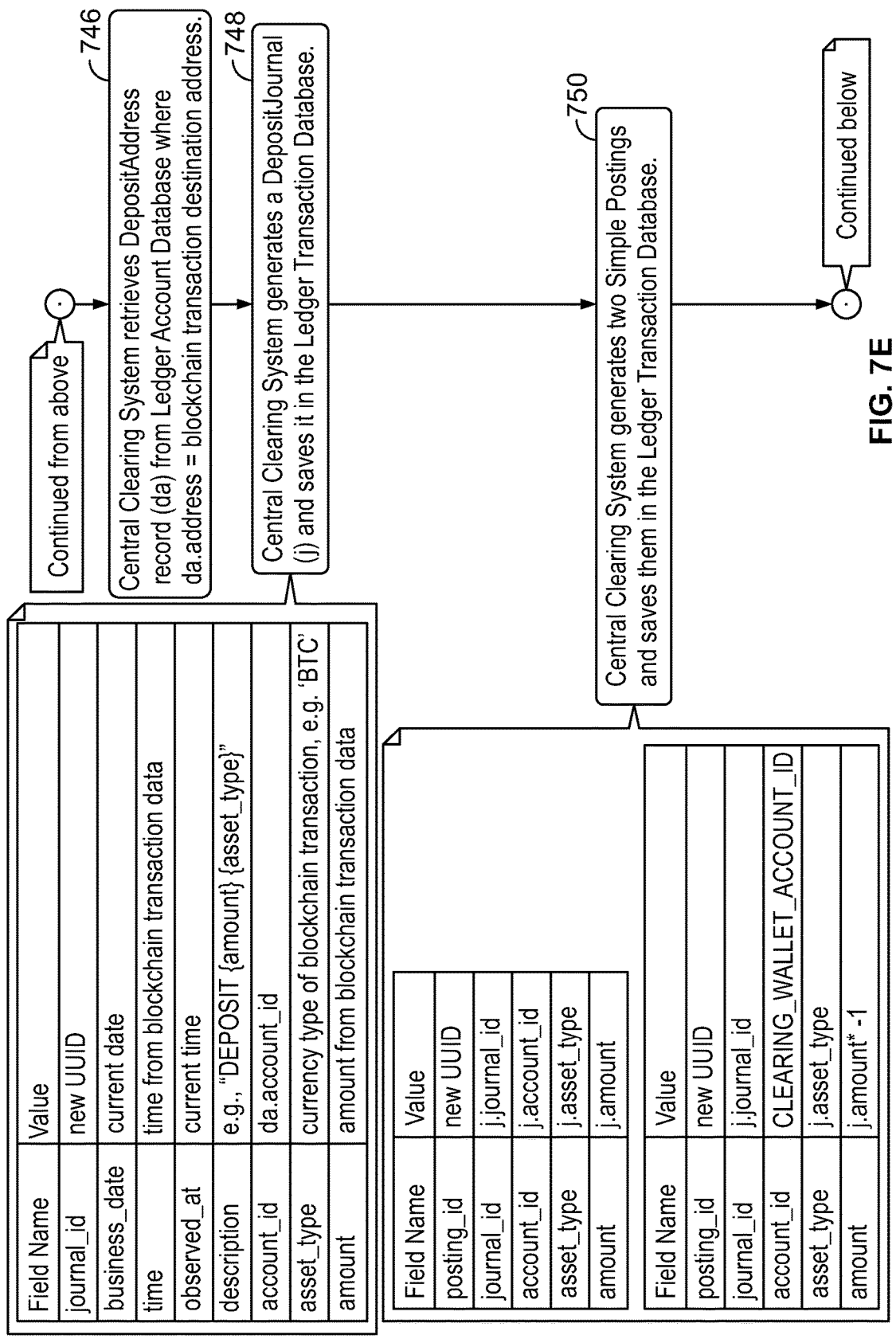
Figure 7F:
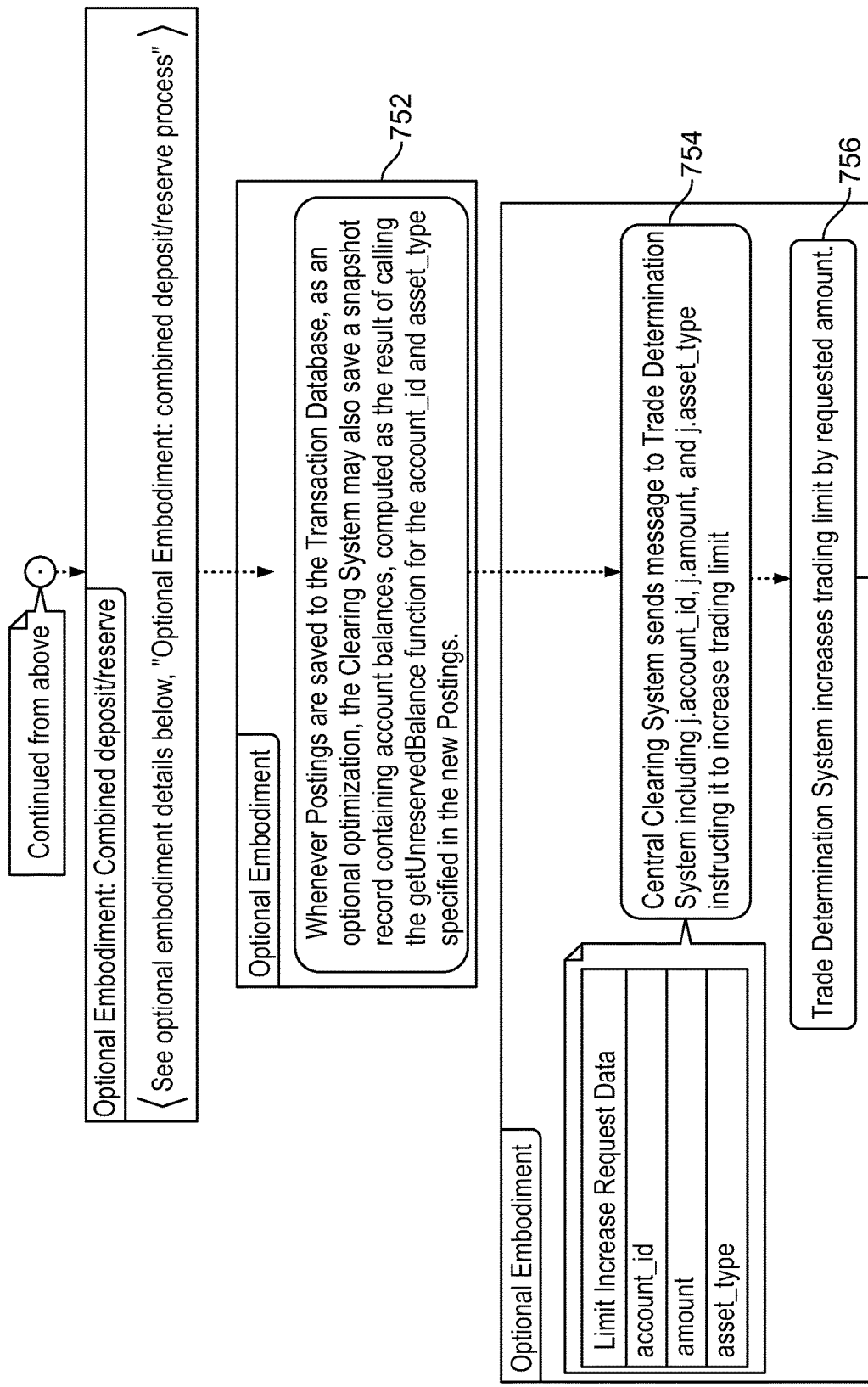
Figure 7G:
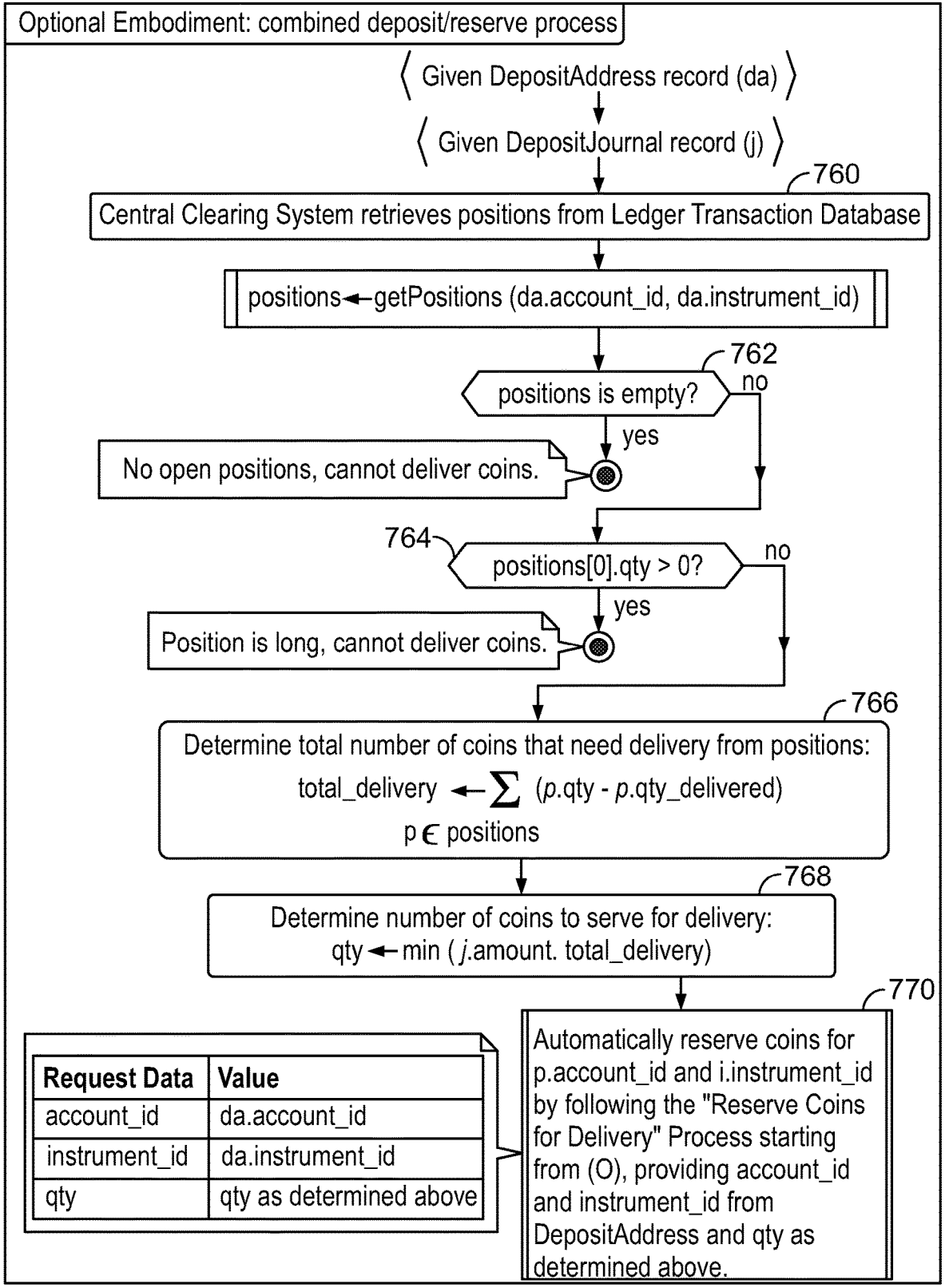

FIGS. 4, 5, and 6 describe three trading processes that may take place using the present blockchain-enabled electronic futures trading system 100. FIG. 4 illustrates a process when a trading position is held to maturity and the seller delivers cryptocurrency. FIG. 5 illustrates a process where a position is held to maturity and the seller does not deliver cryptocurrency. FIG. 6 illustrates a process where a trading position is traded in and then traded out.

The trading processes shown in FIGS. 4-6 include make reference to the following process flowcharts where the process steps A-H are described in more detail:

A. Cryptocurrency (e.g. BTC) Deposit Process Flowchart (as shown in FIG. 7)

B. Fiat Currency (e.g. USD) Deposit Process Flowchart (as shown in FIG. 8) C. Trade Process Flowchart (as shown in FIG. 9)

D. Reserve Coins For Delivery Process Flowchart (as shown in FIG. 10)

E. Delivery Process Flowchart (as shown in FIG. 11)

Figure 12A:
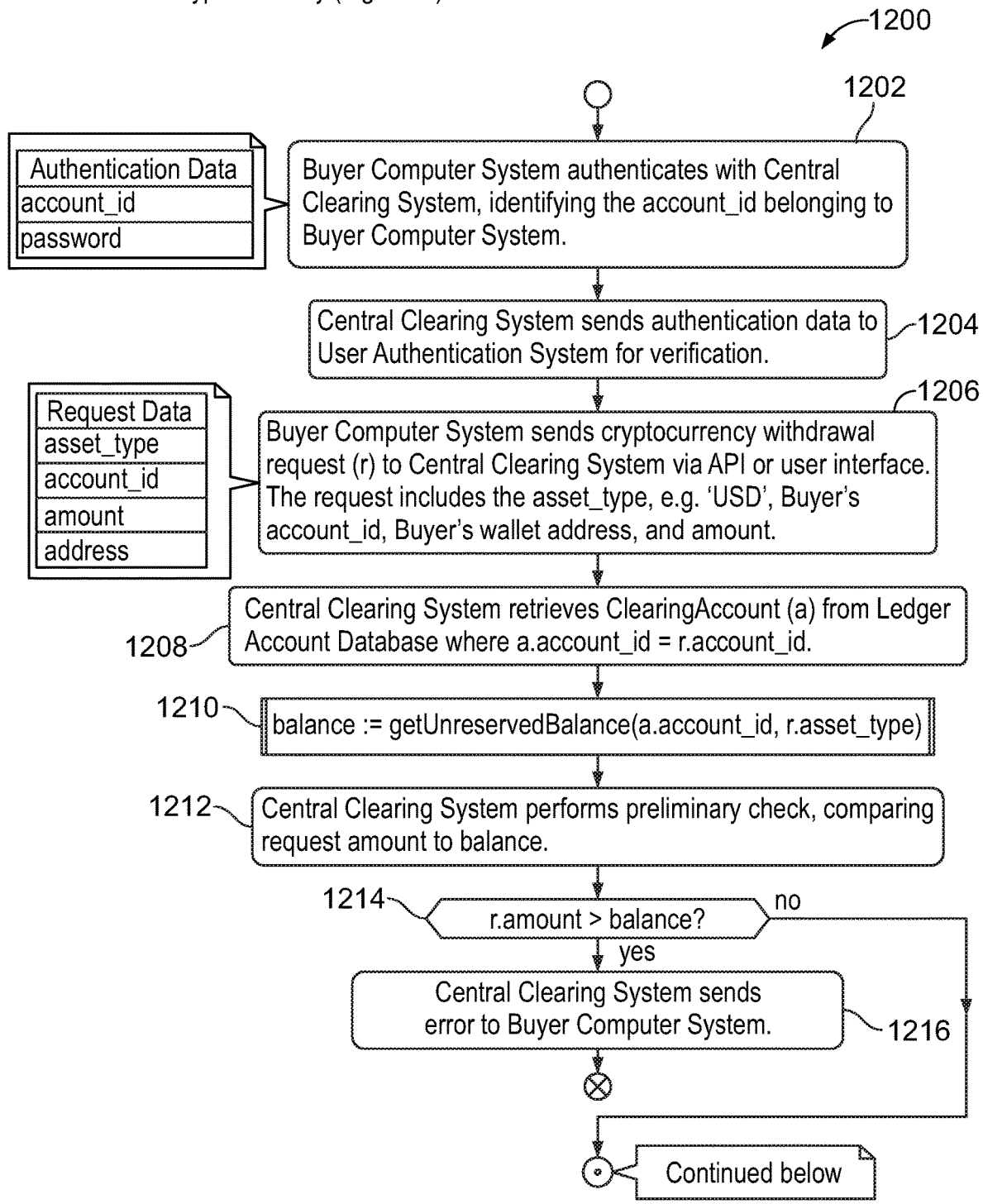
Figure 12B:
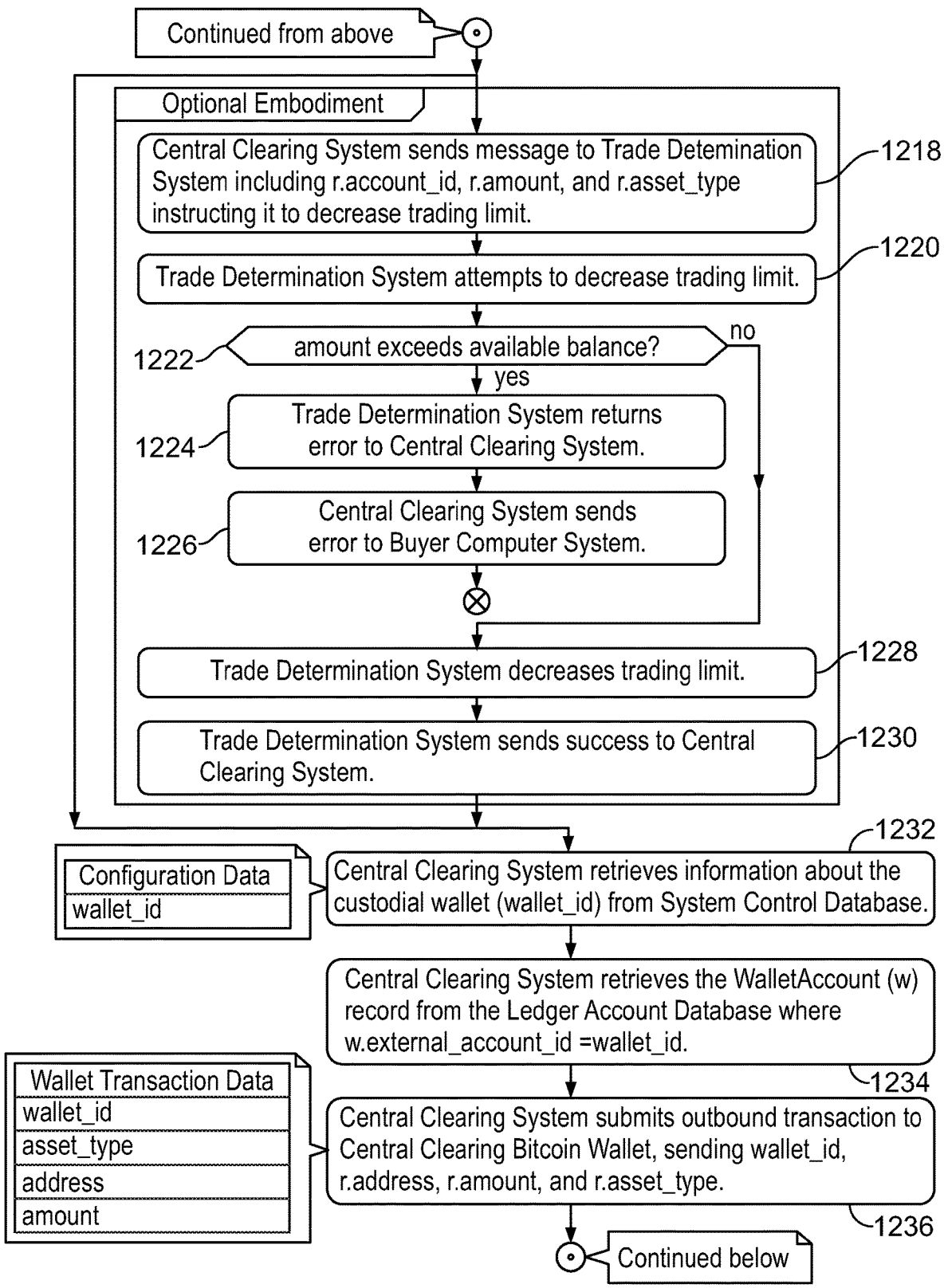
Figure 12C:
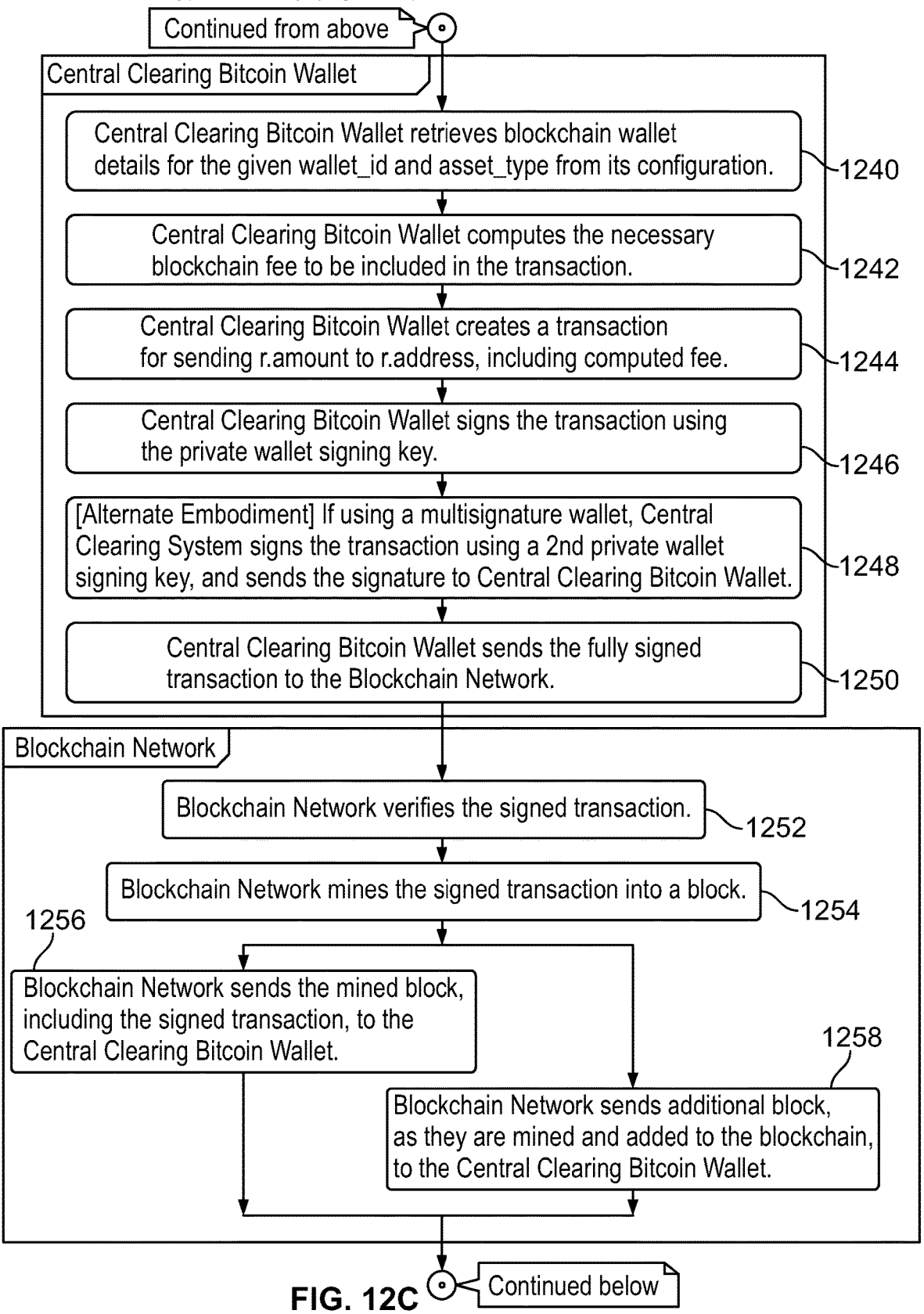
Figure 13A:
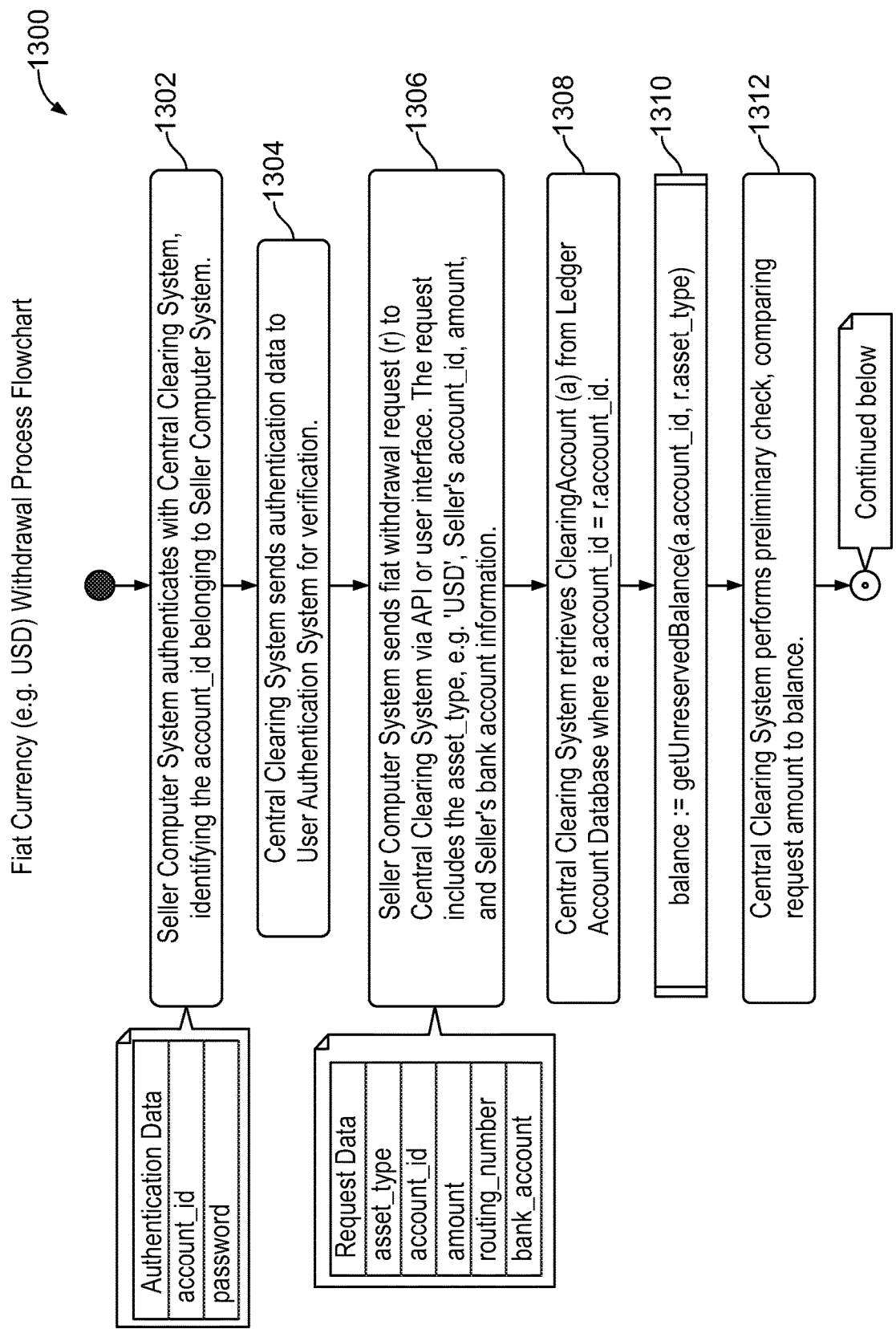
FIGS. 13A, 13B, 13C, and 13D illustrates a Fiat currency Withdrawal Process Flowchart for withdrawing fiat currency (e.g. USD) from the clearing system according to embodiments of the present invention.
Figure 13B:
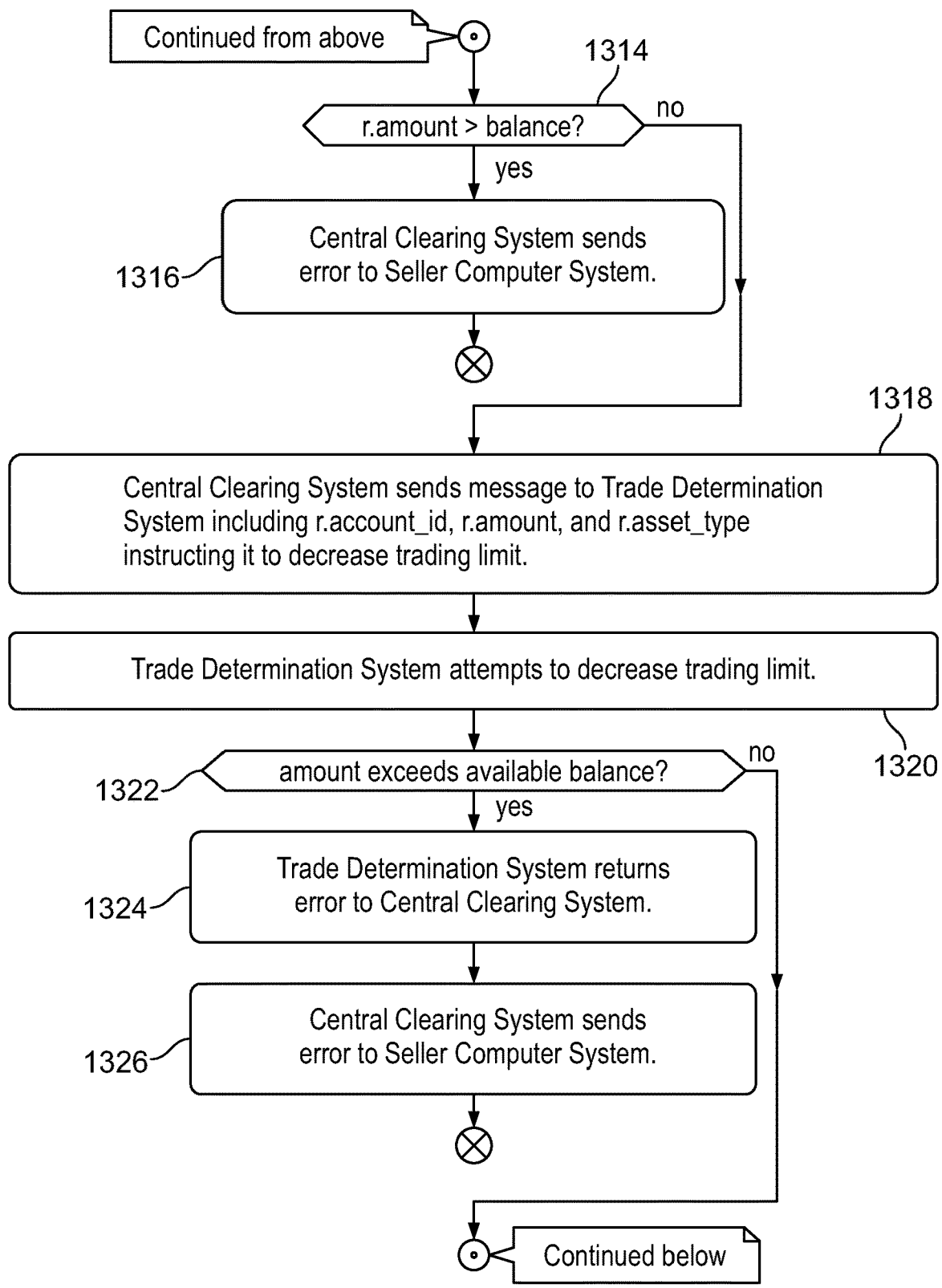
Figure 13C:
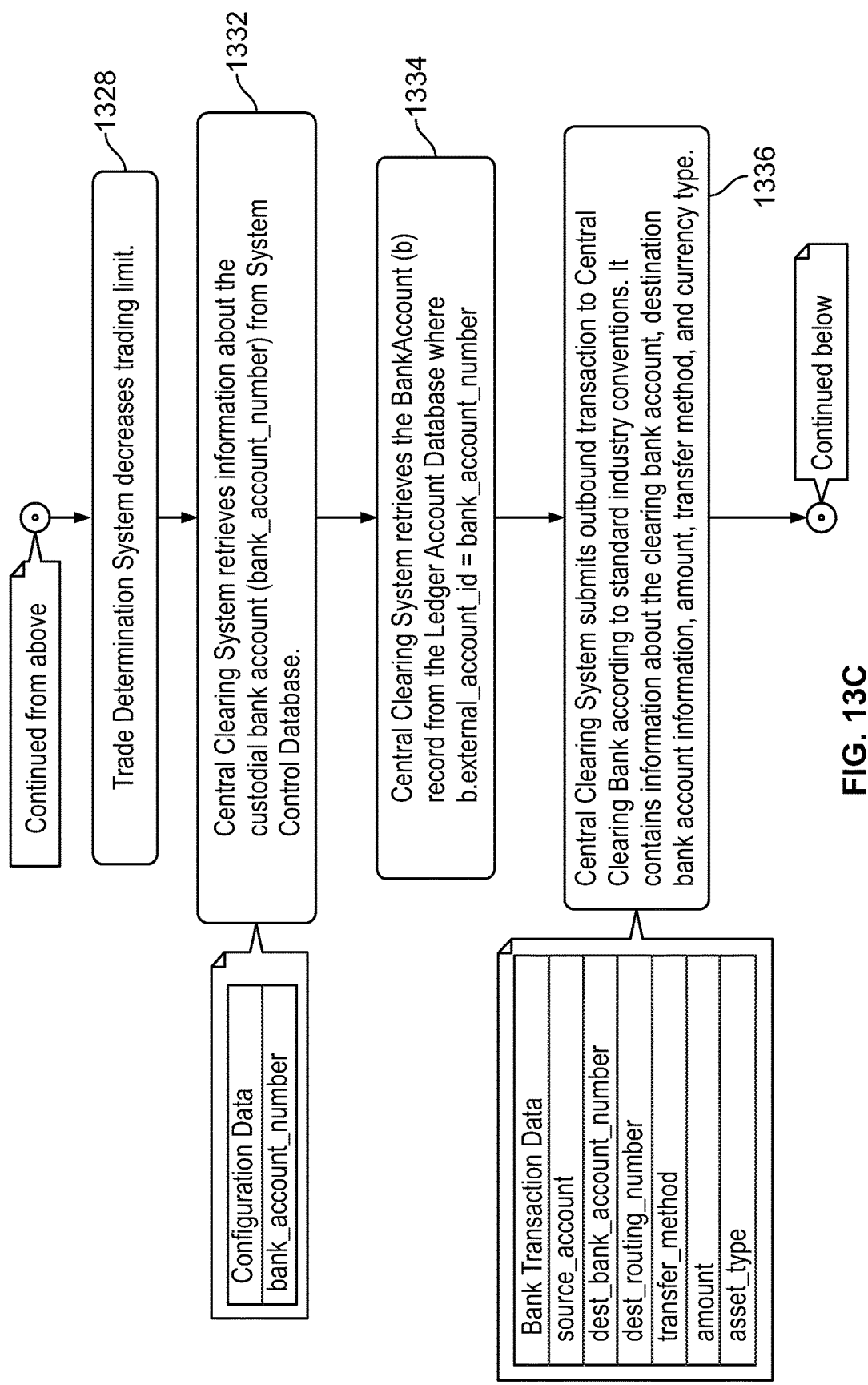
Figure 13D:
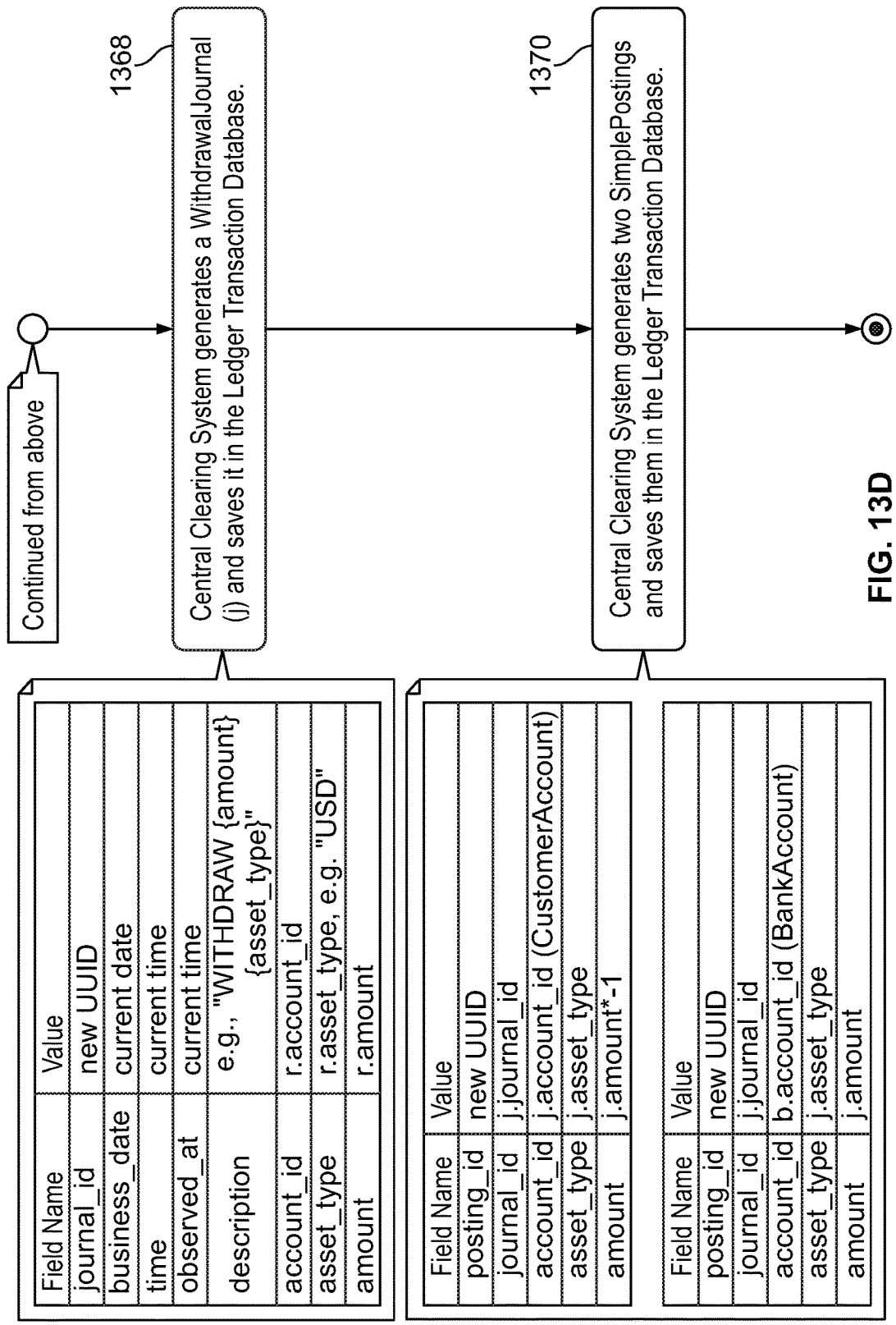
Figure 14A:
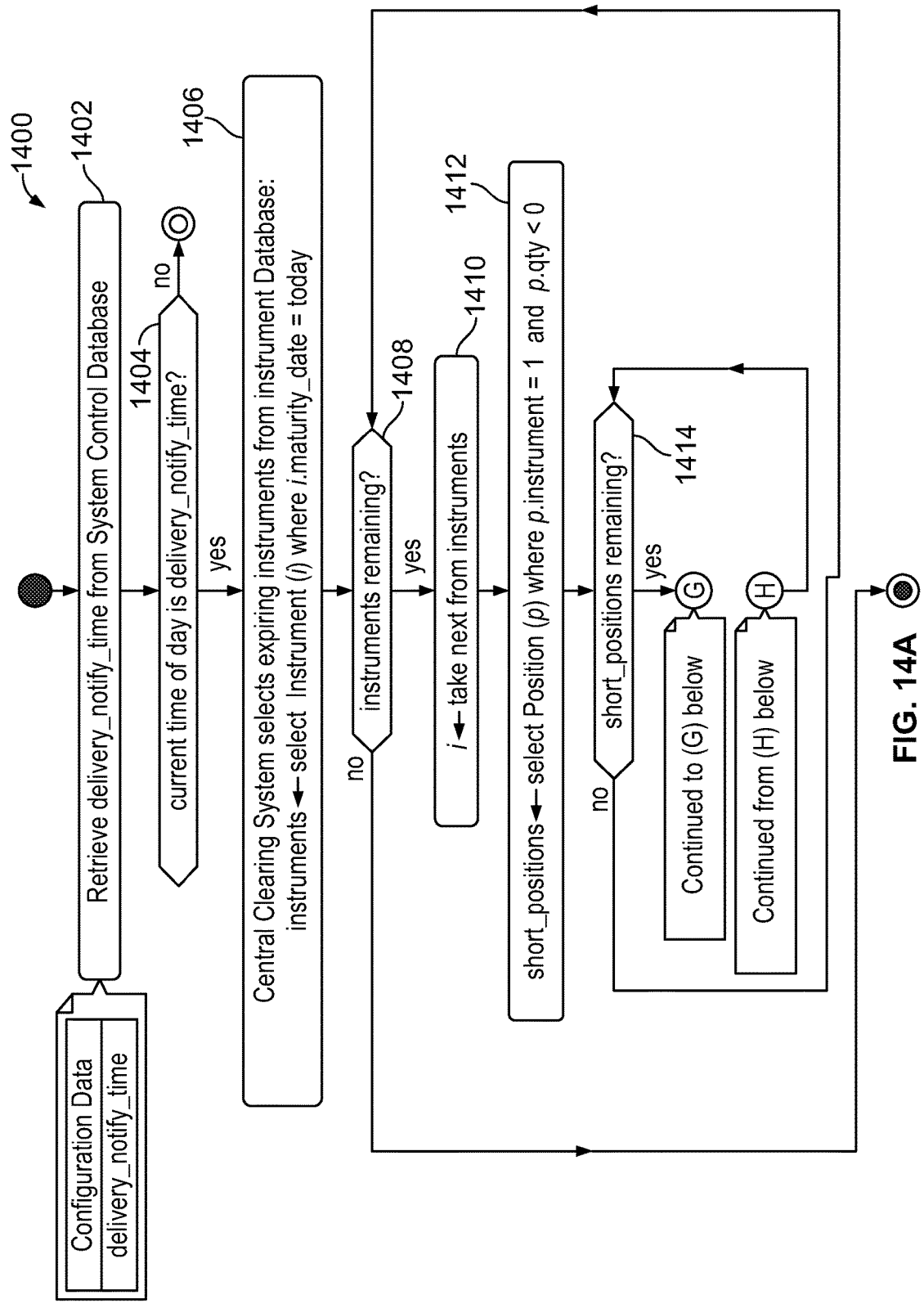
FIGS. 14A, 14B, 14C, and 14D illustrate an alternative embodiment of the delivery/expiration notification process flowchart, according to an embodiment of the present invention.
Figure 14B:
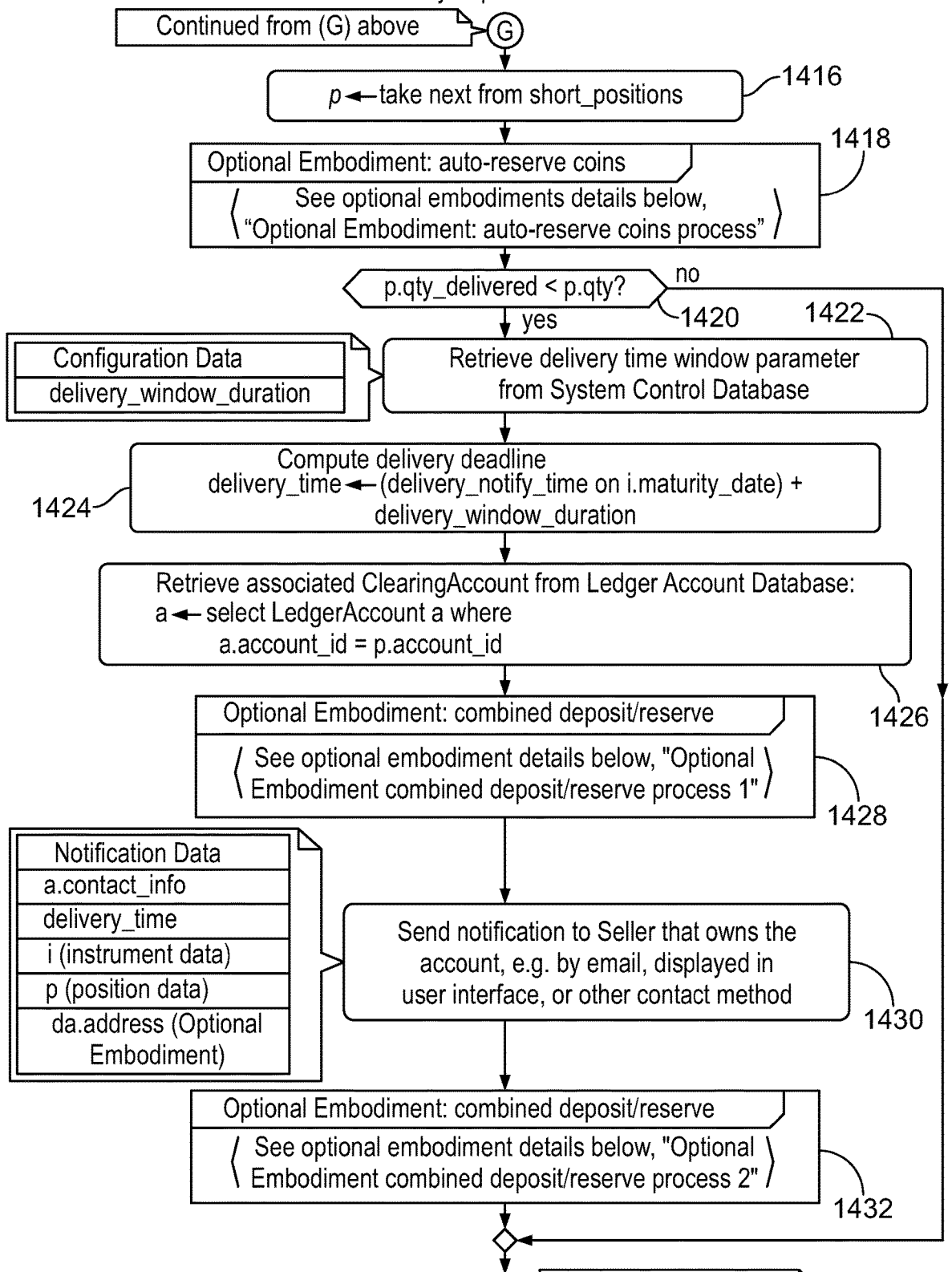
Figure 14C:
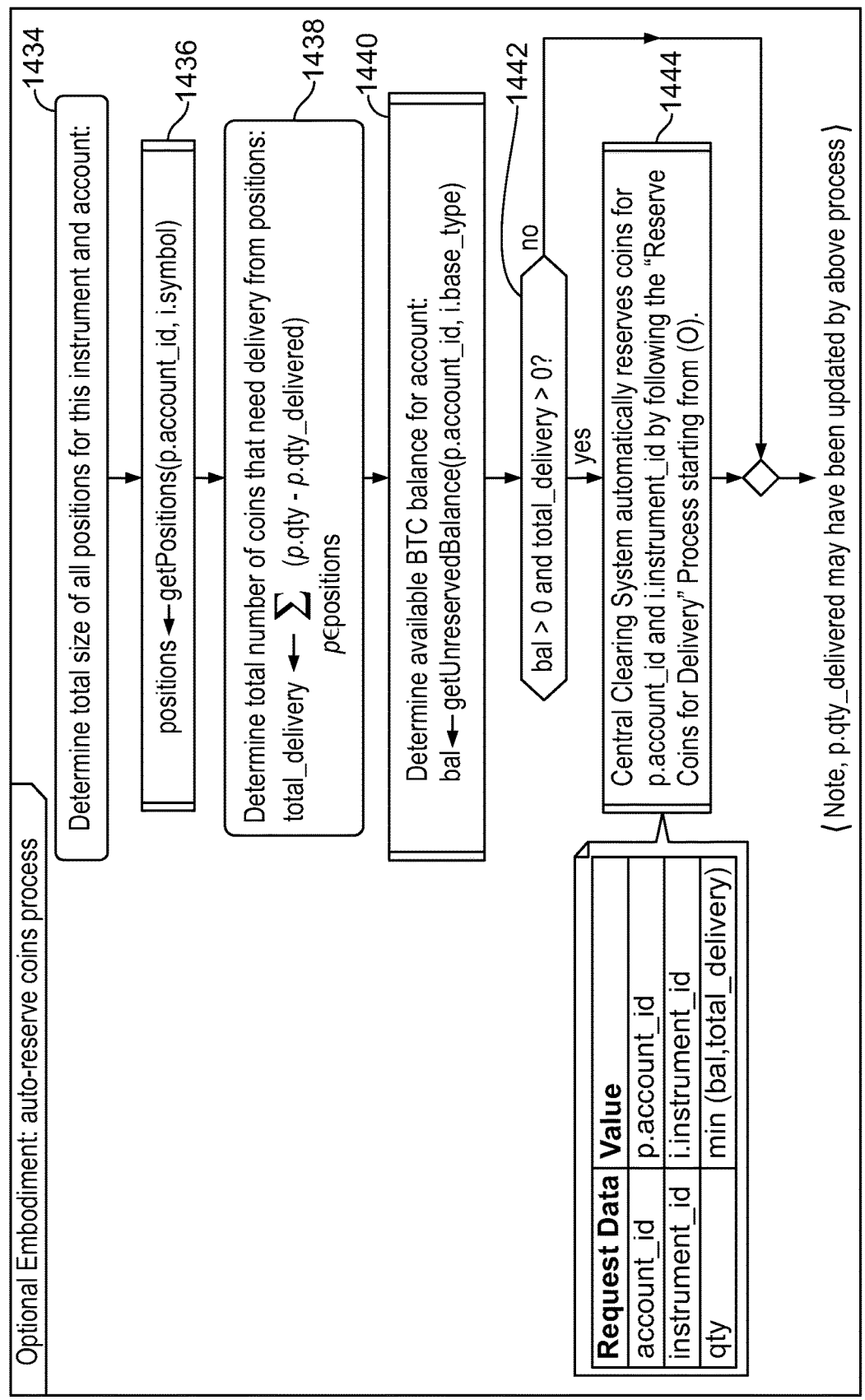
Figure 14D:
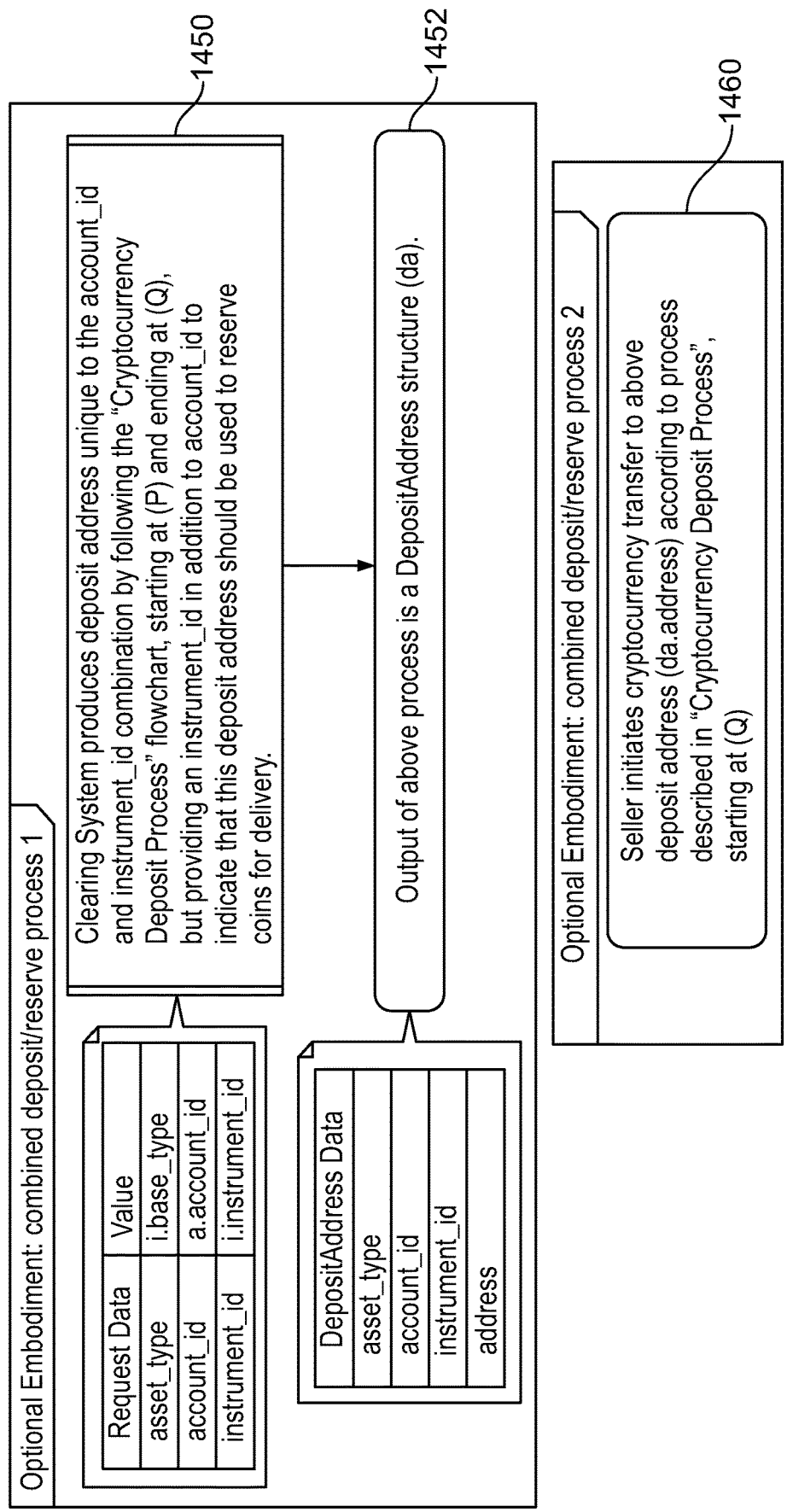

F. Cryptocurrency (e.g. BTC) Withdrawal Process Flowchart (as shown in FIG. 12)

G. Fiat Currency (e.g. USD) Withdrawal Process Flowchart (as shown in FIG. 13)

H. An Alternate Embodiment of the Delivery/Expiration Notification Process Flowchart (as shown in FIG. 14)

It is noted that terms used in this embodiment for these processes may be different in other embodiments. For example, the process here described as "Delivery" may be described as "Settlement" or other terms as desired. Or, as another example, the process here described as "Reserve" may be described as "Delivery".

In an alternative embodiment, the System Control Database 145, in addition to having a central CLEARING_RESERVE_ACCOUNT, has multiple customer reserve account IDs, one corresponding to each Buyer account and one corresponding to each Seller account. The reserve account ID may be derived from its associated customer account ID by appending a constant such as ".reserve". The amount reserved by each Buyer and Seller is tracked as a negative balance in their corresponding reserve account, instead of debiting directly from the customer account. That embodiment is described throughout this document wherever the CustomerReserveAccount is mentioned.

Turning now to FIG. 4, which illustrates a process 400 when a trading position is held to maturity and the seller delivers cryptocurrency. As shown in FIG. 4, at step 410, a buyer deposits US Dollars (USD) to the present trading system, for example, by funding their account through the Central Clearing Bank System 125. At step 420 a seller also deposits USD to the present trading system. Steps 410 and 420 may operate as shown in the Fiat Currency Deposit Process Flowchart as shown in FIG. 8.

At step 430 a trade takes place. For example, the buyer has agreed to buy and the seller has agreed to sell, at the same price, a futures contract on an amount of bitcoin (BTC).

Once the trade has been made by the Trade Determination System 130 acting in concert with the Central Clearing Computer System 115, step 430 may operate as shown in the Trade Process Flowchart as shown in FIG. 9.

Once the delivery notification time has occurred (as mentioned above and as shown in FIG. 14), the Central Clearing Computer System 115 notifies the seller at step 440. The seller may then choose to deposit an amount of BTC in step 450. The deposit of bitcoin may take place by the seller initiating a transfer of bitcoin from the Seller Bitcoin Wallet 112 to the Central Clearing Bitcoin Wallet 117. Step 450 may operate as shown in the Cryptocurrency Deposit Process Flowchart as shown in FIG. 7.

Next, at step 460, the seller reserves bitcoin for delivery, which may operate as shown in the Reserve Coins For Delivery Process Flowchart of FIG. 10.

In one embodiment, steps 450 (Deposit) and 460 (Reserve) may be combined as shown in FIG. 14.

Then, at step 470, the expiration/maturity date of the future is reached. Step 470 may operate as shown in the Delivery Process Flowchart as shown in FIG. 11.

At step 480, the Buyer withdraws BTC. Step 480 may operate as shown in the Cryptocurrency Withdrawal Process Flowchart as shown in FIG. 12.

Finally, at step 490, the Seller may withdraw USD. Step 490 may operate as shown in the Fiat Currency Withdrawal Process Flowchart of FIG. 13.

Turning now to FIG. 5 which illustrates a process 500 where a position is held to maturity and the seller does not deliver cryptocurrency. As shown in FIG. 5, at step 510, a buyer deposits US Dollars (USD) to the present trading system, for example, by funding their account through the Central Clearing Bank System 125. At step 520 a seller also deposits USD to the present trading system. Steps 510 and 520 may operate as shown in the Fiat Currency Deposit Process Flowchart as shown in FIG. 8.

At step 530 a trade takes place. For example, the buyer has agreed to buy and the seller has agreed to sell, at the same price, a futures contract on an amount of bitcoin (BTC). Step 530 may operate as shown in the Trade Process Flowchart as shown in FIG. 9.

Then, at step 540, the expiration/maturity date of the future is reached. However, in FIG. 5 the seller has not deposited BTC and instead must settle using fiat currency because no BTC is available. Step 540 may operate as shown in the Delivery Process Flowchart as shown in FIG. 11.

Finally, at step 550, the buyer may withdraw USD. Step 550 may operate as shown in the Fiat Currency Withdrawal Process Flowchart of FIG. 13.

Turning now to FIG. 6 which illustrates a process 600 where a trading position is traded in and then traded out. As in earlier examples, at step 610, a buyer deposits US Dollars (USD) to the present trading system, for example, by funding their account through the Central Clearing Bank System 125. At step 620 a seller also deposits USD to the present trading system. Steps 610 and 620 may operate as shown in the Fiat Currency Deposit Process Flowchart as shown in FIG. 8.

At step 630 a trade takes place. For example, the buyer has agreed to buy and the seller has agreed to sell, at the same price, a futures contract on an amount of bitcoin (BTC). Step 630 may operate as shown in the Trade Process Flowchart as shown in FIG. 9.

Then, at step 640, another trade takes place. The second trade may close the position opened by the first trade. Step 640 may operate as shown in the Trade Process Flowchart as shown in FIG. 9.

Finally, at steps 650 and 660, the Buyer and the Seller may withdraw USD. Steps 650 and 660 may operate as shown in the Fiat Currency Withdrawal Process Flowchart of FIG. 13.

Thus, one aspect of one or more embodiments of the present invention is the ability of the current system to provide short exposure to the underlying BTC while maintaining a fully-collateralized computerized clearing house, achieved by establishing a cap price which allows a finite amount of collateral to be reserved by the seller.

FIGS. 7A, 7B, 7C, 7D, 7E, 7F, and 7G illustrate the cryptocurrency and U.S. dollar (USD) deposit process flowchart 700 for depositing cryptocurrency (e.g. BTC) into the clearing system according to embodiments of the present invention. First, at step 701, the Seller Computer System 110 authenticates with the Central Clearing System, and identifies the account_id belonging to Seller Computer System 110. In one embodiment, the authentication data elements of the account_id and password are received from a user.

At step 702, the central clearing system sends the authentication data to the User Authentication System 135 for verification. The User Authentication System 135 verifies the authentication data by comparing the received authentication data with previously stored authentication data at the User Authentication System 135.

Next, at step 703, the Seller Computer System 110 sends a cryptocurrency deposit request to Central Clearing System via API or user interface. The request includes the cryptocurrency type code, for example 'BTC'. This request indicates that a user is attempting to deposit cryptocurrency with the central clearing system. As shown in the flowchart the request data includes asset_type, such as BTC for Bitcoin and the seller's account_id. Alternatively, in the embodiment with a combined deposit/reserve, the request from the Seller Computer System 110 also includes instrument_id in addition to asset_type and account_id.

At step 704, in one embodiment, the Central Clearing System may automatically begin this process from step 704 and step at point (Q) in order to provide an address used for combined deposit/reserve. Note that in that case, the Request Data includes instrument_id as a data element. Further description of this alternative embodiment appears in the alternate embodiment:Delivery/Expiration Notification Process Flowchart below.

At step 705, the Central Clearing System checks in the Ledger Account Database 150 for existing DepositAddress record where account_id==Seller's associated clearing account ID.

At step 706, in the alternative embodiment having a combined deposit/reserve, the central clearing system checks in the Ledger Account Database 150 for existing deposit addresses having a deposit address_id the same as the seller's account_id and having a deposit instrument_id the same as the seller's instrument_id.

At step 707, the process branches depending on whether the deposit address record was found. When no deposit address record was found, the process proceeds to step 708 and the Central Clearing System requests a Central Clearing Bitcoin Wallet 117 to generate a new unique address. At step 709 the Central Clearing Bitcoin Wallet 117 retrieves the last address index used from a memory. At step 710, the last address index is incremented by 1 and at step 711, the Central Clearing Bitcoin Wallet 117 generates a new address according to the BIP32 standard or similar standards for other cryptocurrency types.

Next, at step 712, the Central Clearing Bitcoin Wallet 117 sends the new address to the central clearing system. As shown in the flowchart, the bitcoin address data includes the new address.

Then, at step 713, a new deposit address record is created in the Ledger Account Database 150. As shown in the flowchart, the deposit address record includes an asset_type field storing the seller's asset_type data, e.g. 'BTC', an account_id field storing the seller's account_id data, and an address field storing the new address from the bitcoin wallet. Additionally, in the alternative embodiment for combined deposit/reserve, the deposit address record includes an instrument_id field storing the instrument_id data from the seller.

Returning to step 707, when an existing deposit address is found, the process proceeds to step 714 and the deposit address associated with the seller's account_id data is returned.

At step 715 in the alternative embodiment with the combined deposit/reserve, the deposit address is returned where the deposit address's account_id matches the seller's account_id and the deposit address instrument_id matches the seller's received instrument_id.

Next, at step 716, the Central Clearing System sends the deposit address record to the Seller Computer System 110. If the Seller Computer System 110 connected to the central clearing system using an API the address is sent in string form. Alternatively, if the Seller Computer System 110 connected using a user interface, the user interface displays the address in appropriate form at, e.g. as a string and/or rendered into a QR code.

Then, at step 717, the Seller Computer System 110 sends the deposit address record to the Seller Bitcoin Wallet 112, and instructs the Seller Bitcoin Wallet 112 to initiate a transfer of an amount of cryptocurrency from the Seller Bitcoin Wallet 112 to the address indicated in the deposit address record. At step 718, the Seller Bitcoin Wallet 112 creates a transfer sending the specified amount to the specified address in the deposit address record.

The amount of bitcoin received from the seller computer is recorded in the blockchain when the Seller Bitcoin Wallet submits the transaction to the Blockchain Network. The Central Clearing Computer System will receive that information from the Central Clearing Bitcoin Wallet, which has received it from the Blockchain Network.

At step 719, the Seller Bitcoin Wallet 112 signs the transaction using the private wallet signing key and at step 720, the Seller Bitcoin Wallet 112 sends the signed transaction to the Blockchain Network.

Then, at step 730, the Blockchain Network verifies the signed transaction using standard blockchain technology. At step 732, the Blockchain Network mines the signed transaction into a block. At step 734, the Blockchain Network sends the mined block, including the signed transaction, to the Central Clearing Bitcoin Wallet 117. At step 736, the Blockchain Network sends additional blocks, as they are mined and added to the blockchain, to the Central Clearing Bitcoin Wallet 117.

At step 738, the Central Clearing Bitcoin Wallet 117 counts the number of blocks in the blockchain following the new transaction. Then, at step 740, the Central Clearing Bitcoin Wallet 117 sends a Notification Data (n) to the Central Clearing System notifying of the new transfer, including the asset_type, amount, destination address, and number of blocks mined following the transaction.

At step 742, the Central Clearing System retrieves the number of blocks necessary to consider a transaction complete (configured threshold) from the System Control Database 145. As shown in the flowchart, the configuration date may be retrieved from the System Control Database 145 and may include the needed_blocks data element.

At step 744, the process determines whether the number of blocks mined following the transaction equals or exceeds the needed_blocks data element. When not, the process proceeds back to step 738 and the number of blocks are re-counted at a later time. Conversely, when the number of blocks mined following the transaction equals or exceeds the needed_blocks data element, the process proceeds to step 746.

At step 746, the Central Clearing System retrieves the DepositAddress record (da) from Ledger Account Database 150 where the deposit account address is the blockchain transaction destination address. At step 748, the Central Clearing System generates a DepositJournal (j) and saves it in the Ledger Transaction Database 155. As shown in the flowchart, the DepositJournal includes: a journal_id field with a value of a new unique identifier UUID; a business_date field with a value of the current date; a time field with a value of the time from the blockchain transaction data; a observed_at field with a value of the current time; a description field with a value of the deposit amount and/or asset_type; an account_id field with a value of the deposit account_id; and asset_type field with a value of the currency type of the blockchain transaction such as bitcoin (BTC), and an amount field with a value of the amount from the blockchain transaction data.

At step 750, the Central Clearing System generates two Simple Postings and saves them in the Ledger Transaction Database 155. As shown in the flowchart, the first simple posting includes: a posting_id field with a value of a new unique identifier (UUID); a journal_id field with a value of the journal_id from the deposit journal created in the previous step; an account_id field with a value of the deposit account_id; an asset_type field with the value of the asset_type from the deposit journal created in the previous step; and an amount field with a value of the amount from the deposit journal created in the previous step.

The second posting includes: a posting_id field with a value of a new unique identifier (UUID); a journal_id field with a value of the journal_id from the deposit journal created in the previous step; an account_id field with a value of the clearing account_id, which is recorded in the Ledger Transaction Database by the Central Clearing Computer System; an asset_type field with the value of the asset_type from the deposit journal created in the previous step; and an amount field with a value of the inverse of the amount from the deposit journal created in the previous step.

At 752, in an alternative embodiment, whenever Postings are saved to the Transaction Database, the Clearing System may also save a snapshot record containing account balances, computed as the result of calling the getUnreservedBalance function for the account_id and asset_type specified in the new Postings.

At step 754, the Central Clearing System sends a Limit Increase Request Data message to the Trade Determination System 130 including journal account_id data, the journal amount, and the journal asset_type and instructs the Trade Determination System 130 to increase the trading limit for the cryptocurrency represented by the journal asset_type. Then, at step 756, the Trade Determination System 130 increases the trading limit by the requested amount. The Trade Determination System maintains a trading limit for each account, which it uses to permit or deny each order submitted by the Buyer or Seller computer systems. This refers to asking the Trade Determination System to modify that limit.

Alternatively, in one embodiment, the Trade Determination System 130 also handles outright spot trading, and is responsible for tracking cryptocurrency trading limits. Alternatively, although the above embodiment was described in terms of a Seller and Seller Computer, the above process may also be performed by the Buyer Computer System 105, following the same steps but replacing Seller with Buyer.

Alternatively, at step 760, in the alternative embodiment of the combined deposit/reserve process, the Central Clearing System receives the deposit address record and the deposit journal record and the Central Clearing System then retrieves positions from Ledger Transaction Database 155 that are identified by the deposit account_id and instrument_id.

At step 762, if no positions are found, then the process determines that there are no open positions and the system cannot deliver coins. Alternatively, if some positions are found, then the process proceeds to step 764. At step 764, if the number of positions is greater than zero, then the system determines that the position is long and the system cannot deliver coins.

Alternatively, if the positions are not greater than zero and are not empty, then the process proceeds to step 766 and the central clearing system determines the total number of coins that need delivery from the positions. As shown in the flowchart, the process sums for all identified positions the number of needed coins minus the number of coins already delivered. This comes from the formula shown in step 766, computed by adding up the sum of "qty—qty_delivered" from every position—positions are determined using the getPositions function as shown between step 760 and 762). and then identifies the result as the total_delivery.

At step 768, the process determines the number/quantity (qty) of coins to reserve for delivery as the lesser of the journal amount and the total_delivery calculated in the previous step.

Finally, at step 770, the process automatically reserves coins for the account_id and instrument_id by following the "Reserve Coins for Delivery" Process starting from (O), providing account_id and instrument_id from DepositAddress and the quantity as determined above. The automatic reservation is provided by the generation of request data including: an account_id field representing the deposit account_id; an instrument_id field representing the deposit account instrument_id; and a qty field representing the qty value as determined above.

Figure 8A:
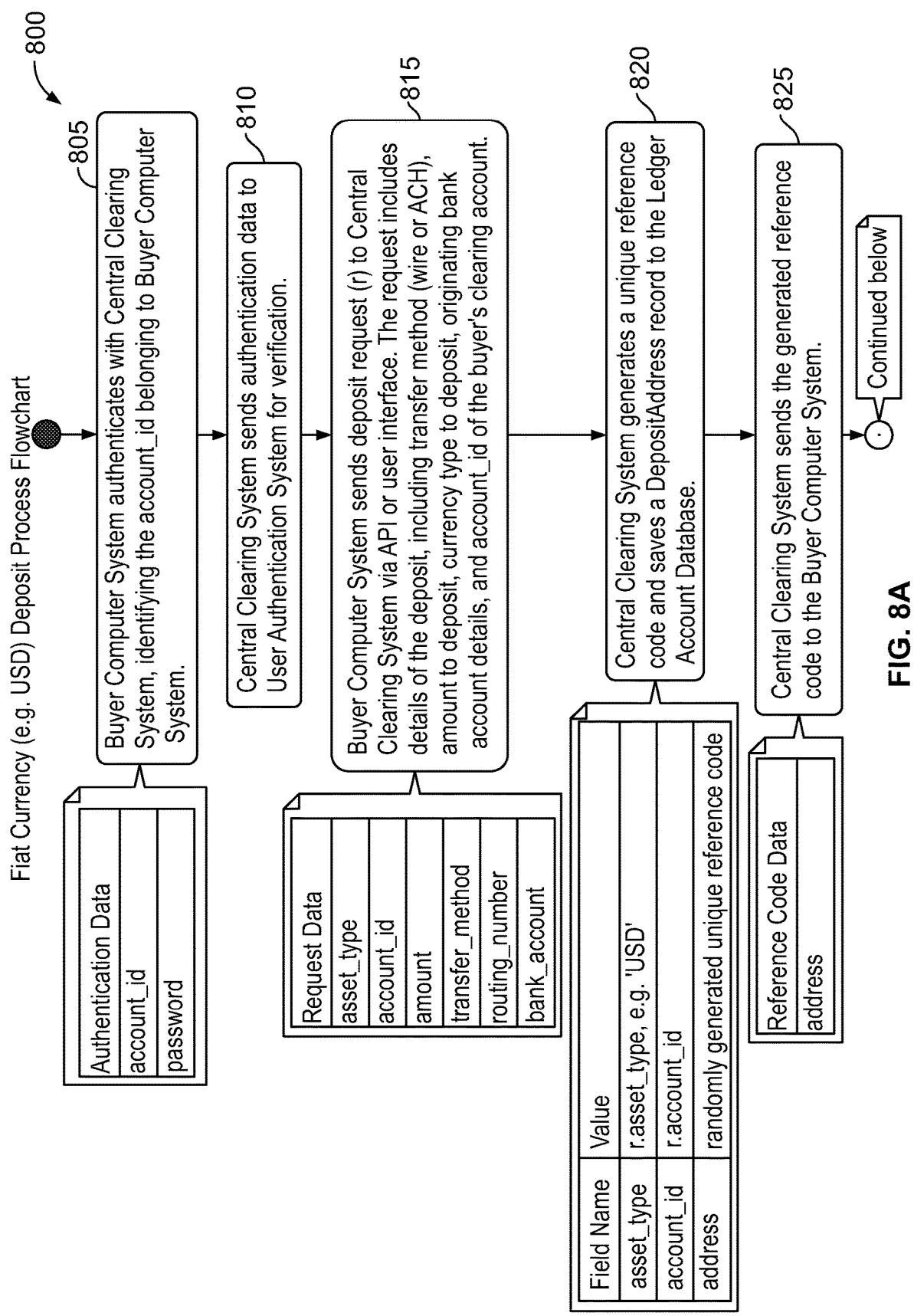
FIGS. 8A, 8B, and 8C illustrate a Fiat Currency Deposit Process Flowchart for depositing fiat currency (e.g. USD) into the clearing system according to embodiments of the present invention.
Figure 8B:
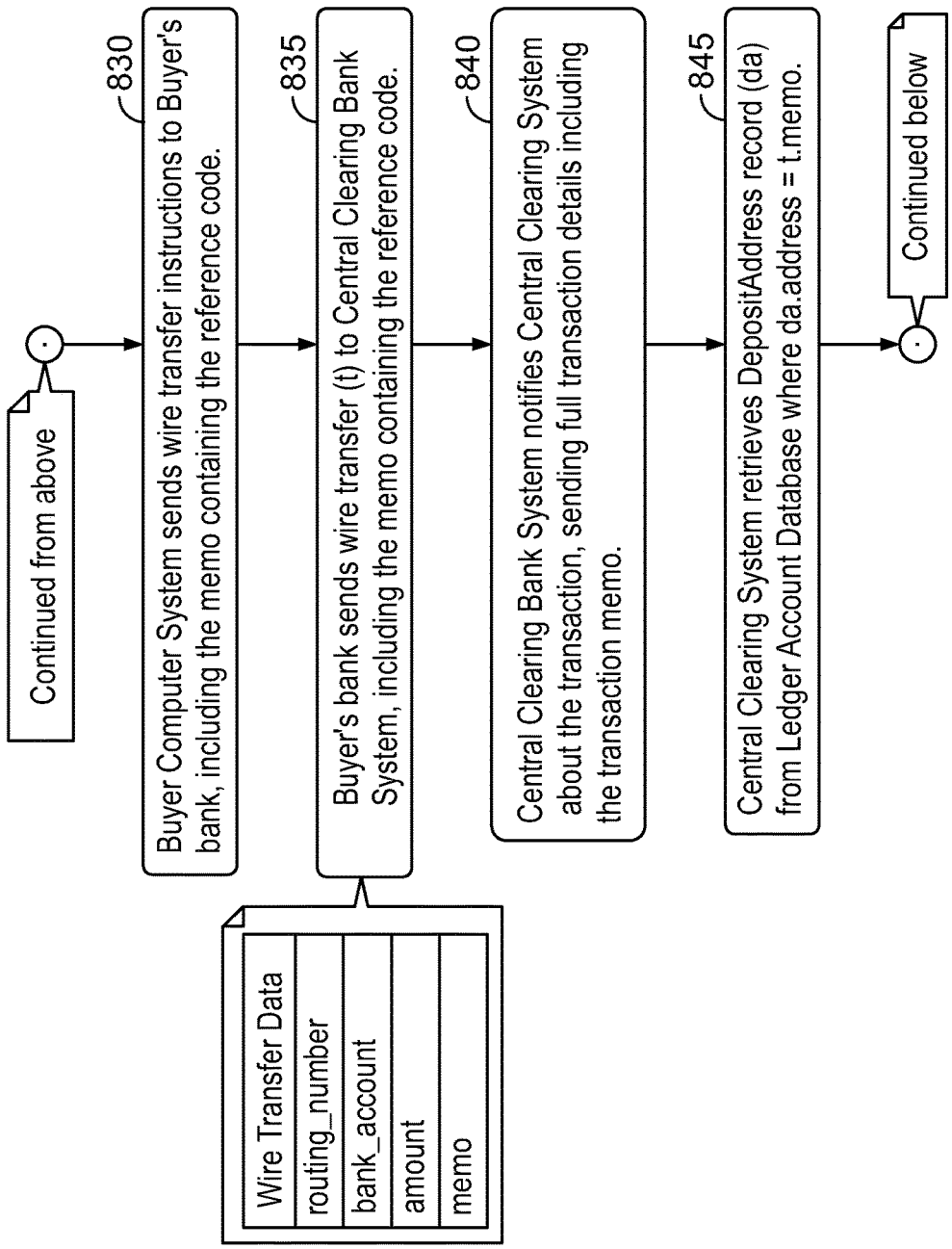
Figure 8C:
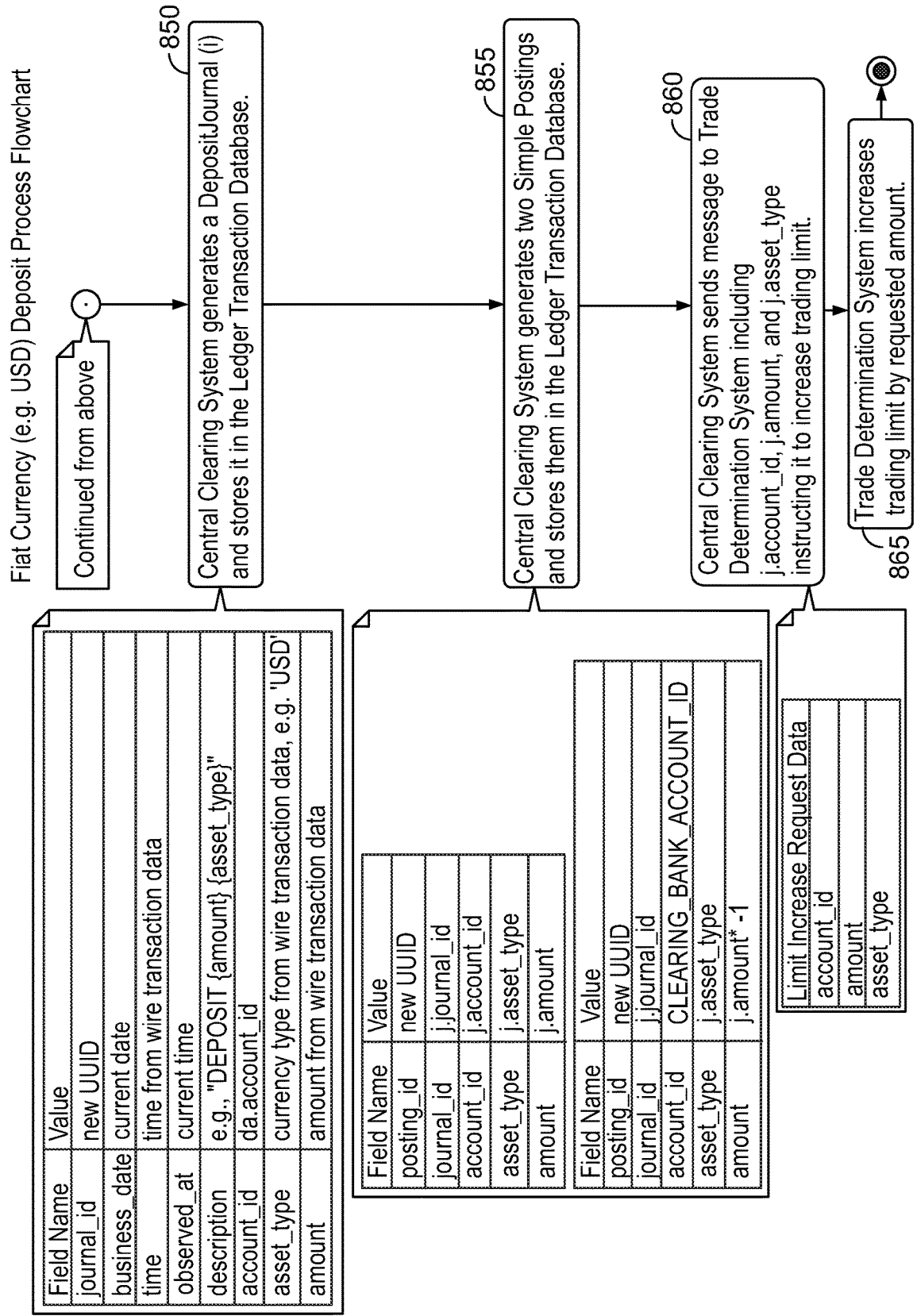
Figure 9A:
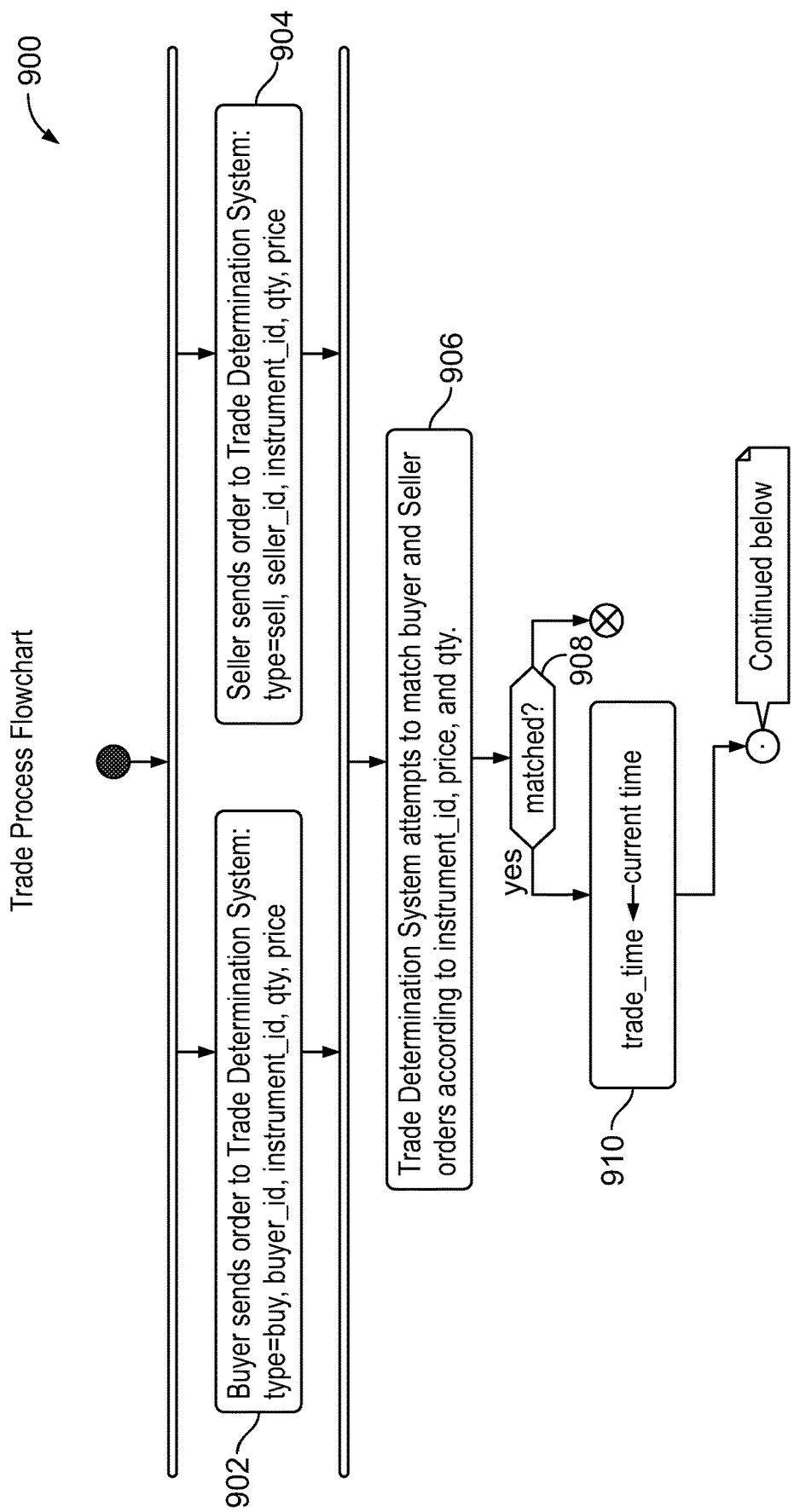
FIGS. 9A, 9B, 9C, 9D, 9E, 9F, 9G, 9H, 9I, 9J, and 9K illustrate a Trade Process Flowchart for trading blockchain-enabled electronic futures with optional computerized delivery of cryptocurrency, according to an embodiment of the present invention.
Figure 9B:
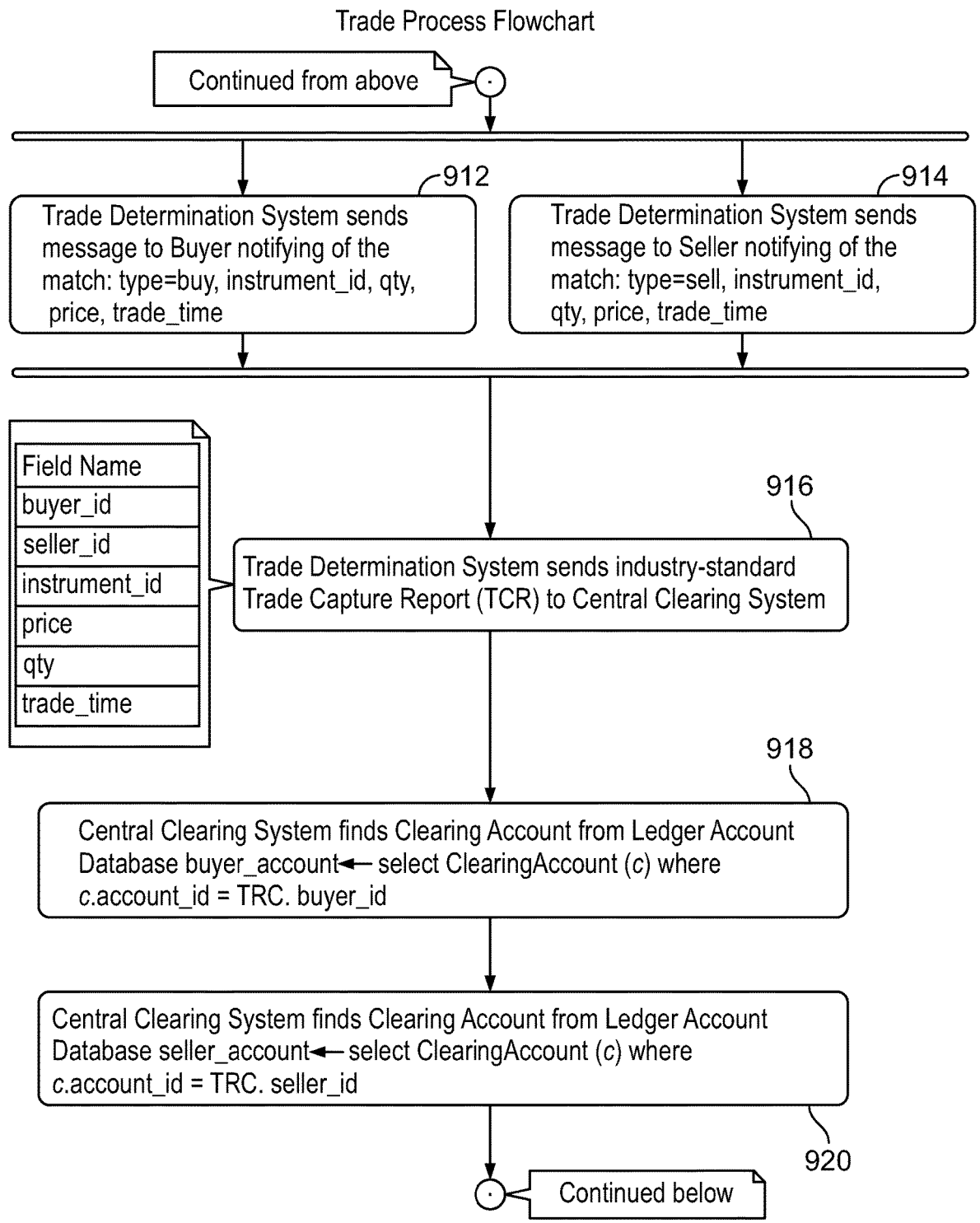
Figure 9C:
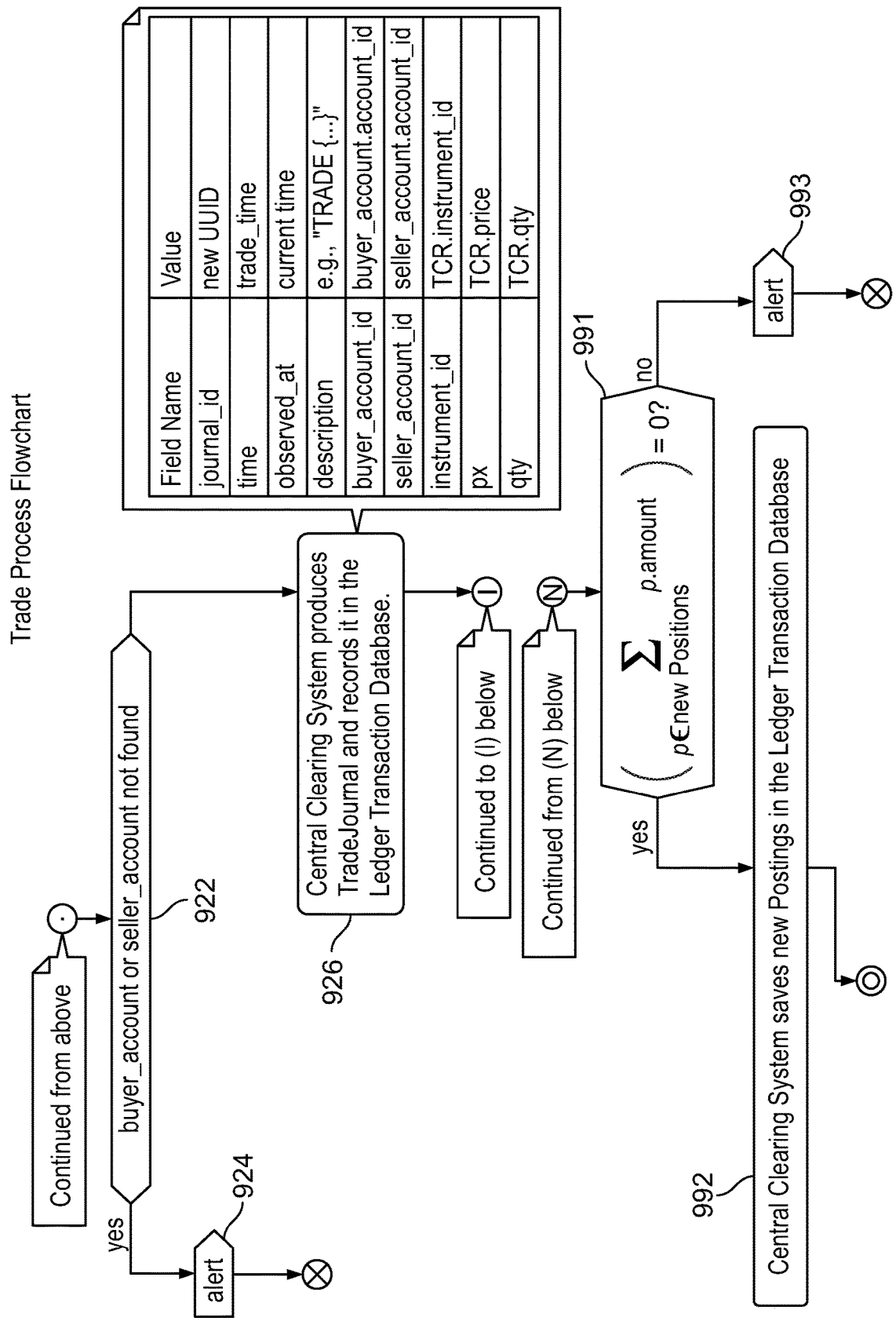
Figure 9D:
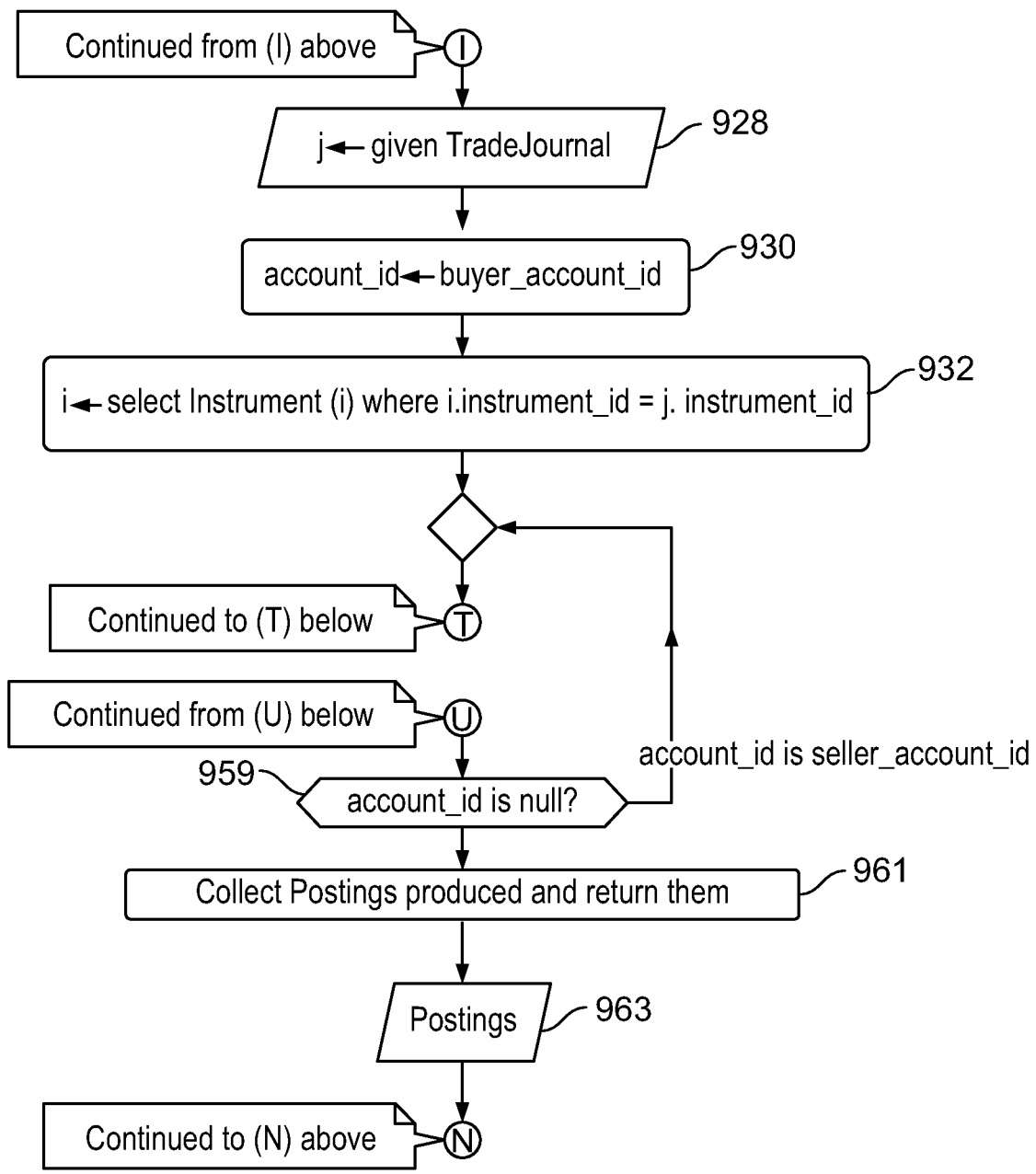
Figure 9E:
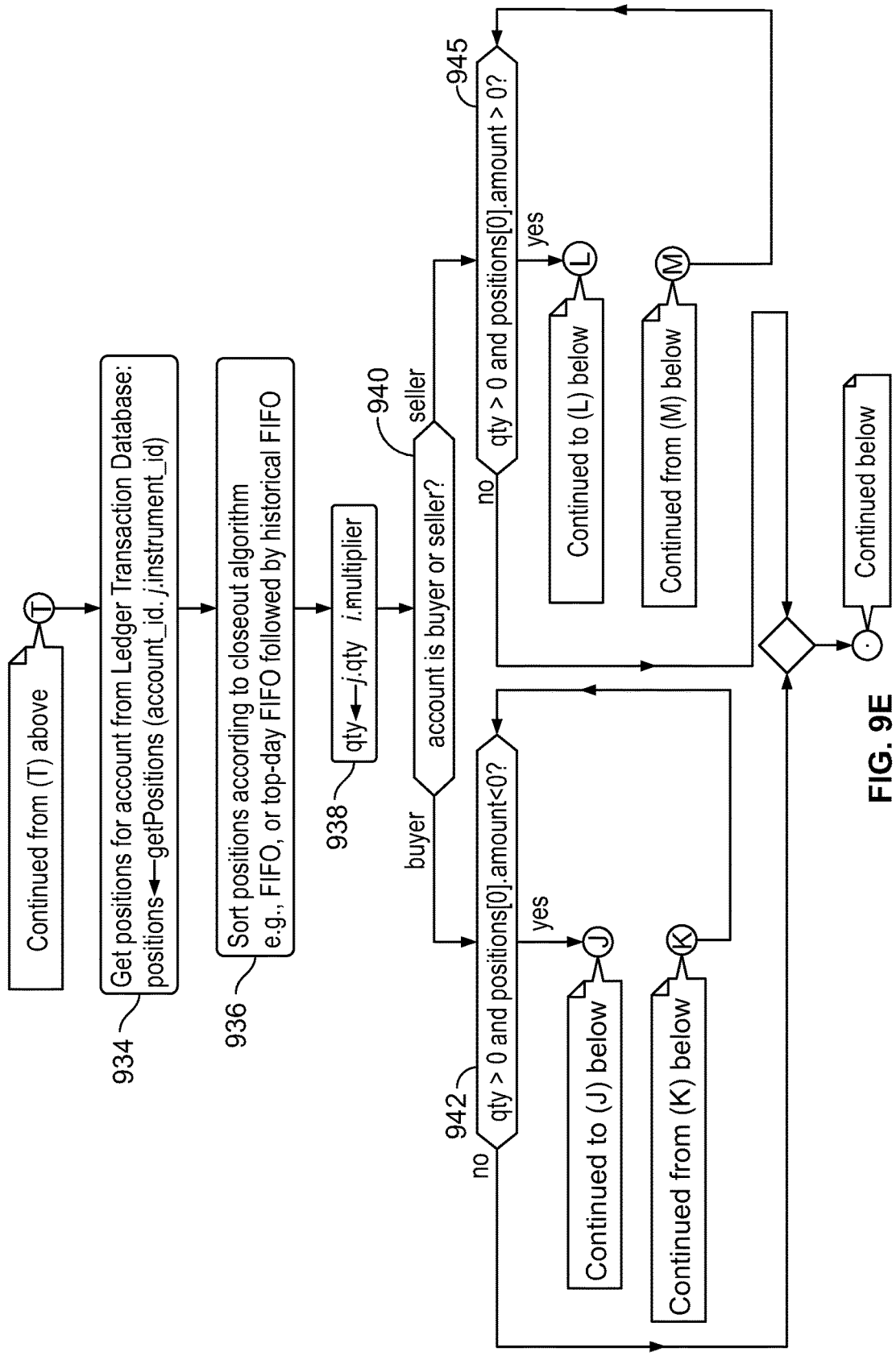
Figure 9F:
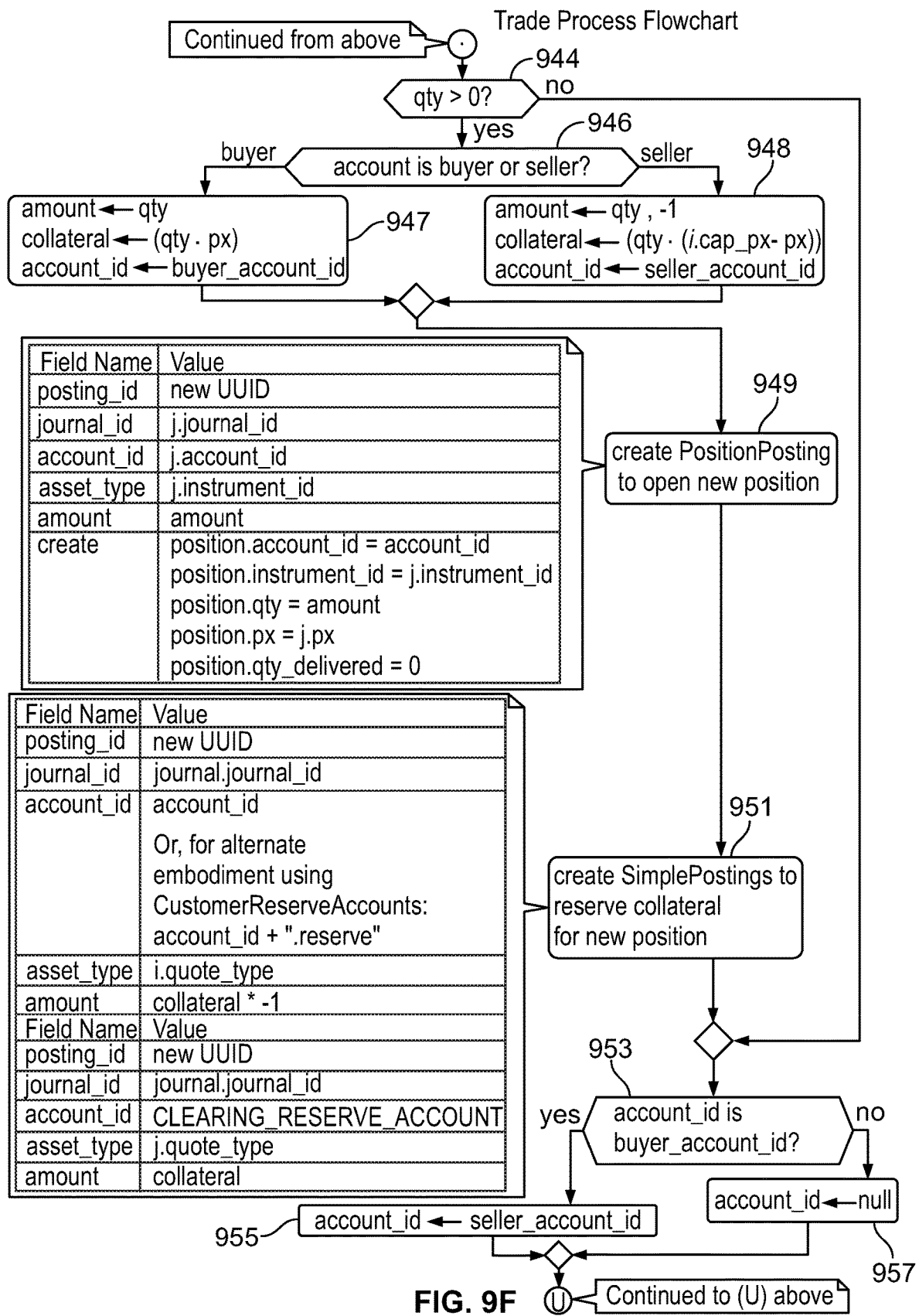
Figure 9G:
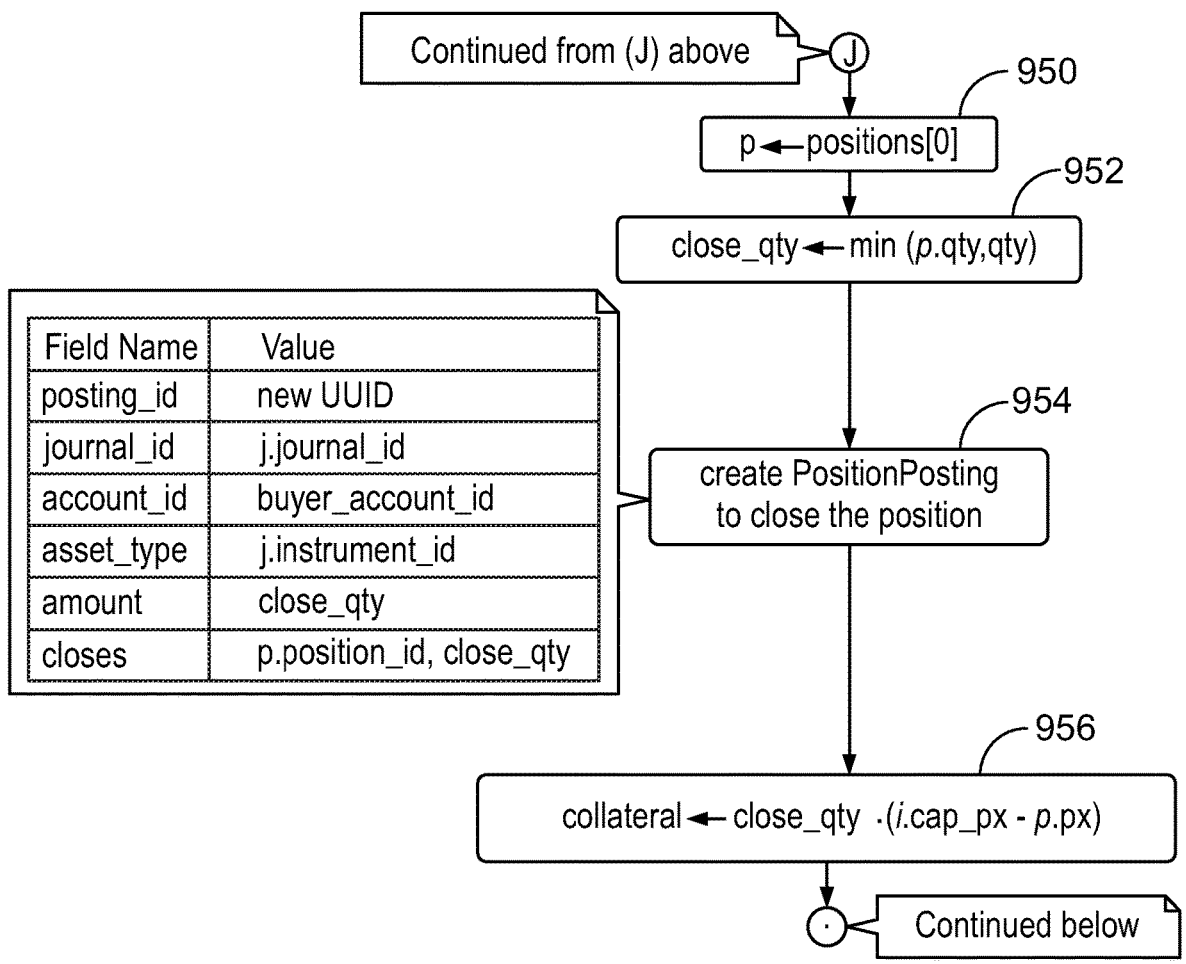
Figure 9H:
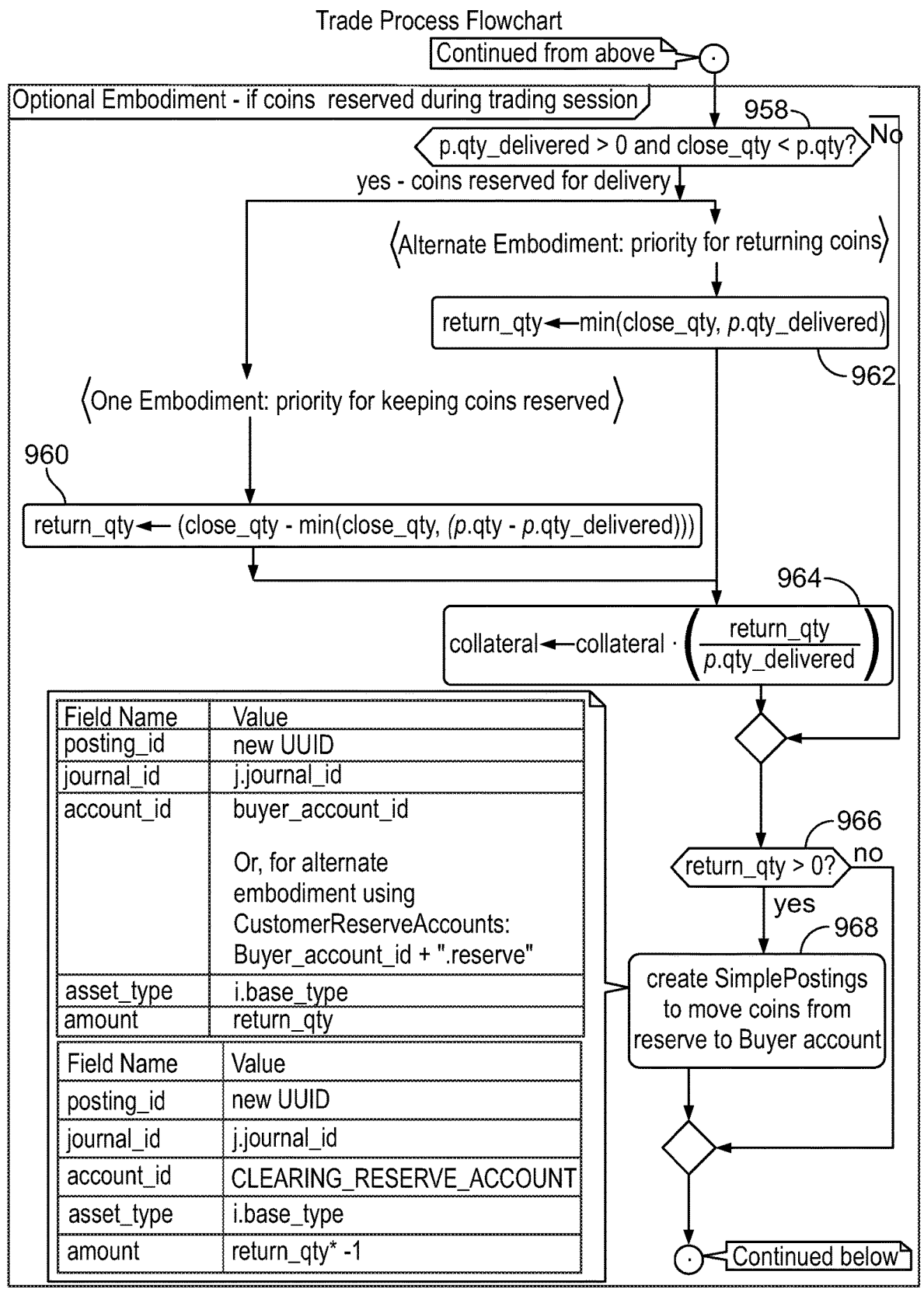
Figure 9I:
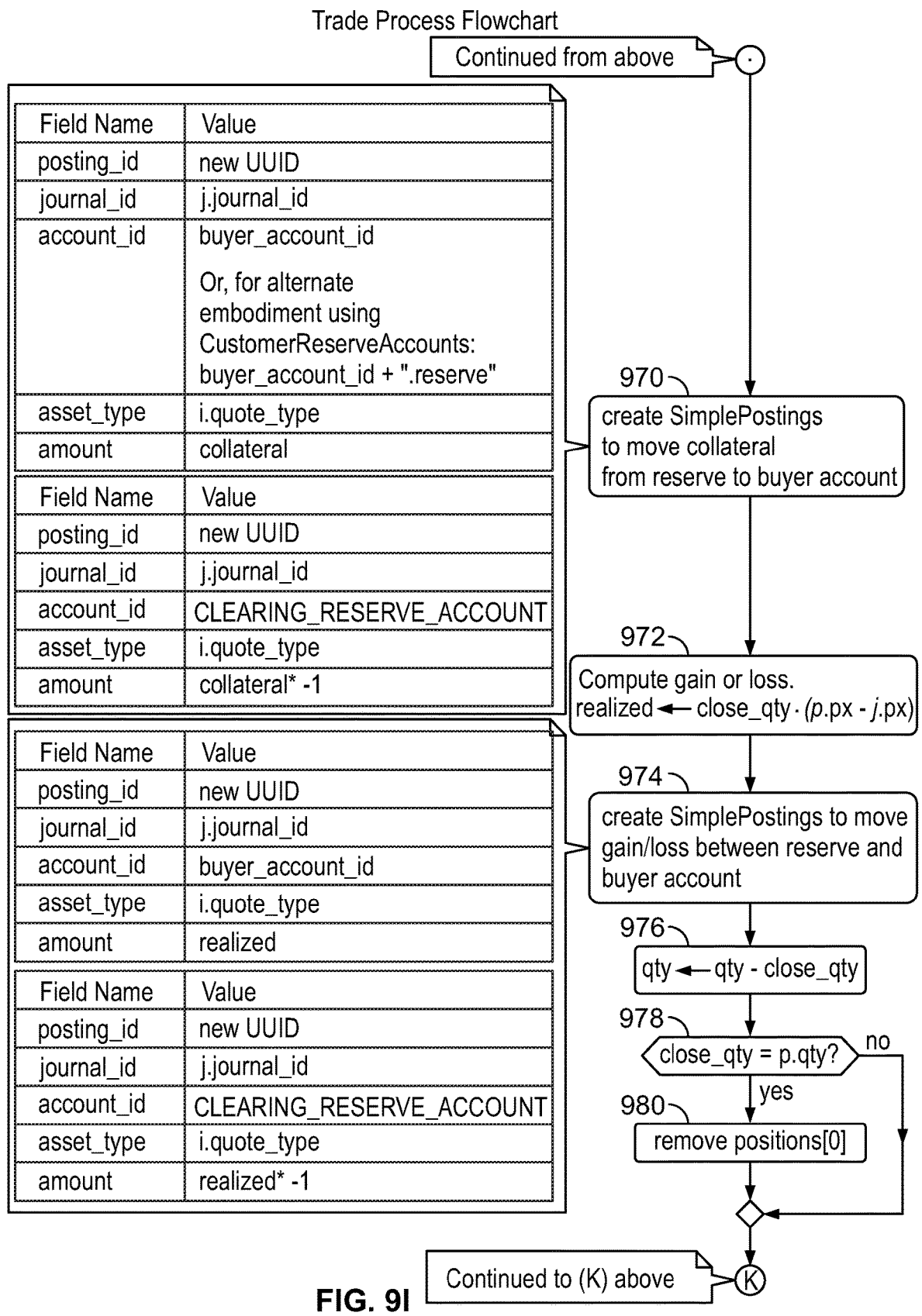
Figure 9J:
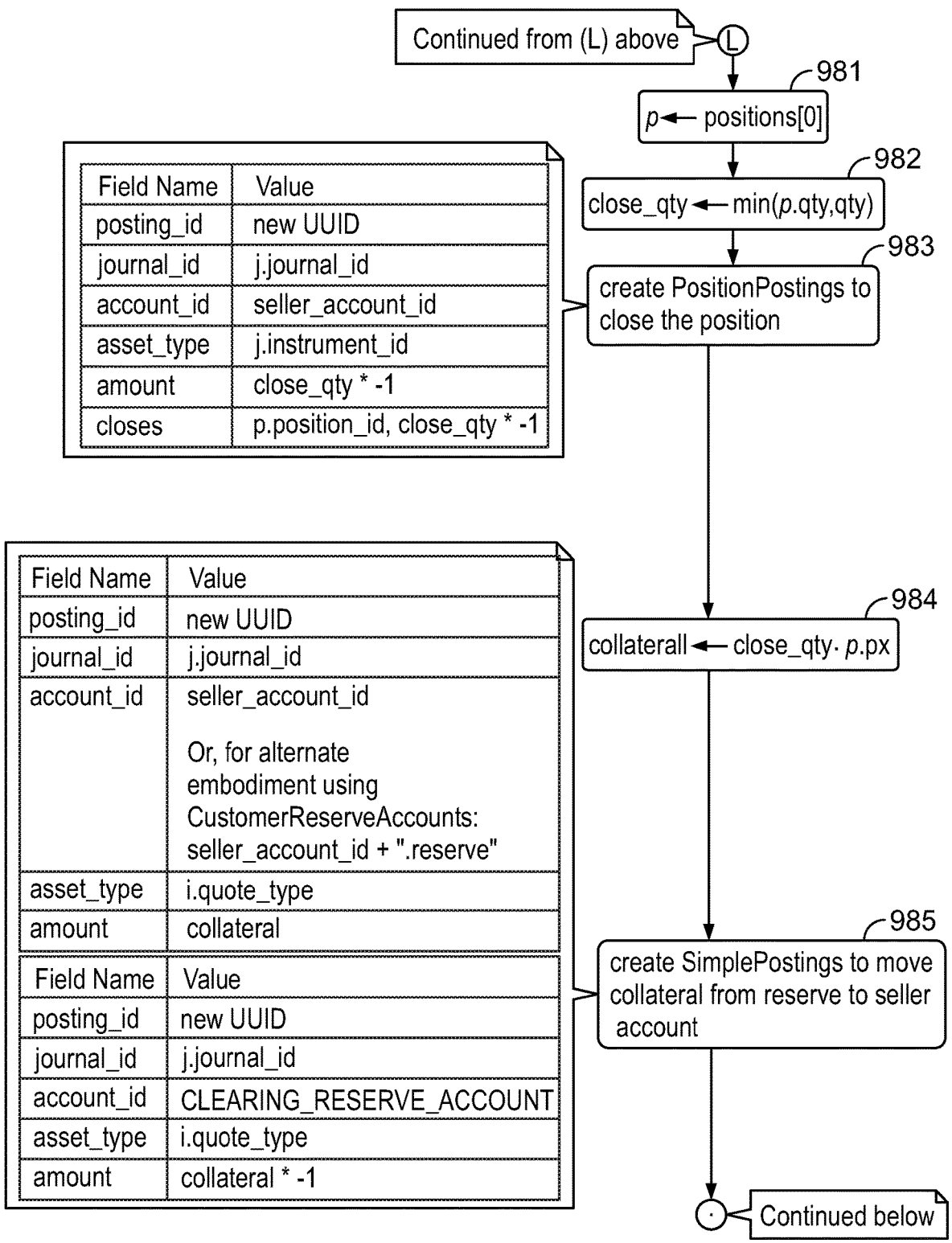
Figure 9K:
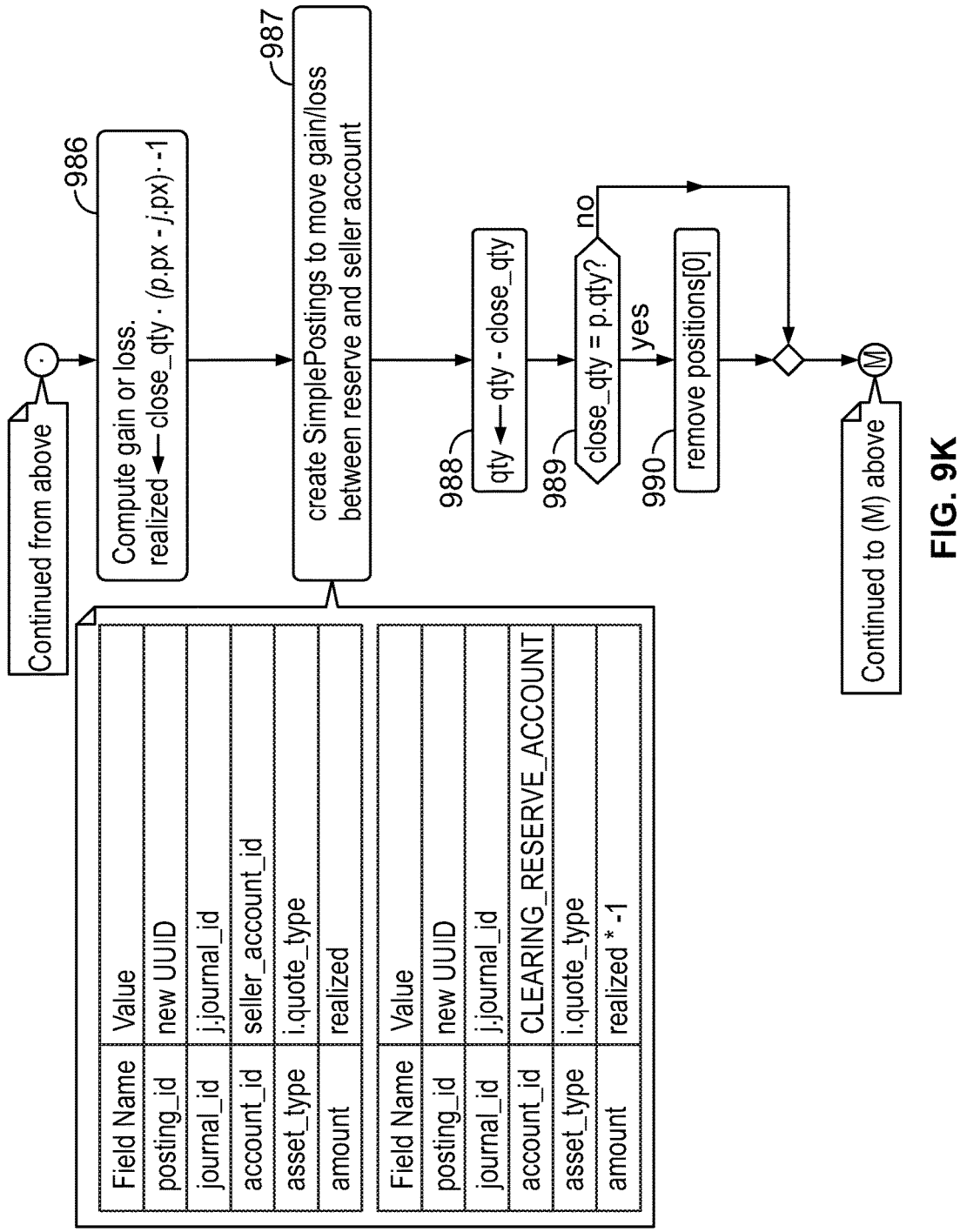
Figure 10A:
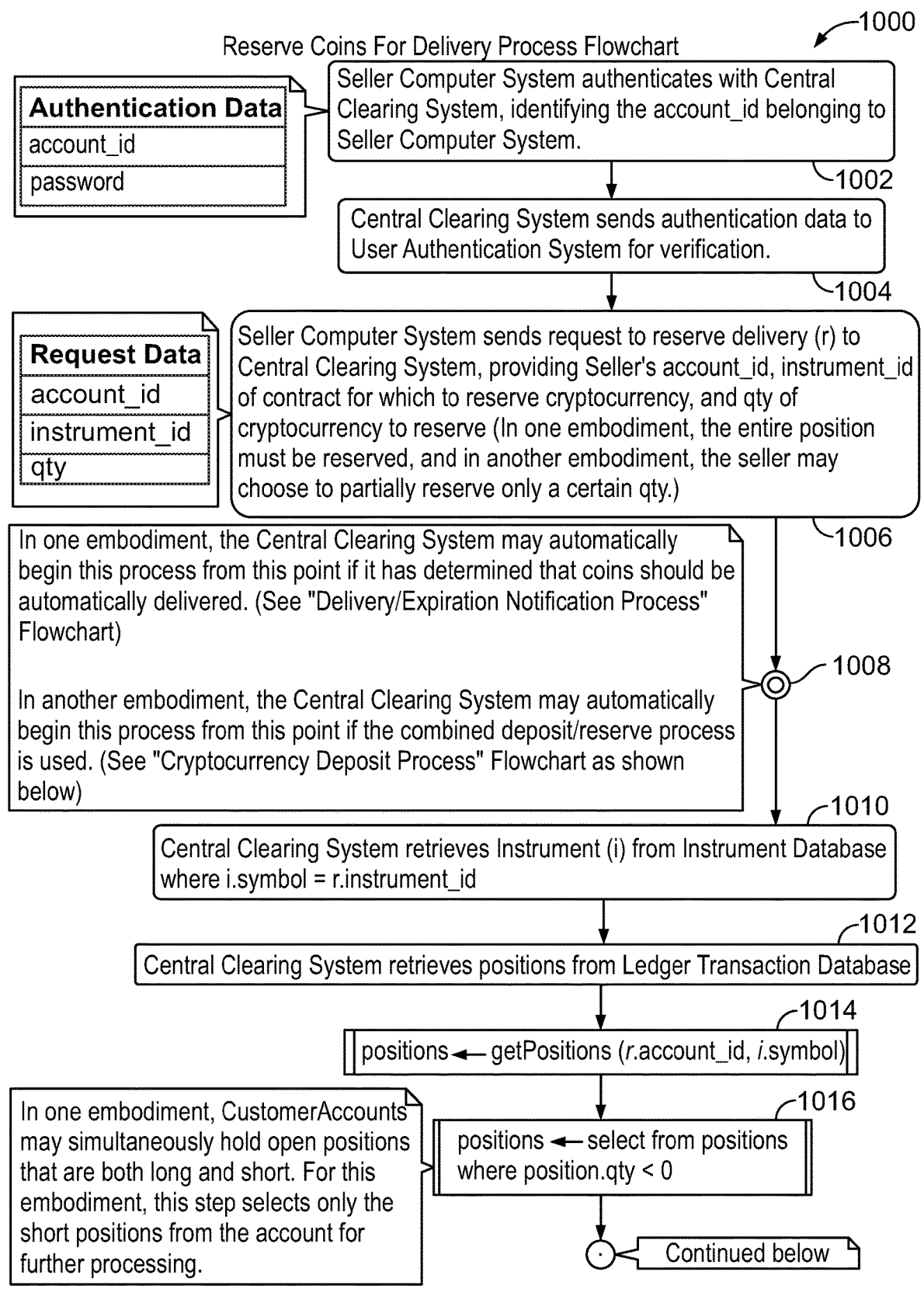
FIGS. 10A, 10B, 10C, and 10D illustrate a Reserve Coins For Delivery Process Flowchart for reserving cryptocurrency in the present system according to embodiments of the present invention.
Figure 10B:
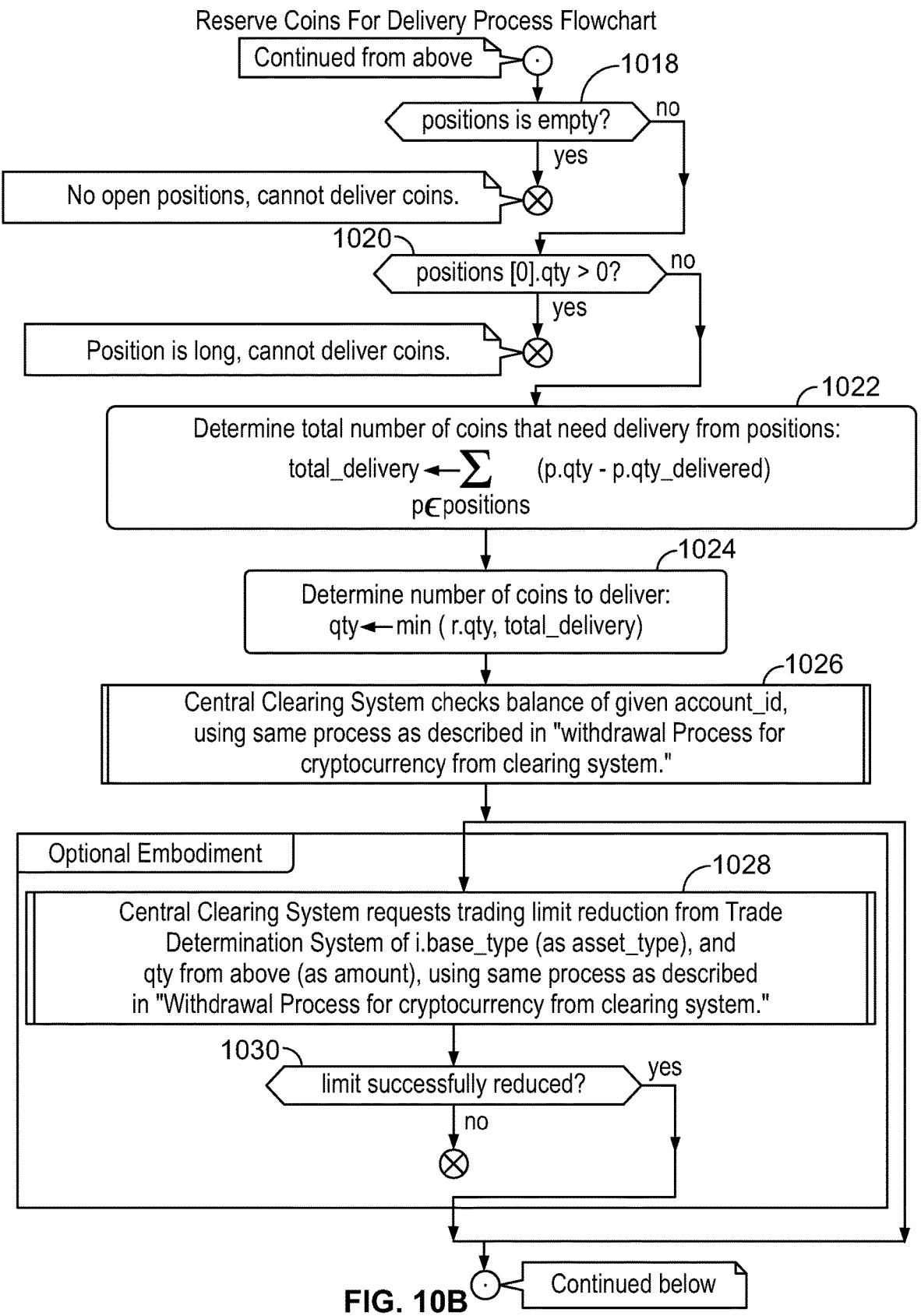
Figure 10C:
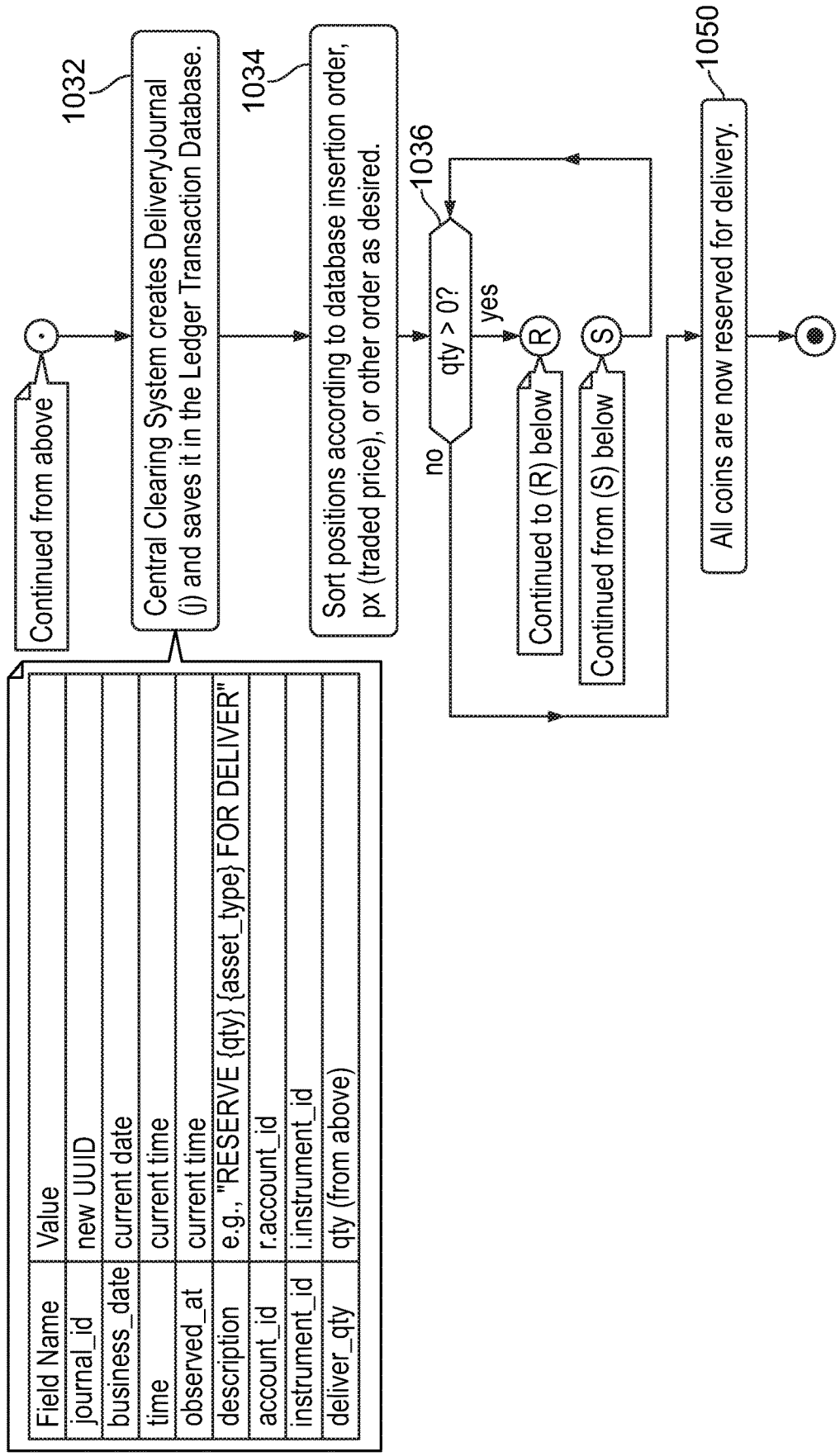
Figure 10D:
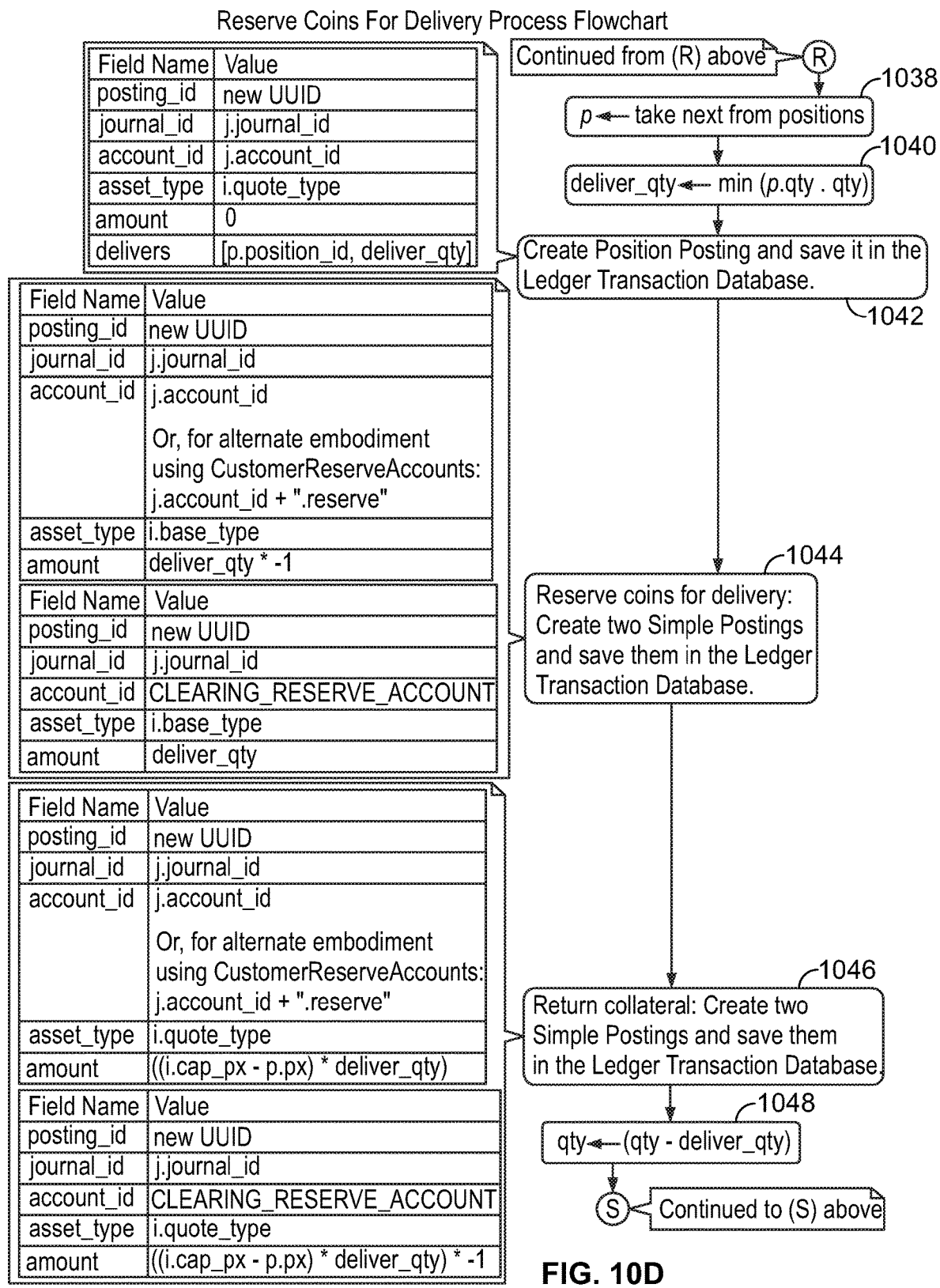
Figure 11A:
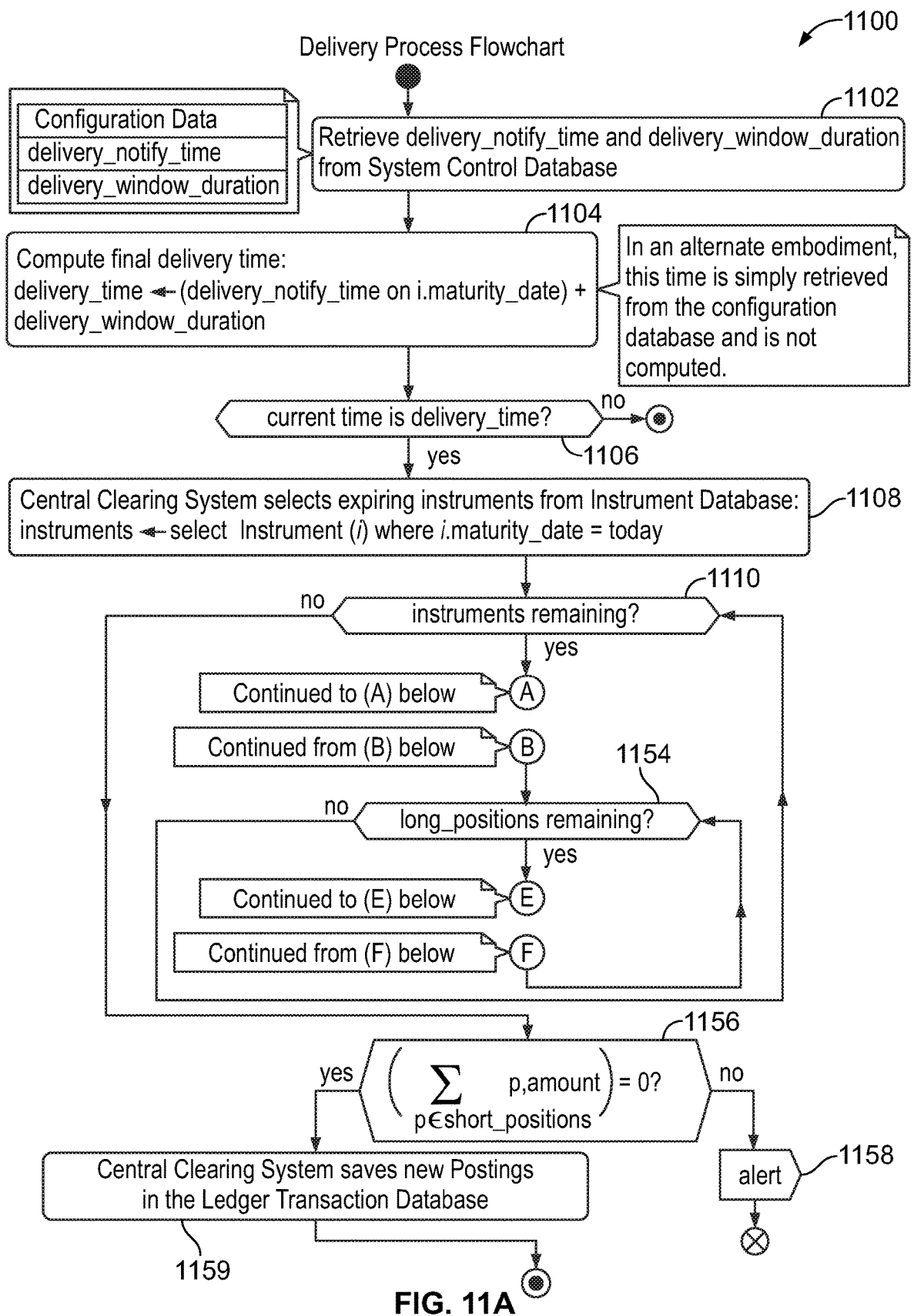
FIGS. 11A, 11B, 11C, 11D, 11E, 11F, 11G, and 11H illustrate a Delivery Process Flowchart for automated computerized delivery of cryptocurrency according to embodiments of the present invention.
Figure 11B:
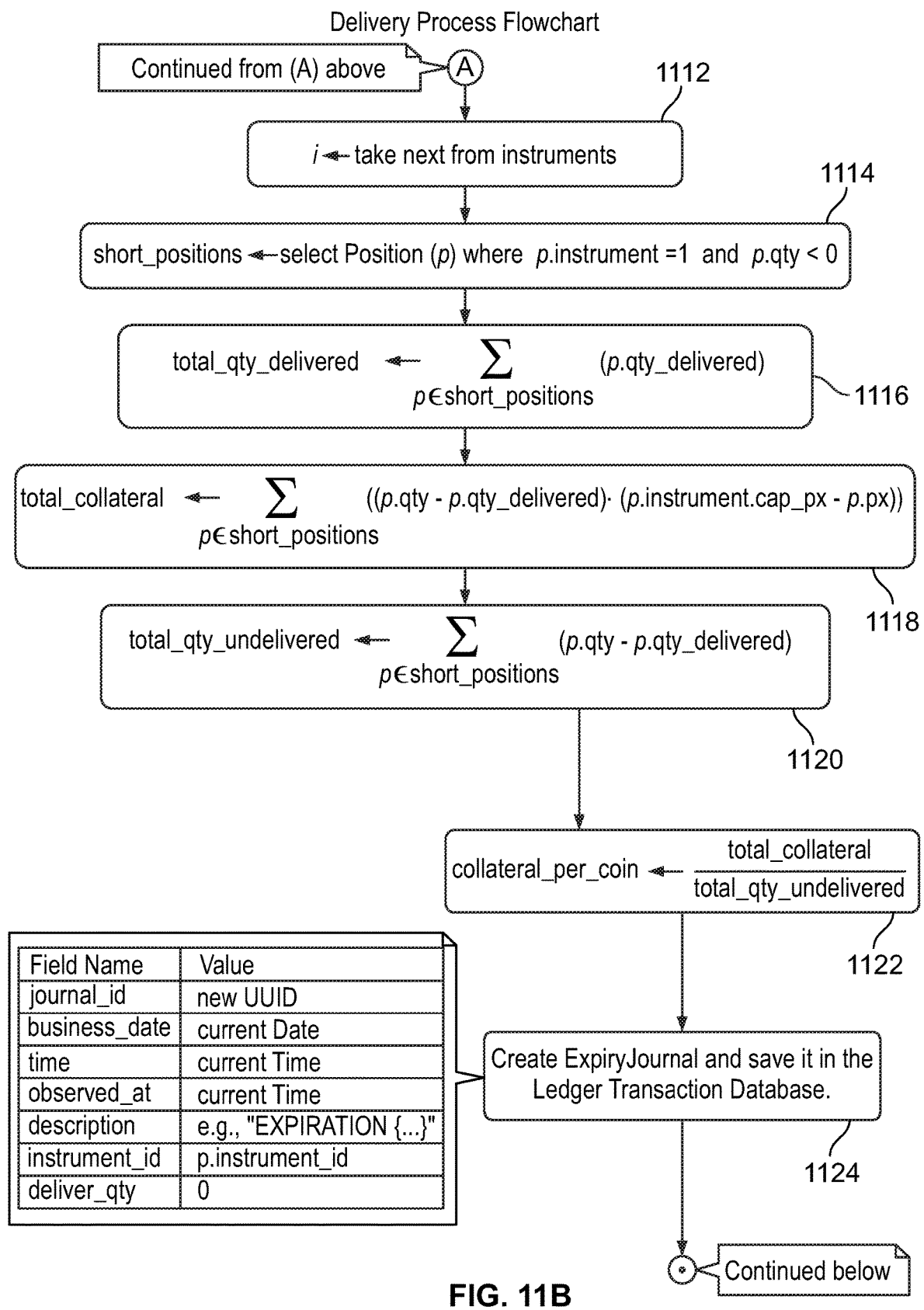
Figure 11C:
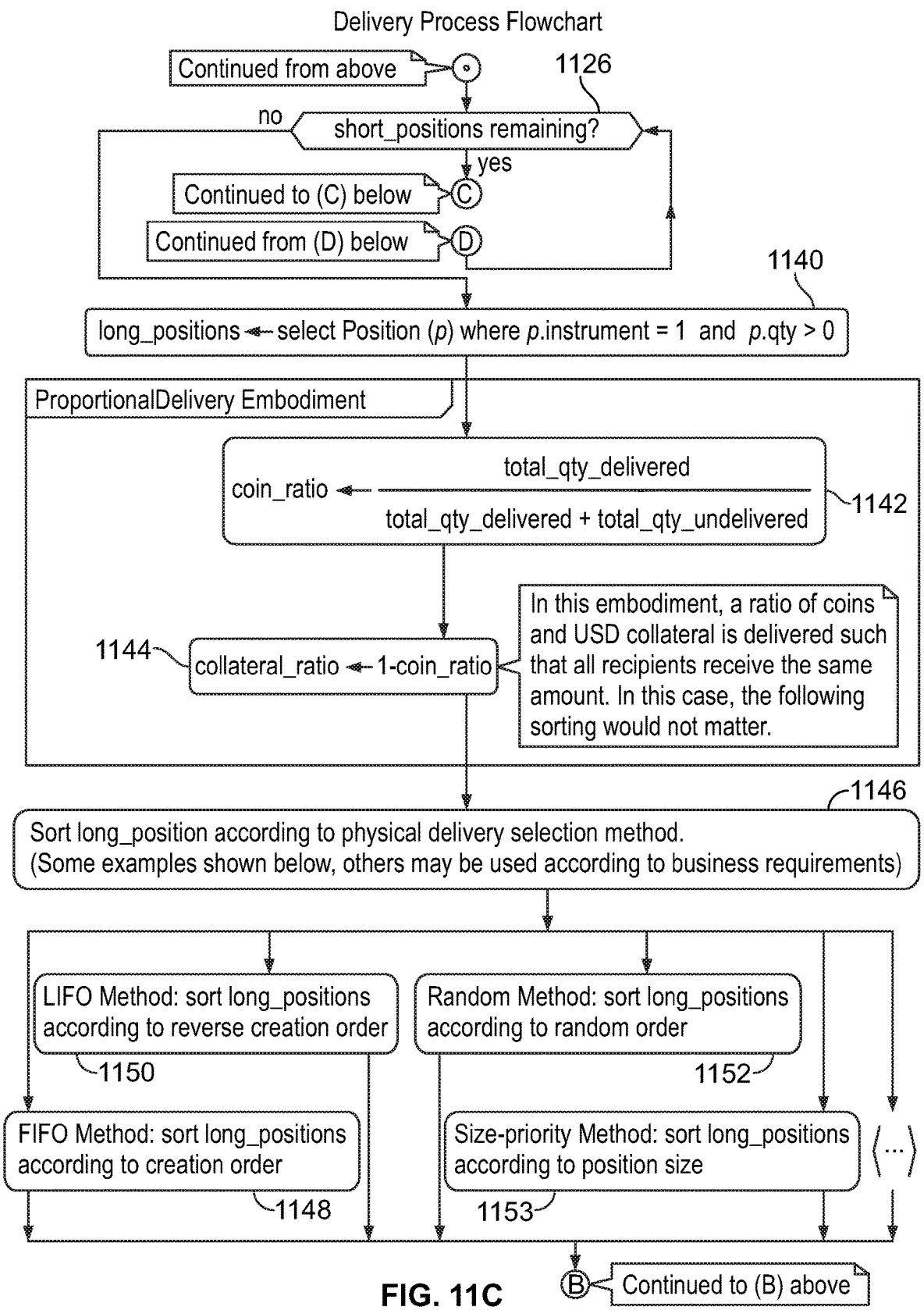
Figure 11D:
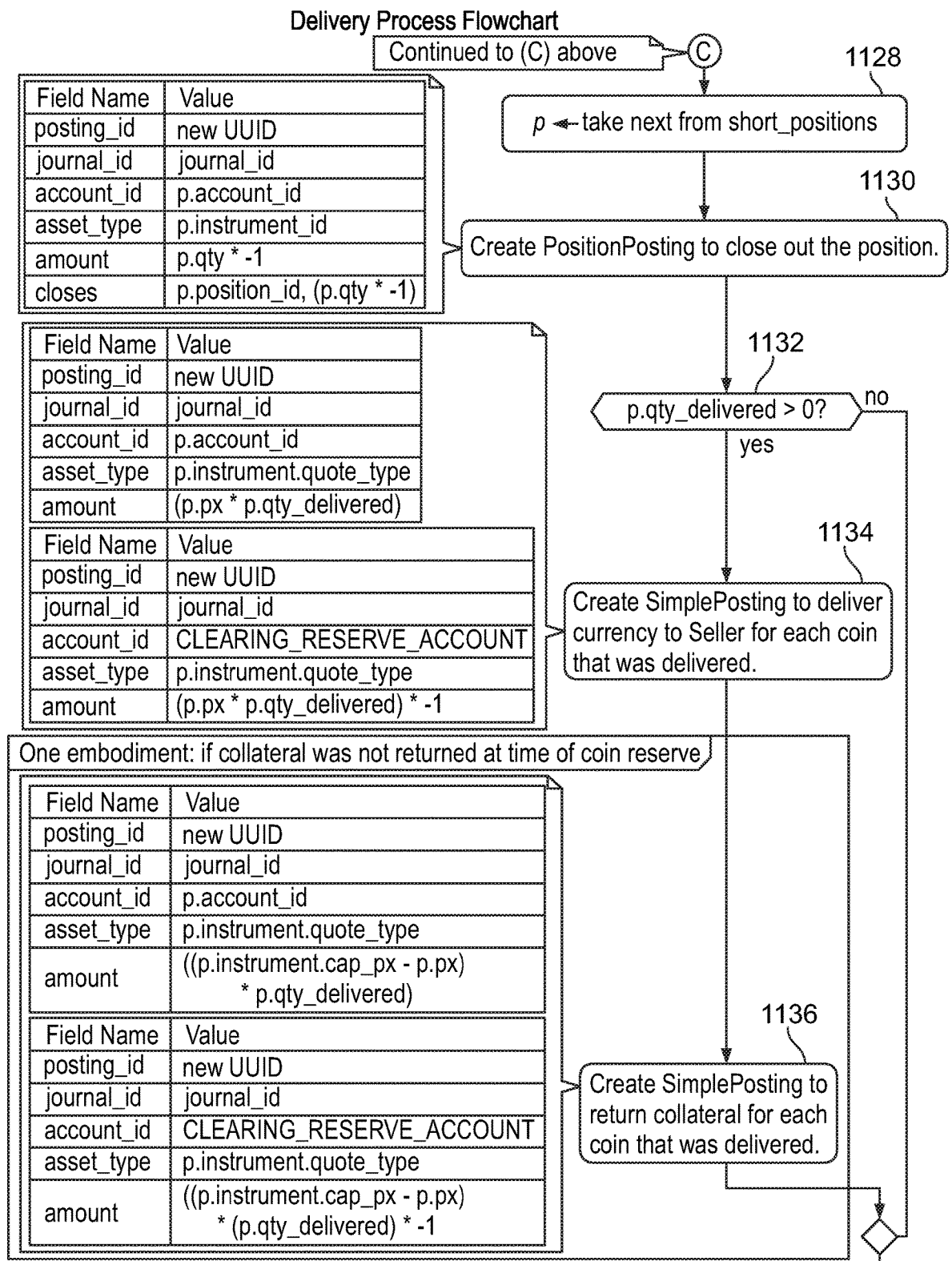
Figure 11E:
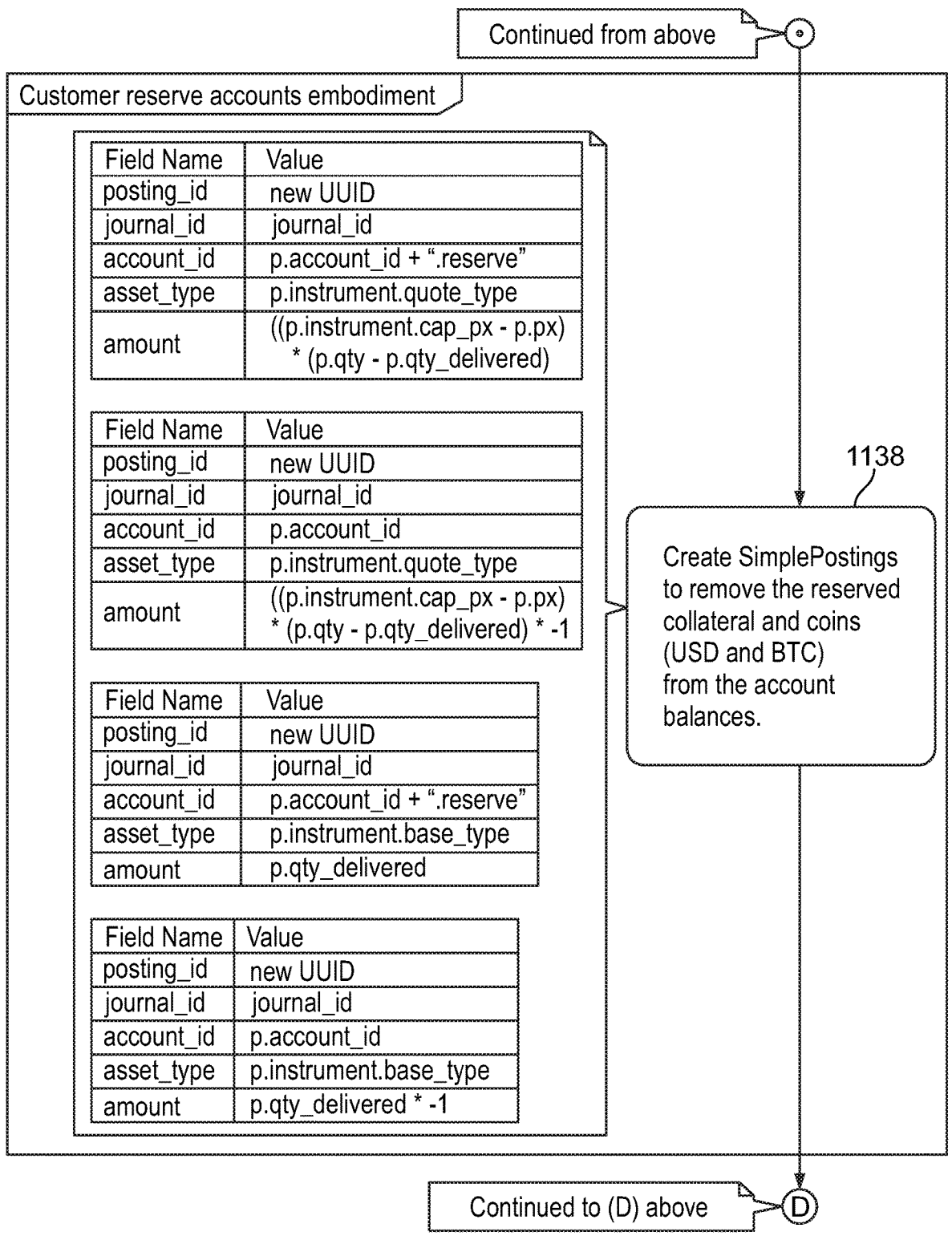
Figure 11F:
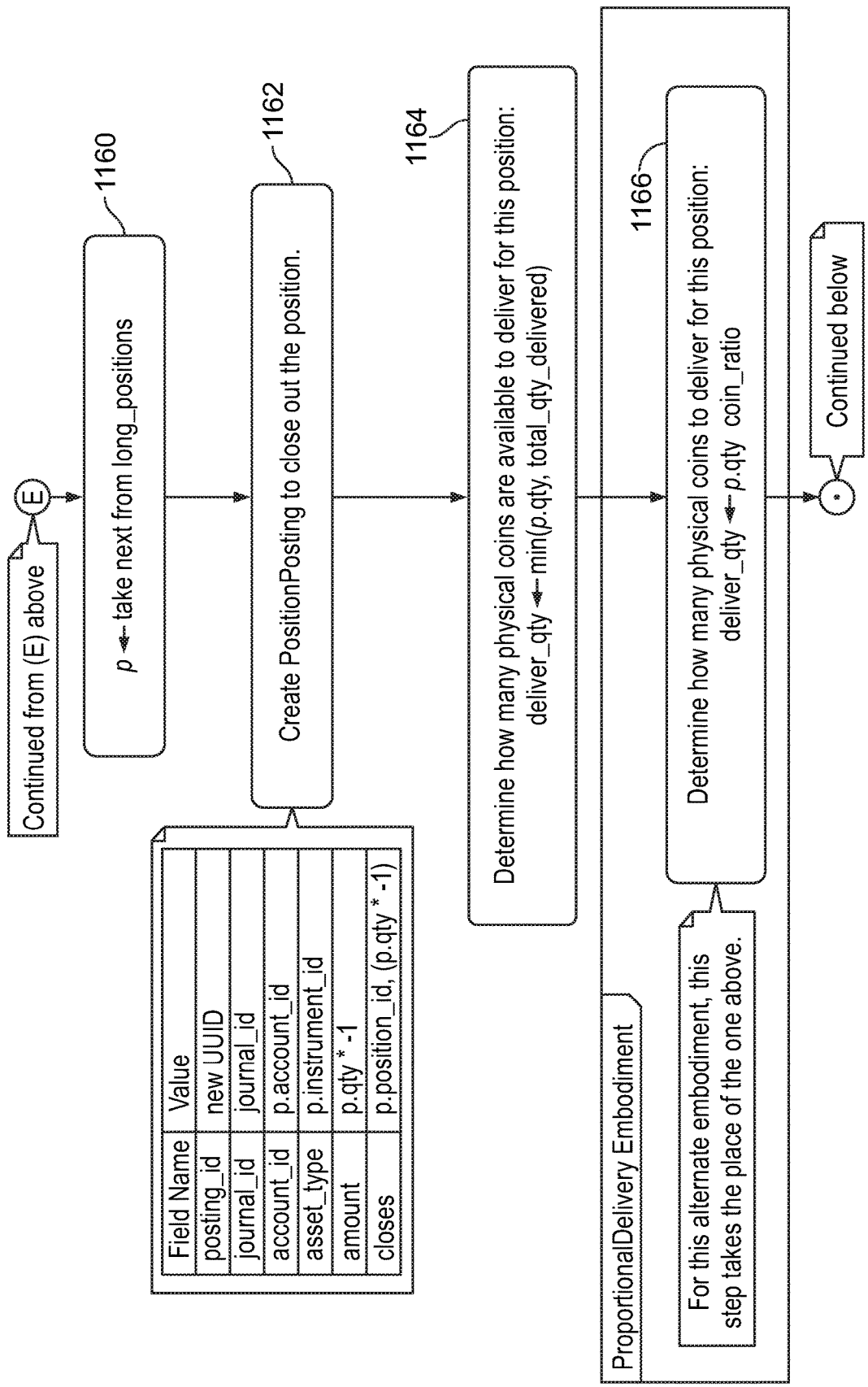
Figure 11G:
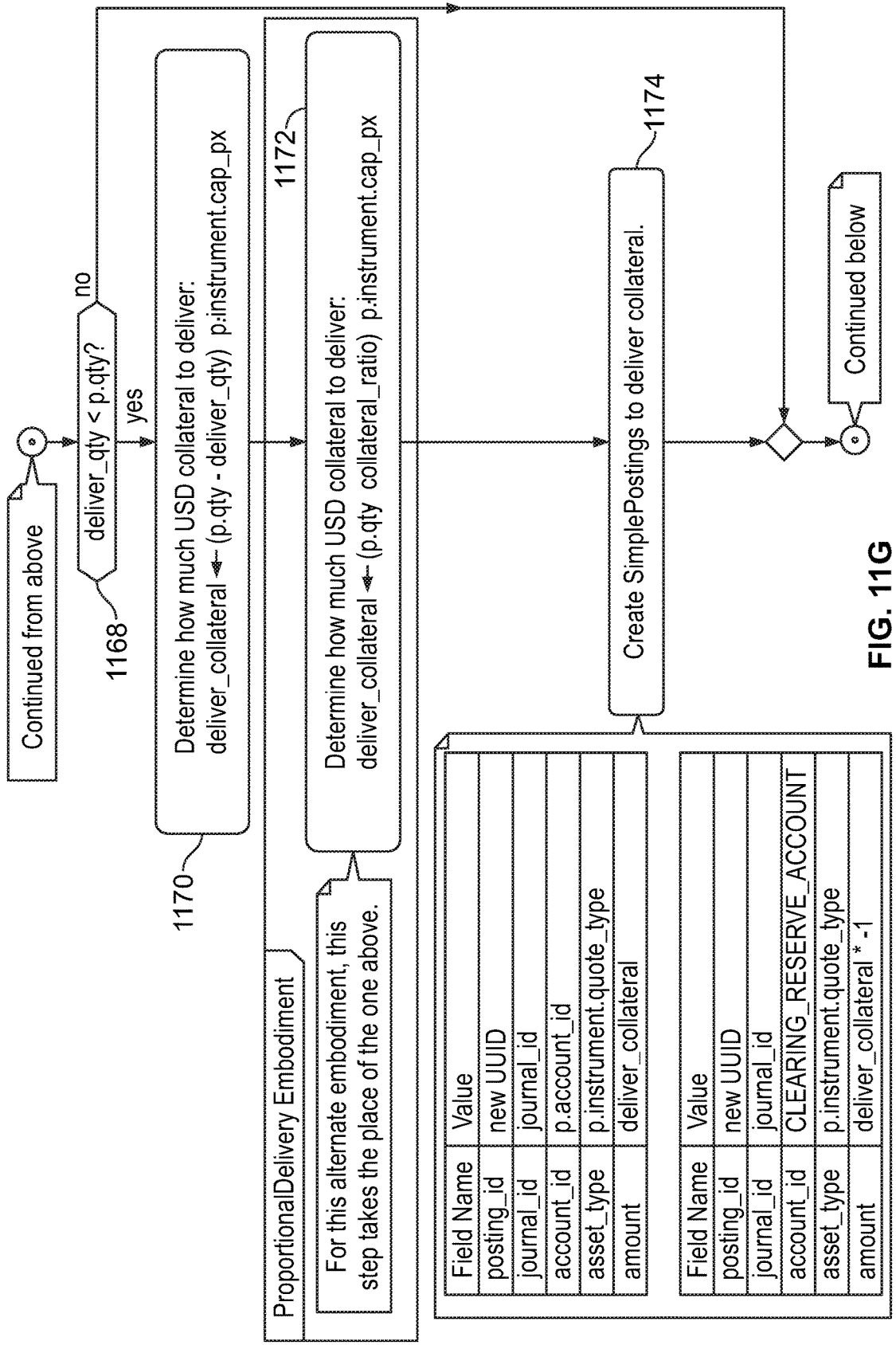
Figure 11H:
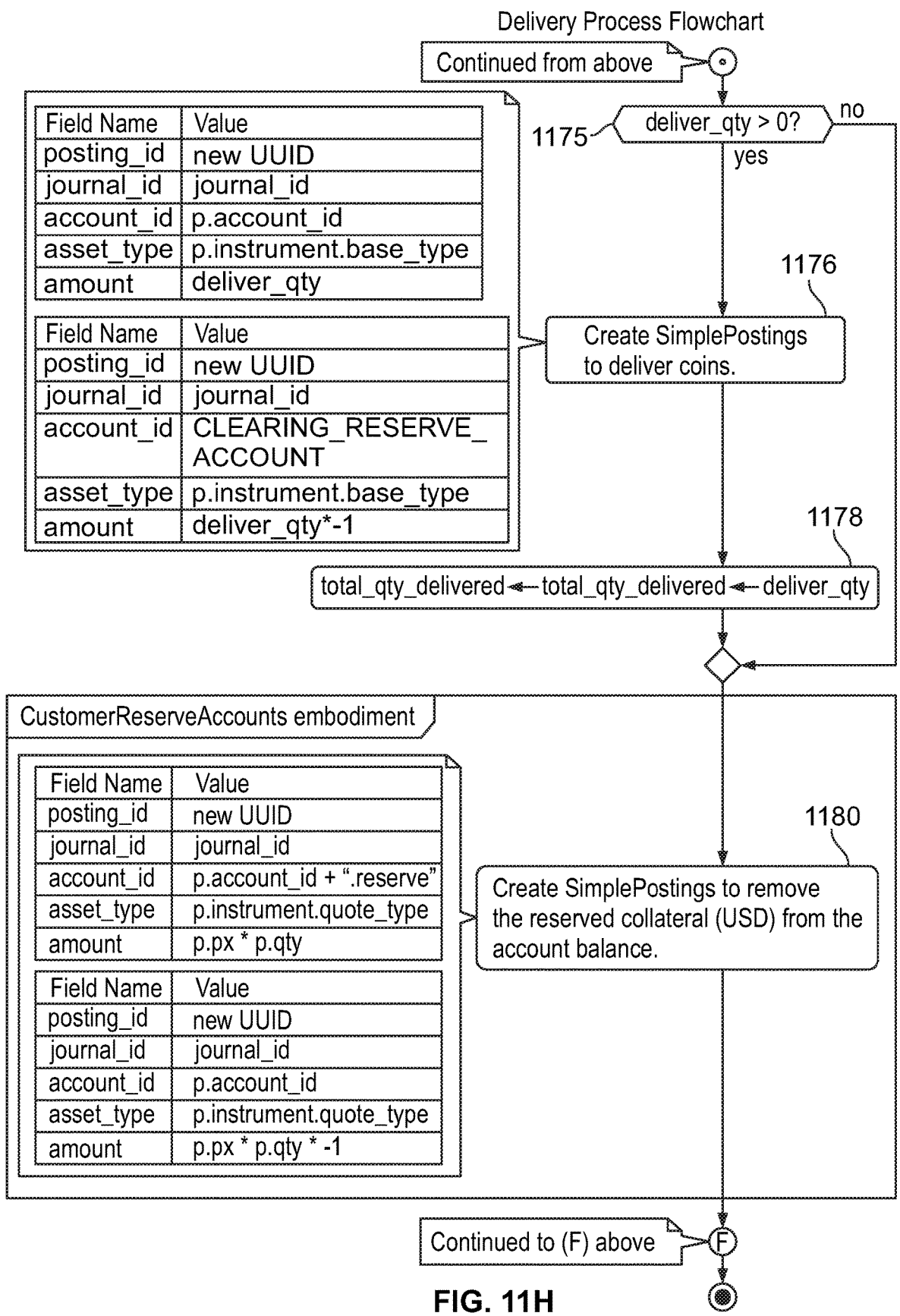

FIGS. 8A, 8B, and 8C illustrate a Fiat Currency Deposit Process Flowchart 800 for depositing fiat currency (e.g. USD) into the clearing system according to embodiments of the present invention.

First, at step 805, the Buyer Computer System 105 sends a deposit request to Central Clearing System via API or user interface. The deposit request includes details of the deposit, including transfer method (wire or ACH), amount to deposit, currency type to deposit, originating bank account details, and account_id of the Buyer's clearing account. As shown in the flowchart, the central clearing system receives authentication data including an account_id and password from the Buyer Computer System 105.

Next, at step 810, the central clearing system sends the authentication data to the authentication system for verification. The User Authentication System 135 verifies the authentication data by comparing the received authentication data with previously stored authentication data at the User Authentication System 135.

At step 815, the Buyer Computer System 105 sends a deposit request (r) to the Central Clearing System using an API or user interface. The deposit request includes details of the deposit received from the Buyer Computer System 105, including transfer method (wire or ACH), amount to deposit, currency type to deposit, originating bank account details, and account_id of the Buyer's clearing account.

Next, at step 820, the Central Clearing System generates a unique reference code and saves a DepositAddress record. The Deposit address record includes: an asset_type field that stores data representing the asset_type identified by the buyer such as USD, an account_id field storing data representing the buyer's account_id at the clearing account; and an address field storing data representing a randomly generated unique reference code.

At step 825, the Central Clearing System sends the generated reference code data including the random address to the Buyer Computer System 105. At step 830, the Buyer Computer System 105 initiates wire transfer with the buyer's own institution, putting the reference code into the wire transfer memo. In another embodiment, the Central Clearing System sends a wire transfer request to the Central Clearing Bank System 125 in order to initiate the wire transfer automatically.

At step 835, Buyer's Bank sends wire transfer (t) to Central Clearing Bank System 125, including the memo containing the reference code. As shown in the flowchart, wire transfer data includes a routing number, a bank account, an amount, and a memo field.

Next, at step 840, the Central Clearing Bank System 125 notifies the Central Clearing System about the transaction, sending full transaction details including the transaction memo and/or wire transfer data. At step 845, using the reference code contained in the memo field of the wire transfer data, the Ledger Account Database 150 identifies the deposit address record sharing the same address as the memo and returns it to the central clearing system.

Then, at step 850, the Central Clearing System generates a DepositJournal record and stores it in the ledger transaction database. The DepositJournal record includes: a journal_id field with a value of a new unique identifier UUID; a business_date field with a value of the current date; a time field with a value of the time from the wire transaction data; an observed_at field with a value of the current time; a description field with a value of the deposit amount and/or asset_type; an account_id field with a value of the deposit account_id; and asset_type field with a value of the currency type from the wire transaction, such as U.S. dollars (USD), and an amount field with a value of the amount from the wire transaction data.

At step 855, the Central Clearing System generates two Simple Postings and stores them in the Ledger Transaction Database 155. As shown in the flowchart, the first simple posting includes: a posting_id field with a value of a new unique identifier (UUID); a journal_id field with a value of the journal_id from the deposit journal created in the previous step; an account_id field with a value of the deposit account_id; an asset_type field with the value of the asset_type from the deposit journal created in the previous step; and an amount field with a value of the amount from the deposit journal created in the previous step.

The second posting includes: a posting_id field with a value of a new unique identifier (UUID); a journal_id field with a value of the journal_id from the deposit journal created in the previous step; an account_id field with a value of the clearing bank account_id; an asset_type field with the value of the asset_type from the deposit journal created in the previous step; and an amount field with a value of the inverse of the amount from the deposit journal created in the previous step.

At step 850, the Central Clearing System sends a Limit Increase Request Data message to the Trade Determination System 130 including Journal account_id, Journal amount, and Journal asset_type, and instructs the Trade Determination System 130 to increase the trading limit. Finally, at step 865, the Trade Determination System 130 increases the trading limit by requested amount.

In other embodiments, other forms of payment or monetary transfer may be employed including ACH transfers and credit card payments. Alternatively, although the above embodiment was described in terms of a Buyer and Buyer Computer, the above process may also be performed by the Seller Computer System 110, following the same steps but replacing Buyer with Seller.

FIGS. 9A, 9B, 9C, 9D, 9E, 9F, 9G, 9H, 9I, 9J, and 9K illustrate a Trade Process Flowchart 900 for trading blockchain-enabled electronic futures with optional computerized delivery of cryptocurrency, according to an embodiment of the present invention. First, the trading process will be described in overview and then in a more detailed fashion with reference to the trade process flowchart 900.

As an overview, the trade process includes a plurality of steps: first, the Buyer sends order message (bid) to Trade Determination System 130 containing the buyer's account_id, instrument symbol, qty, and limit price.

Second, the Seller sends order message (offer) to Trade Determination System 130 containing the seller's account_id, instrument symbol, qty, and limit price.

Third, the Trade Determination System 130 attempts to match Buyer and Seller orders (bid and offer) according to instrument symbol, price, and qty. When a match is determined, the Trade Determination System 130 sends messages to the Buyer and Seller notifying them of the trade match.

Fourth, the Trade Determination System 130 sends an industry-standard Trade Capture Report to Central Clearing System for trade clearing. The Trade Capture Report contains all the details of the trade: buyer account_id, seller account_id, instrument symbol, price, quantity, trade time. In one embodiment, the Clearing Account ID is included directly in the Trade Capture Report message; in another embodiment, the user identity information is included in the Trade Capture Report message, and the Central Clearing System associates it with a Clearing Account by looking up the associated record in a database of users.

Fifth, the Central Clearing System converts the Trade Capture Report into a Trade Journal and records it within the system. (buyer account_id, seller account_id, instrument_id, px, qty are taken from the Trade Capture Report). In an alternate embodiment using separate TradeJournals for Buyers and Sellers, the Central Clearing System converts the Trade Capture Report into two Trade Journals, one for the Buyer account and one for the Seller account, and records them within the system. (buyer account_id, seller account_id, instrument_id, px, qty are taken from the Trade Capture Report).

Finally, the Central Clearing System converts the Trade Journal into a series of Postings, which create new positions and/or automatically close existing positions according to a FIFO algorithm. Other embodiments may instead use LIFO or other criteria for selecting which positions to close. One single trade may close or partially close existing positions, open a new position, or both. Note that there are several simultaneous results from opening a new position or closing existing position(s): opening/closing the position itself, reserving or returning collateral, and crediting or debiting realized gain/loss. This is detailed in the below pseudocode and in the flowchart 900.

For an alternate embodiment using separate TradeJournals for Buyers and Sellers: the process to produce Postings is the same, and the same complete set of Postings would be produced, but all Postings relating to the Buyer account are associated with the buy side trade journal, and all Postings relating to the Seller account are associated with the sell side trade journal. Consequently, the below process is repeated twice, once for each journal.

1. For each buyer and seller account (buyer_account_id, seller_account_id) in the trade journal (j):

a. Get positions for account from Ledger Transaction Database 155 (according to FIFO algorithm or other technique as desired).

b. If account is buyer and has existing short position (p):

1. Determine qty to close:

a. close_qty := min(p.qty, journal.qty)

2. Create PositionPosting to close the position up to journal qty:

| posting_id | new UUID |
      |---|---|
      | journal_id | journal.journal_id |
      | account_id | buyer_account_id |
      | asset_type | journal.instrument_id |
      | amount | close_qty |
      | closes | p.position_id, + close_qty |

3. Determine the amount of previously reserved collateral for this position:

a. collateral := close_qty * (p.instrument.cap_px - p.px)

4. In one embodiment, some collateral may have been returned previously when coins were reserved for delivery. In this case, the collateral amount is adjusted accordingly.

5. If close_qty is less than position qty and qty_delivered is greater than zero, determine the qty of coins to return. In one embodiment priority is given to returning coins, and in another embodiment priority is given to keeping coins reserved.

a. Priority for keeping coins reserved:

i. return_qty := (close_qty - min(close_qty,(p.qty-p.qty_delivered)))

b. Priority for returning coins:
      i. return_qty := min(close_qty,p.qty_delivered)

6. Create SimplePostings to move collateral and coins (if any) from RESERVE to buyer account:

| posting_id | new UUID |
|---|---|
| journal_id | journal.journal_id |
| account_id | buyer_account_id<br>Or, for alternative embodiment using CustomerReserveAccounts:<br>buyer_account_id + "reserve" |
| asset_type | p.instrument.quote_type |
| amount | collateral |

| posting_id | new UUID |
|---|---|
| journal_id | journal.journal_id |
| account_id | CLEARING_RESERVE_ACCOUNT |
| asset_type | p.instrument.quote_type |
| amount | collateral * -1 |

If return_qty is greater than zero:

| posting_id | new UUID |
|---|---|
| journal_id | journal.journal_id |
| account_id | buyer_account_id<br>Or, for alternative embodiment using CustomerReserveAccounts: |

| | buyer_account_id + "reserve" |
|---|---|
| asset_type | p.instrument.base_type |
| amount | return_qty |

| posting_id | new UUID |
|---|---|
| journal_id | journal.journal_id |
| account_id | CLEARING_RESERVE_ACCOUNT |
| asset_type | p.instrument.base_type |
| amount | return_qty * -1 |

7. Compute realized gain or loss.

a. realized := qty * (p.px - journal.px)

8. Create SimplePostings to move realized gain/loss between RESERVE and account.

| posting_id | new UUID |
|---|---|
| journal_id | journal.journal_id |
| account_id | buyer_account_id |
| asset_type | p.instrument.quote_type |
| amount | realized |

| posting_id | new UUID |
|---|---|
| journal_id | journal.journal_id |
| account_id | CLEARING_RESERVE_ACCOUNT |

| asset_type | p.instrument.quote_type |
| --- | --- |
| amount | realized * -1 |

9. Reduce remaining journal qty by close_qty.
   10. If any remaining short positions and remaining journal qty, repeat step a.

c. If account is seller and has existing long position:

1. Determine qty to close.

*(Same as above)*

2. Create PositionPosting to close the position up to journal qty:

*(Same as above, except for the following fields)*

| amount | close_qty * -1 |
| --- | --- |
| closes | p.position_id, close_qty * -1 |

3. Determine the amount of previously reserved collateral for this position.

a. collateral := close_qty * p.px

4. Create SimplePostings to move collateral from RESERVE to account.

| posting_id | new UUID |
| --- | --- |
| journal_id | journal.journal_id |
| account_id | seller_account_id<br>Or, for alternative embodiment using CustomerReserveAccounts:<br>buyer_account_id + "reserve" |

| | |
|---|---|
| asset_type | p.instrument.quote_type |
| amount | collateral |

| | |
|---|---|
| posting_id | new UUID |
| journal_id | journal.journal_id |
| account_id | CLEARING_RESERVE_ACCOUNT |
| asset_type | p.instrument.quote_type |
| amount | collateral * -1 |

5. Compute realized gain or loss.

a. realized := qty * (p.px - journal.px) * -1

6. Create SimplePostings to move realized gain/loss between RESERVE and account.
*(Same as above)*

7. Reduce remaining journal qty by the qty closed.

8. if any remaining long positions and remaining journal qty, repeat step a.

d. If remaining journal qty:

1. Create PositionPosting to open new position.

a. If account is buyer, new position has +qty b. If account is seller, new position has -qty

| | |
|---|---|
| posting_id | new UUID |
| journal_id | journal.journal_id |
| account_id | seller_account_id (if seller) |

| | | buyer_account_id (if buyer) Or, for alternative embodiment usin CustomerReserveAccounts: buyer_account_id + "reserve" seller_account_id + "reserve" | |
|---|---|---|---|
| | asset_type | journal.instrument_id | |
| | amount | qty (if buyer)<br>(qty * -1) (if seller) | |
| | creates | position.account_id = account_id<br>position.instrument_id<br>journal.instrument_id<br>position.qty       =     amour<br>position.px       =   journal.p<br>position.qty_delivered = 0 | |

2. Create SimplePostings to reserve collateral for new position.

a. If account is buyer:

i. collateral := (qty * px)

b. If account is seller:

i. collateral := (qty * (instrument.cap_px - px))

| posting_id | new UUID |
|---|---|
| journal_id | journal.journal_id |
| account_id | buyer_account_id or seller_account_id |
| asset_type | instrument.quote_type |
| amount | collateral * -1 |

| posting_id | new UUID |
|---|---|

| journal_id | journal.journal_id |
| account_id | CLEARING_RESERVE_ACCOUNT |
| asset_type | instrument.quote_type |
| amount | collateral | e. Verify that sum(amount) from all Postings equals 0.
    f. Save all Postings created by the above process in a single database transaction.

Turning now to the Trade Process Flowchart 900 for trading blockchain-enabled electronic futures with optional computerized delivery of cryptocurrency as shown in FIG. 9. First, at step 902, the Buyer sends order data to the Trade Determination System 130. The order data includes an identification of the type=buy, buyer_id, instrument_id, qty, and price. At step 904, the Seller sends order to the Trade Determination System 130. The order data includes an identification of the type=sell, seller_id, instrument_id, qty, price. At step 906, the Trade Determination System 130 attempts to match the Buyer and Seller orders according to instrument_id, price, and qty.

At step 908, when no match takes place, then the system simply waits for the next input. Alternatively, when a match is found, the process proceeds to step 910. At step 910, the current time is set as the trade time. At step 912, the Trade Determination System 130 sends a message to the Buyer Computer System 105 notifying of the match. The message includes the data: type=buy, instrument_id, qty, price, trade_time. At step 914, the Trade Determination System 130 sends a message to Seller Computer System 110 notifying of the match. The message includes the data: type=sell, instrument_id, qty, price, trade_time.

Next, at step 916, the Trade Determination System 130 sends industry-standard Trade Capture Report (TCR) to Central Clearing System. As shown in the flowchart, the trade capture report includes: the buyer_id, the seller_id, the instrument_id, the price, the quantity, and the trade_time.

At step 918, the central clearing system accesses the Ledger Account Database 150 to locate the clearing account for the buyer. More specifically, buyer account is determined by using the buyer_id to access (in the ledger database), the clearing account associated with the buyer_id.

At step 920, the central clearing system accesses the Ledger Account Database 150 to locate the clearing account for the seller. More specifically, seller account is determined by using the seller_id to access (in the ledger database), the clearing account associated with the seller_id.

At step 922, when either of the buyer account and seller account are not found, then the process proceeds to step 924 and an alert is sent to the seller computer, buyer computer, and/or central clearing system. However, when both a buyer account and a seller account are found, the process proceeds to step 926 and the Central Clearing System produces a TradeJournal and records it in the Ledger Transaction Database 155.

As shown in the flowchart, the TradeJournal record includes: a journal_id field with a value of a new unique identifier UUID; a time field with a value of the trade_time; an observed_at field with a value of the current time; a description field with a value of the Trade description; a buyer account_id field including the buyer account_id; a seller account_id field including the seller account_id; and instrument_id field including the instrument_id, TCR is an acronym for Trade Capture Report—which is the type of message sent from the Trade Determination System to the Central Clearing Computer System; a px field with price data regarding the trade, and a qty field with quantity data regarding the trade.

The process then proceeds to step 928. Step 928 starts a major loop that is repeated for both the buyer account and the seller account.

At step 928, the TradeJournal is received at the Central Clearing Computer System 115 and identified as (j). At step 930, the buyer account_id from the TradeJournal is used to extract the account_id to be used to access the clearing account associated with the buyer. At step 932, the instrument_id from the TradeJournal is used to identify and retrieve an instrument data record that is stored in the Instrument Database 140.

At step 934, the central clearing system retrieves data representing all positions associated with the buyer account from the Ledger Transaction Database 155. At step 936, the positions are sorted according to a closeout process. In a first embodiment, a First-In-First-Out (FIFO) process is employed, while in an alternative embodiment, a top-day FIFO is employed followed by a historical FIFO.

At step 938, a quantity value is determined by multiplying the quantity information from the TradeJournal by a multiplier associated with the instrument. The multiplier is a parameter stored in the Instrument database—see the "Instrument Data Structure" table—it is administratively defined along with the Instrument. It is retrieved in the same manner as, for example, the cap price (cap_px).

Next, at step 940, a determination is made by the central clearing system as to whether the present account is a buyer account or a seller account. When the present account is a buyer account, the process proceeds to step 942. At step 942, when the quantity value is greater than zero and the positions [0].amount <0 (verifying that the position is, indeed, a short position because short positions have a negative amount value, and long positions have a positive amount value), then the process proceeds to step 950 below. Otherwise, the process proceeds to step 944.

Returning to step 940, when the present account is a seller account, the process proceeds to step 946. At step 946, when the quantity value is greater than zero and the positions[0].amount >0 (Verifying that this is a long position because only long positions have a positive value) then the process proceeds to step 981 below.

Turning to step 950, the variable (p) is assigned a value of positions[0], which takes the first position in the list, and refers to it as (p).

Next, at step 952, the minimum of the two values of: the "qty" variable, and the "qty" field of the position data referred to as (p), are determined and assigned to a variable named "close_qty".

At step 954, the central clearing system creates a position posting to close the buyer's position. As shown in the flowchart, the Position Posting includes: a posting_id field with a value of a new unique identifier (UUID); a journal_id field with a value of the journal_id from the Tradejournal created in the previous step; an account_id field with a value of the buyer's account_id; an asset_type field with the value of the asset_type from the Tradejournal created in the previous step; and an amount field with a value of the close_quantity, and a closes field with a value of the pair (position_id of position (p), and close_qty)

Next, at step 956, the value of the variable referred to as "close_qty" multiplied by the difference between the "cap_px" field of the Instrument (i) and the "px" field of the Position (p) is assigned to a variable named "collateral".

At step 958, in an alternative embodiment where coins were reserved during a trading session, the central clearing system first makes a determination as to whether coins were reserved for delivery. This is done by checking that the value of the "qty_delivered" field in the Position (p) is greater than zero and the value of the "close_qty" variable (as computed in step 952) is less than the value of the "qty" field in the Position (p).

When coins were not reserved for delivery, the process proceeds to step 966. Alternatively, when coins were reserved for delivery, two embodiments are available.

In a first embodiment as shown at step 960, a priority is assigned for keeping coins reserved by computing "return_qty" as the difference between the value of the "close_qty" variable (see step 952) minus the minimum of: the "close_qty" variable or the difference between the "qty" field of the Position (p) minus the "qty_delivered" field of the Position (p).

In a second embodiment shown at step 962, a priority is assigned for returning coins by computing "return_qty" as the minimum of: the value of the "close_qty" variable (see step 952) or the "qty_delivered" field of Position (p).

At step 964, the collateral is determined by multiplying the value of "collateral" as determined in step 956 by the result of dividing the value of "return_qty" (step 960 or 962) by the "qty_delivered" field of Position (p).

At step 966, the quantity of coins to be returned is compared to zero. When the quantity of coins to be returned is equal to or less than zero, the process proceeds to step 970. Conversely, when the quantity of coins to be returned is greater than zero, the process proceeds to step 968.

At step 968, the central computer system creates two simple postings to move coins from a reserve account to the buyer's account. As shown in the flowchart, the first simple posting includes: a posting_id field with a value of a new unique identifier (UUID); a journal_id field with a value of the journal_id from the Tradejournal created in a previous step; an account_id field with a value of buyer account_id (or for an alternate embodiment using customer reserve accounts: buyer account_id+".reserve"); an asset_type field with the value of (i.base_type is the "base_type" field of the Instrument (i)—as defined in the Instrument data type table); and an amount field with a value of the return quantity calculated in a previous step.

The second posting includes: a posting_id field with a value of a new unique identifier (UUID); a journal_id field with a value of the journal_id from the Tradejournal created in a previous step; an account_id field with a value of the clearing reserve account for the coins; an asset_type field with the value of i.base_type; and an amount field with a value of the inverse of the amount of the return quantity created in the previous step.

At step 970, the central computer system creates two additional simple postings to move collateral from the from a reserve account to the buyer's account. As shown in the flowchart, the first simple posting includes: a posting_id field with a value of a new unique identifier (UUID); a journal_id field with a value of the journal_id from the Tradejournal created in a previous step; an account_id field with a value of buyer account_id (or for an alternate embodiment using customer reserve accounts: buyer account_id+".reserve"); an asset_type field with the value of i.quote_type, which is the "quote_type" field of the Instrument (i)—as defined in the Instrument data type table; and an amount field with a value of the collateral calculated in a previous step.

The second posting includes: a posting_id field with a value of a new unique identifier (UUID); a journal_id field with a value of the journal_id from the Tradejournal created in a previous step; an account_id field with a value of the clearing reserve account for the collateral; an asset_type field with the value of i.quote_type; and an amount field with a value of the inverse of the amount of the collateral created in the previous step.

Next, at step 972, the central computer system computes gain or loss. The Central Computer System assigns to a variable named "realized" the result of multiplying the value of "close_qty" (952) times the difference of the "px" field of the Position (p) minus the "px" field of the TradeJournal (j).

At step 974 the central computer system creates simple postings to move gain or loss between reserve and buyer accounts. As shown in the flowchart, the first simple posting includes: a posting_id field with a value of a new unique identifier (UUID); a journal_id field with a value of the journal_id from the Tradejournal created in a previous step; an account_id field with a value of buyer account_id; an asset_type field with the value of i.quote_type; and an amount field with a value of the realized gain calculated in a previous step.

The second posting includes: a posting_id field with a value of a new unique identifier (UUID); a journal_id field with a value of the journal_id from the Tradejournal created in a previous step; an account_id field with a value of the clearing reserve account for the collateral; an asset_type field with the value of i.quote_type; and an amount field with a value of the inverse of the amount of the realized gain calculated in a previous step.

At step 976, the value of the quantity variable is updated to be the present quantity variable minus the close_quantity. At step 978 a determination is made as to whether the close quantity value is equal to p.quantity. When not, the process returns to step 942. However, when the close quantity value is equal to p.quantity, then the remove positions[0] function is called in step 980 and the process then proceeds back to step 942.

This serves to reduce the value of the quantity variable by the value of close_quantity. Then, if we are finished processing the position (as determined by comparing the value of close_qty to the value of the "qty" field of the Position (p) (referred here as p.qty)), then we remove the first Position from the list of positions ("remove positions[0]") and proceed back to step 942, in which now the first Position in the list will be the next one that needs to be processed.]

Returning to step 940, as mentioned above, when the present account is a seller account, the process proceeds to step 946. At step 946, when the quantity value is greater than zero and the positions[0].amount >0—which is looking at the value of the "amount" field in the first Position found in the list of positions.—("positions[0]" means "the first position in the list, at the $0^{th}$ index"), then the process proceeds to step 981 below.

At step 981, the variable (p) is assigned a value of positions[0], which takes the first position in the list, and refers to it using a variable named (p).]

Next, at step 952, the minimum of the two values of: the "qty" variable, and the "qty" field of the position data referred to as (p), are determined and assigned to a variable named "close_qty".

At step 983, the central computer system creates a position posting to close the indicated position. As shown in the flowchart, the posting includes: a posting_id field with a value of a new unique identifier (UUID); a journal_id field with a value of the journal_id from the Tradejournal created in a previous step; an account_id field with a value of seller account_id; an asset_type field with the value of the instrument_id indicated in the Tradejournal; an amount field with a value of the inverse of the close quantity determined in a previous step; and a closes position with a value of the pair of: the position_id from the Position (p), and the value of close_qty (step 982) multiplied by −1.

Next, at step 984, the variable collateral is assigned a value determined by multiplying the previously determined close quantity with the price of the position. Close_qty comes from step 982, price of the position comes from the "px" field in the Position named (p) which was taken from the list of positions in step 981.

Then at step 985 the central computer system creates two simple postings to move collateral from the reserve account to the seller's account. As shown in the flowchart, the first simple posting includes: a posting_id field with a value of a new unique identifier (UUID); a journal_id field with a value of the journal_id from the Tradejournal created in a previous step; an account_id field with a value of seller account_id (or for an alternate embodiment using customer reserve accounts: seller account_id+".reserve"); an asset_type field with the value of i.quote_type; and an amount field with a value of the collateral determined in a previous step.

The second posting includes: a posting_id field with a value of a new unique identifier (UUID); a journal_id field with a value of the journal_id from the Tradejournal created in a previous step; an account_id field with a value of the clearing reserve account for the collateral; an asset_type field with the value of i.quote_type; and an amount field with a value of the inverse of the amount of collateral calculated in a previous step.

At step 986, the central computer system calculates realized gain or loss. In one embodiment it takes the value obtained by multiplying together: the value of close_qty (step 982) times the difference of the px field of Position (p) minus the px field of TradeJournal (j) times −1, and assign the result to a variable named "realized".

At step 987 the central computer system creates simple postings to move gain or loss between reserve and seller accounts. As shown in the flowchart, the first simple posting includes: a posting_id field with a value of a new unique identifier (UUID); a journal_id field with a value of the journal_id from the Tradejournal created in a previous step; an account_id field with a value of seller account_id; an asset_type field with the value of i.quote_type; and an amount field with a value of the realized gain calculated in a previous step.

The second posting includes: a posting_id field with a value of a new unique identifier (UUID); a journal_id field with a value of the journal_id from the Tradejournal created in a previous step; an account_id field with a value of the clearing reserve account for the collateral; an asset_type field with the value of i.quote_type; and an amount field with a value of the inverse of the amount of the realized gain calculated in a previous step.

Next, at step 988, the value of the quantity variable is updated to be the present quantity variable minus the close_quantity. At step 989 a determination is made as to whether the close quantity value is equal to p.quantity. When not, the process returns to step 946. However, when the close quantity value is equal to p.quantity, then the remove positions[0] function is called in step 990 and the process then proceeds back to step 946. This is reducing the value of the quantity variable by the value of close_quantity. Then, if we are finished processing the position (as determined by comparing the value of close_qty to the value of the "qty" field of the Position (p) (referred here as p.qty)), then we remove the first Position from the list of positions ("remove positions[0]") and proceed back to step 946, in which now the first Position in the list will be the next one that needs to be processed.

Returning now to step 944, the central computer system determined whether the quantity variable is greater than zero. When not, the process proceeds to step 953. Otherwise, the process proceeds to step 946. At step 946, it is determined whether the account that is currently being processed is a buyer account of a seller account. When the account is a buyer account, the process proceeds to step 947. At step 947, the amount variable is set equal to the current value of the quantity variable (which had been multiplied by the multiplier field of the instrument in step 938), the collateral variable is set equal to the qty multiplied by the price (px) and the account_id variable is set equal to the buyer account_id.

Alternatively, when the account is a seller account, the process proceeds to step 948. At step 948, the amount variable is set equal to the inverse of the quantity variable, the collateral variable is set equal to the product of multiplying the value of the qty variable (which had been multiplied by the multiplier field of the instrument in step 938) multiplied by the difference of the cap_px field of the Instrument(i) minus the value of the price (px) variable, and the account_id variable is set equal to the sell_accound_id. Thus, we are computing some values and assigning them to local variables for future reference: amount, collateral, and account_id. Depending on whether it is a buyer or seller (buyer will have qty>0, seller will have qty<0), the method for assigning these three values is different. After we have proceeded past step 947 or 948, we can now refer to those three variables by name, and they will now have the correct values, regardless of whether the account is a buyer or a seller.

At step 949, the central computer system creates a position posting to open a new position. As shown in the flowchart, the posting includes: a posting_id field with a value of a new unique identifier (UUID); a journal_id field with a value of the journal_id from the Tradejournal created in a previous step; an account_id field with the account_id set in the previous step; an asset_type field with the value identifying the instrument_id from the TradeJournal, and amount file including data representing the amount of the instrument traded; and specifies all the fields needed to populate a Position record, which is what the "creates" field of the PositionPosting needs to contain—the "creates" field has a data type of "Position" which means it contains a complete Position record.

Next, at step 951, the central computer system creates a pair of simple postings to reserve collateral for the new position. As shown in the flowchart, the first simple posting includes: a posting_id field with a value of a new unique identifier (UUID); a journal_id field with a value of the journal_id from the Tradejournal created in a previous step; an account_id field with a value assigned in a previous step; an asset_type field with the value of i.quote_type; and an amount field with a value of the inverse of the collateral calculated in a previous step.

The second posting includes: a posting_id field with a value of a new unique identifier (UUID); a journal_id field with a value of the journal_id from the Tradejournal created in a previous step; an account_id field with a value of the clearing reserve account for the collateral; an asset_type field with the value of i.quote_type; and an amount field with a value of the amount of the collateral calculated in a previous step.

At step 953, the central computer system determined whether the account_id is a buyer account_id. When it is, the account_id is then set to the seller account_id at step 955. Alternatively, when the account_id is not a buyer account id, then the account_id is set to null at step 957. At step 959, it is determined whether the account_id is null. If the account_id is the seller_id, then the process proceeds back to step 934. Alternatively, if the account_id is null, then the process proceeds to step 961. In this fashion, the above process proceeds to first operate for the seller's account and then perform the above operations for the buyer's account.

At step 961 the central computer system collects all postings and returns them. Then, at step 963, the postings as returned by step 961 are provided as a set of data to be used in step 991, referred there as "new Postings".

The process then proceeds back to step 991. At step 991, the central computer system determines whether the sum of the amounts fields of all postings generated in the above flowchart is equal to zero. If the sum is not equal to zero, then an alert is sent to the Central Clearing Computer system 110. Conversely, if the sum is zero, then the central clearing system saves the new postings in the Ledger Transaction Database 155.

FIGS. 10A, 10B, 10C, and 10D illustrate a Reserve Coins For Delivery Process Flowchart 1000 for reserving cryptocurrency in the present system according to embodiments of the present invention.

First, the reserve coin process will be described in overview and then in a more detailed fashion with reference to the reserve coins for delivery process flowchart 1000.

As an overview, the reserve coin process includes a plurality of steps: first, in one embodiment, the Central Clearing System first sends notification to all Sellers of upcoming delivery, offering the chance to reserve coins for delivery, as further described below in the Delivery/Expiration Notification Process Flowchart. In an alternate embodiment, the expiring positions and delivery information computed in the Delivery/Expiration Notification Process may be sent to the Seller Computer System 110 for display in a user interface or via API. Second, prior to this process, the Seller has followed the Deposit Process for Cryptocurrency flowchart to transfer BTC into their account within the clearing system. Third, the Seller requests to reserve delivery from Central Clearing System, by providing clearing account_id, position_id of position for which to reserve, and qty of cryptocurrency to reserve. In one embodiment, the entire position must be reserved; and in another embodiment, the seller may choose to partially reserve only a certain quantity of cryptocurrency. Fourth, the Central Clearing System performs preliminary check, comparing request qty to the account balance of the requester's account_id. Fifth, if the check fails, process is stopped and delivery reserve request is rejected. Sixth, the Central Clearing System requests a trading limit reduction from Trade Determination System 130 of requested amount of cryptocurrency. Seventh, the Trade Determination System 130 attempts to reduce the trading limit. Eighth, when the request amount exceeds the balance available for trading, process is stopped and the delivery reserve request is rejected. The account can not reserve coins that the account does not possess]

1. Retrieve Position (p) where position_id = requested position_id

2. Determine how many coins to reserve for delivery:
   a. deliver_qty := min(qty, p.qty)
3. If deliver_qty < qty:
   a. Request Trade Determination System 130 to increase trading limit by (qty - deliver_qty)
4. Generate a DeliveryJournal:

| journal_id | new UUID |
|---|---|
| business_date | current date |
| time | current time |
| observed_at | current time |
| description | e.g., "RESERVE {qty} {asset_type} FOR DELIVERY" |
| account_id | account_id from request |
| deliver_qty | deliver_qty from step 2 |

5. Generate a Position Posting indicating the coins reserved for delivery:

*(A different embodiment could use two Position Postings to close and then replace the position with a new one that has a new delivered_qty, instead of the single Position Posting as described here.)*

| posting_id | new UUID |
|---|---|
| journal_id | journal.journal_id |
| account_id | journal.account_id |
| asset_type | journal.instrument.quote_type |
| amount | 0 |
| delivers | [ position.position_id, journal.deliver_qty ] |

6. Generate two Simple Postings to move reserved coins into central reserve account:

| posting_id | new UUID |
|---|---|
| journal_id | journal.journal_id |
| account_id | journal.account_id<br>Or, for alternative embodiment using CustomerReserveAccounts: journal_account_id + "reserve" |
| asset_type | journal.instrument.base_type |
| amount | journal.deliver_qty * -1 |

| posting_id | new UUID |
|---|---|
| journal_id | journal.journal_id |
| account_id | CLEARING_RESERVE_ACCOUNT |
| asset_type | journal.instrument.base_type |
| amount | journal.deliver_qty |

7. Central Clearing System generates two Simple Postings to returns a portion of the collateral when coins are reserved for delivery:

| posting_id | new UUID |
|---|---|
| journal_id | journal.journal_id |
| account_id | journal.account_id<br>Or, for alternative embodiment using CustomerReserveAccounts: journal_account_id + "reserve" |
| asset_type | journal.instrument.quote_type |

| | | |
|---|---|---|
| amount | ((journal.instrument.cap_px - position.px) * journal.deliver_qty) | |

| | |
|---|---|
| posting_id | new UUID |
| journal_id | journal.journal_id |
| account_id | CLEARING_RESERVE_ACCOUNT |
| asset_type | journal.instrument.quote_type |
| amount | ((journal.instrument.cap_px - position.px) * journal.deliver_qty) * -1 |

Turning now to the Reserve Coins For Delivery Process Flowchart 1000 as shown in FIG. 10.

First, at step 1002, the Seller Computer System 110 authenticates with the Central Clearing System by transmitting authentication data including an account_id and password from the Seller Computer System 110.

Next, at step 1004, the central clearing system sends the authentication data to the authentication system for verification. The User Authentication System 135 verifies the authentication data by comparing the received authentication data with previously stored authentication data at the User Authentication System 135.

At step 1006, the Seller Computer System 110 sends a request to reserve delivery (r) to Central Clearing System. As shown in the flowchart, the request data provides the Seller's account_id, an instrument_id of a contract for which to reserve cryptocurrency, and qty of cryptocurrency to reserve. In one embodiment, the entire position must be reserved, while in another embodiment, the seller may choose to partially reserve only a certain quantity of the position.

Figure 15:
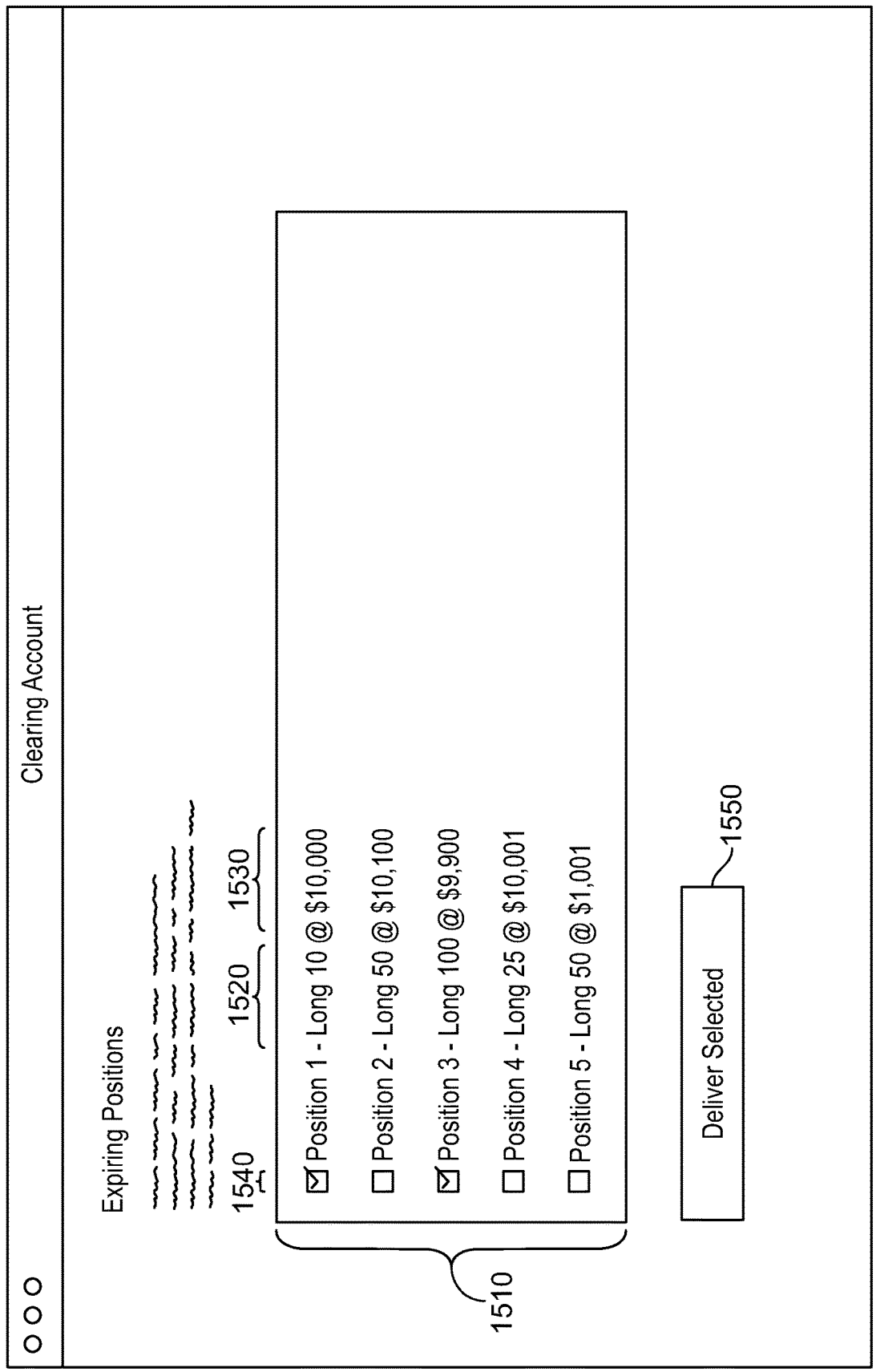
FIG. 15 illustrates an embodiment of a Delivery Selection Interface according to an embodiment of the present invention.

FIG. 15 illustrates an embodiment of a Delivery Selection Interface 1500 according to an embodiment of the present invention. In the Delivery Selection Interface, the expiring long positions 1510 associated with the seller's account_id are listed. Each position displays its quantity 1520 and price 1530. Individual positions for which to deliver BTC may be selected by the check button 1540 and then the seller decision transmitted to the central clearing system by selecting the Deliver Selected button 1550.

At step 1008, it is noted that in one embodiment, the Central Clearing System may automatically begin the reserve coins for delivery process from this point if the central clearing system has determined that coins are to be automatically delivered, ad further discussed below in the Delivery/Expiration Notification Process Flowchart. In another embodiment, the Central Clearing System may automatically begin reserve coins for delivery process from this point if the combined deposit/reserve process is used, as discussed herein in the Cryptocurrency Deposit Process Flowchart.

Next, at step 1010, the Central Clearing System retrieves the instrument (i) identified in the Request Data from the Instrument Database 140, where i.symbol=r.instrument_id, that is, we are retrieving the instrument whose "symbol" value equals the "instrument_id" value of the reserve request (r).

At step 1012, the central clearing system retrieves positions from the Ledger Transaction Database 155. As shown in step 1014, the positions are retrieved by identifying all positions associated with both the account_id of the reserver and the instrument_id to be reserved.

At step 1014, when no such positions are returned, then the process identifies that there are no open positions and the reserver is unable to reserve coins. Conversely, when at least one position has been identified, then the process proceeds to step 1020 where positions[0]/qty is determined, that is, take the value of the "qty" field of the first Position in the list of positions.

When positions[0]/qty>0, then the system identifies that the position is a long position. It is not possible to reserve bitcoin for a long position.

Conversely, when positions[0]/qty is equal to or less than zero, then at least one short position has been identified. Short positions are potential candidates for which bitcoin may be reserved. In one embodiment, in both this statement and the previous one, it is expected that the direction of all selected positions is the same. In other words, if the first one (positions[0]) is short, all of them are short, and if the first one is long, all of them are long.]

At step 1022, the central clearing system then determines the total number of coins that need delivery from all positions. That is, the system computes the sum, from all positions, of the difference between the "qty" and "qty_delivered" fields in each position, and assign that value to a variable named "total_delivery".

Next, at step 1024, the number of coins to deliver is determined. The quantity of coins to deliver (qty) is determined as the minimum of the requested quantity submitted by the requester and the total_delivery value representing the total number of coins available for delivery.

At step 1026, the Central Clearing System checks the balance of the account_id, using same process as described in the Withdrawal Process for cryptocurrency from clearing system flowchart. In order to deliver coins, they must exist in the balance of the account. If the account has insufficient balance, we halt the process here in exactly the same way as we halt a Withdrawal process when there is insufficient balance.

In an alternative embodiment at step 1028, the Central Clearing System requests a trading limit reduction from the Trade Determination System 130 of i.base_type (as asset_type), and qty from above (as amount), using the same process as described in the Withdrawal Process for cryptocurrency from clearing system flowchart. This is the same as in the Withdrawal process where we do the same—in this embodiment, the Trade Determination System is maintaining a trading limit and may indicate whether or not there are coins available to reserve based on that limit.

At step 1030, if the trading limit was not successfully reduced, then the process ends. Conversely, if the trading limit was successfully reduced, then the process proceeds to step 1032. At step 1032, the Central Clearing System creates a DeliveryJournal (j) and saves it in the Ledger Transaction Database 155. As shown in the flowchart, the DeliveryJournal includes: a journal_id field with a value of a new unique identifier UUID; a business_date field with a value of the current date; a time field with the current time; an observed_at field with a value of the current time; a description field with a value of RESERVE and the quantity and asset type (such at BTC) for delivery; an account_id field with a value of the reserver's account_id; an instrument_id field with a value of the selected instrument for which to reserve BTC; and a delivery_qty field with data representing the quantity of BTC to be delivered.

Next, at step 1034, the central clearing system sorts positions according to database insertion order, px (traded price), or other order as desired. If the seller reserves a certain quantity of coins, but does not explicitly indicate which positions to consider delivered, the Central Clearing Computer System automatically selects positions according to the previously mentioned sort order. In this way, the first positions in the list are considered delivered until the amount indicated for delivery runs out.

At step 1036, the central clearing system determines whether qty is greater than zero. If not, then the process proceeds to step 1050 and all coins have been reserved for delivery. However, when quantity is less than or equal to zero, the process proceeds to step 1038 where the first position in the list is removed from the list and assigned to a variable named p.

Next, at step 1040, the delivery_quantity is assigned to be the lesser of p.qty, qty. where p.qty is determined by taking the value of the "qty" field from the Position (p)).

At step 1042, the central clearing system Creates a Position Posting and saves it in the Ledger Transaction Database 155. As shown in the flowchart, the position posing includes: a posting_id field with a value of a new unique identifier (UUID); a journal_id field with a value of the journal_id from the reserver's journal created in the previous step; an account_id field with a value of the reserver's account_id; an asset_type field with the value of i.quote_type; an amount field with its value set to zero, and a delivers field with its value set to the data pair p.position_id, deliver_qty Next, at step 1044, the central clearing system reserves coins for delivery by creating two simple postings and saving then in the Ledger Transaction Database 155. As shown in the flowchart, the first simple posting includes: a posting_id field with a value of a new unique identifier (UUID); a journal_id field with a value of the journal_id from the reserver's journal created in the previous step; an account_id field with a value of the reserver's account_id; an asset_type field with the value of i.base_type; and an amount field with its value set to the inverse of the deliver_quantity determined above.

The second posting includes: a posting_id field with a value of a new unique identifier (UUID); a journal_id field with a value of the journal_id from the reserver's journal created in the previous step; an account_id field with a value of the clearing reserve account, for example a Central Clearing Bitcoin Wallet 117; an asset_type field with the value of i.base_type; and an amount field with its value set to the deliver_quantity determined above.

At step 1046, the central clearing system returns collateral by creating two simple postings and saving them in the Ledger Transaction Database 155. As shown in the flowchart, the first simple posting includes: a posting_id field with a value of a new unique identifier (UUID); a journal_id field with a value of the journal_id from the reserver's journal created in the previous step; an account_id field with a value of the reserver's account_id; an asset_type field with the value of i.quote_type; and an amount field with its value set to $((i.cap\_px - p.px) * deliver\_qty)$ where i.cap_px is the cap_px field from the Instrument (i) and p.px is the px field from the Position (p)]

The second posting includes: a posting_id field with a value of a new unique identifier (UUID); a journal_id field with a value of the journal_id from the reserver's journal created in the previous step; an account_id field with a value of the clearing reserve account, for example a Central Clearing Bitcoin Wallet 117; an asset_type field with the value of i.quote_type; and an amount field with its value set to $((i.cap\_px - p.px) * deliver\_qty)$.

The process then proceeds to step 1048 where the delivery_quantity is subtracted from the current quantity variable and the result stored as the new quantity variable. The process then proceeds back to step 1036.

FIGS. 11A, 11B, 11C, 11D, 11E, 11F, 11G, and 11H illustrate a Delivery Process Flowchart 1100 for automated computerized delivery of cryptocurrency according to embodiments of the present invention.

First, the delivery process will be described in overview and then in a more detailed fashion with reference to the delivery process flowchart 1100. As discussed below, positions are described as short positions and long positions. A Seller who held their position will have a short position, and a Buyer who held their position will have a long position. Therefore, "long_positions" data elements here refer to positions owned by a Buyer, and are associated with a user ID of a Buyer, and "short_positions" data elements here refer to positions owned by a Seller, and are associated with a user ID of a Seller.

Although for the purpose of this document, we used bitcoin (BTC) as the coin (base) type and USD as the collateral (quote) type, the present system may be used with any cryptocurrency that supports the operations as described in the Central Clearing Bitcoin Wallet 117 section, along with any currency that is supported by a banking institution.

Select expiring instruments:

instruments := select instruments (i) where i.maturity_date = today

For each instrument (i) in selected instruments:

1. Select associated short positions:

```
    short_positions := select Positions(p) where p.instrument = i and
    p.qty < 0
    ```

2. Determine total qty of coins reserved for delivery by sellers:

```
    total_qty_delivered := sum of p.qty_delivered in short_positions
    ```

3. Determine total amount of fiat currency reserved by sellers who did not deliver, or only partially delivered:

```
    total_collateral  :=  sum  of  (p.qty  -  p.qty_delivered)  *
    (p.instrument.cap_px - p.px) in short_positions
    ```

4. Determine quantity of coins not delivered by sellers:

```
    total_qty_undelivered := sum of (p.qty - p.qty_delivered) in
    short_positions
    ```

5. Compute average reserved collateral per undelivered coin:

```
    collateral_per_coin := total_collateral / total_qty_undelivered
    ```

6. For each position (p) in short_positions:
    a. Generate ExpiryJournal

| journal_id | new UUID |
    |---|---|
    | business_date | current Date |
    | time | current Time |
    | observed_at | current Time |
    | description | e.g., "EXPIRATION {...}" |
    | account_id | p.account_id |
    | instrument_id | p.instrument_id |
    | position_id | p.position_id |
    | deliver_qty | 0 | b. Generate Position Posting to fully close out the position:

| posting_id | new UUID |
    |---|---|
    | journal_id | journal_id |
    | account_id | p.account_id |
    | asset_type | p.instrument_id |
    | amount | p.qty * -1 |
    | closes | p.position_id, (p.qty * -1) | c. If p.qty_delivered > 0:

Generate Simple Postings to deliver quote_type currency to Seller for each coin that was delivered:

| posting_id | new UUID |
    |---|---|
    | journal_id | journal_id |

| | |
|---|---|
| account_id | p.account_id |
| asset_type | p.instrument.quote_type |
| amount | (p.px * p.qty_delivered) |

| | |
|---|---|
| posting_id | new UUID |
| journal_id | journal_id |
| account_id | CLEARING_RESERVE_ACCOUNT |
| asset_type | p.instrument.quote_type |
| amount | (p.px * p.qty_delivered) * -1 | d. For the primary embodiment where collateral was not returned at the time a coin is reserved for delivery, generate Simple Postings to return the portion of collateral that was replaced by delivered coins:

| | |
|---|---|
| posting_id | new UUID |
| journal_id | journal_id |
| account_id | p.account_id |
| asset_type | p.instrument.quote_type |
| amount | ((p.instrument.cap_px - p.px) * p.qty_delivered) |

| | |
|---|---|
| posting_id | new UUID |
| journal_id | journal_id |
| account_id | CLEARING_RESERVE_ACCOUNT |
| asset_type | p.instrument.quote_type |
| amount | ((p.instrument.cap_px - p.px) * p.qty_delivered) * -1 | e. For the alternate embodiment using CustomerReserveAccounts, generate

SimplePostings to remove the reserved collateral and coins (BTC and USD) from the account balances:

| posting_id | new UUID |
|---|---|
| journal_id | journal_id |
| account_id | p.account_id + ".reserve" |
| asset_type | p.instrument.quote_type |
| amount | ((p.instrument.cap_px - p.px) * (p.qty - p.qty_delivered) |

| posting_id | new UUID |
|---|---|
| journal_id | journal_id |
| account_id | p.account_id |
| asset_type | p.instrument.quote_type |
| amount | ((p.instrument.cap_px - p.px) * (p.qty - p.qty_delivered) * -1 |

| posting_id | new UUID |
|---|---|
| journal_id | journal_id |
| account_id | p.account_id + ".reserve" |
| asset_type | p.instrument.base_type |
| amount | p.qty_delivered |

| posting_id | new UUID |
|---|---|
| journal_id | journal_id |
| account_id | p.account_id |
| asset_type | p.instrument.base_type |
| amount | p.qty_delivered * -1 |

7. Select associated long positions:

```
long_positions := select Positions(p) where p.instrument = i
and p.qty > 0
```

8. Sort long_positions according to physical delivery selection method (different embodiments may choose different methods):
    a. FIFO method: sort long_positions according to creation order
    b. LIFO method: sort long_positions according to reverse creation order
    c. Random method: sort long_positions according to random order
    d. Size-priority method: sort long_positions according to position size
    e. Any other method as determined by business requirements could be used here.
9. For each position (p) in long_positions:
    a. Determine how many physical coins are available to deliver for this position:

```
    deliver_qty := min(p.qty, total_qty_delivered)
    ``` b. If deliver_qty is < p.qty, determine how much collateral to deliver:

```
    deliver_collateral := (p.qty - deliver_qty) *
    p.instrument.cap_px
    ``` c. Generate ExpiryJournal

| journal_id | new UUID |
    |---|---|
    | business_date | current Date |
    | time | current Time |
    | observed_at | current Time |
    | description | e.g., "EXPIRATION {...}" |
    | account_id | *p.account_id* |
    | instrument_id | *p.instrument_id* |
    | position_id | *p.position_id* |
    | deliver_qty | *deliver_qty* | d. Generate Position Posting to close the position:

| posting_id | new UUID |
|---|---|
| journal_id | journal_id |
| account_id | p.account_id |
| asset_type | p.instrument_id |
| amount | p.qty * -1 |
| closes | p.position_id, (p.qty * -1) | e. If deliver_qty > 0, generate Simple Postings to deliver coins:

| posting_id | new UUID |
|---|---|
| journal_id | journal_id |
| account_id | p.account_id |
| asset_type | p.instrument.base_type |
| amount | deliver_qty |

| posting_id | new UUID |
|---|---|
| journal_id | journal_id |
| account_id | CLEARING_RESERVE_ACCOUNT |
| asset_type | p.instrument.base_type |
| amount | deliver_qty * -1 | f. if deliver_collateral > 0, generate Simple Postings to deliver collateral:

| posting_id | new UUID |
|---|---|

| | |
|---|---|
| journal_id | journal_id |
| account_id | p.account_id |
| asset_type | p.instrument.quote_type |
| amount | deliver_collateral |

| | |
|---|---|
| posting_id | new UUID |
| journal_id | journal_id |
| account_id | CLEARING_RESERVE_ACCOUNT |
| asset_type | p.instrument.quote_type |
| amount | deliver_collateral * -1 | g. For the alternate embodiment using CustomerReserveAccounts, generate SimplePostings to remove the reserved collateral (USD) from the account balance:

| | |
|---|---|
| posting_id | new UUID |
| journal_id | journal_id |
| account_id | p.account_id + ".reserve" |
| asset_type | p.instrument.quote_type |
| amount | p.px * p.qty |

| | |
|---|---|
| posting_id | new UUID |
| journal_id | journal_id |
| account_id | p.account_id |
| asset_type | p.instrument.quote_type |
| amount | p.px * p.qty * -1 | h. Reduce total qty to deliver by amount just delivered:

```
total_qty_delivered := total_qty_delivered - deliver_qty
``` i. Buyer can now withdraw BTC as per the Withdrawal Process for cryptocurrency.

Turning now to the Delivery Process Flowchart 1100 as shown in FIG. 11. First, at step 1102 the central control system retrieves configuration data from the System Control Database 145. The Configuration Data includes delivery_notify_time and delivey_window_duration. The delivery notify time may be configured to be a predetermined time during a 24-hour day. In one embodiment, the delivery notify time may be noon. Similarly, the delivery window duration may be configured to be a predetermined time after the delivery notify time, but before the delivery time, during which a person having the option of whether to select delivery in BTC or fiat currency may make their election. In one embodiment, the delivery window duration is 4 hours.

For each date, the process identifies all instruments that are due for delivery on that date, and then steps through the delivery process below for all instruments.

At step 1104, the central clearing system retrieves a first instrument(i) from the Instrument Database 140. Each instrument includes a data entry field of "maturity date" that stores the maturity date of the instrument. Once the instrument has been retrieved, the central clearing system calculates the delivery time as the sum of the delivery notify time and the delivery window duration. In an alternate embodiment, the delivery time is simply retrieved from the configuration database and is not computed.

At step 1106, it is determined whether the current time is the delivery time, and if not, then the process ends. Conversely, if the current time is the delivery time, then the process proceeds to step 1108 and the Central Clearing System selects expiring instruments from Instrument Database 140.

The process then proceeds to step 1110, where it is determined if there are any instruments having today as maturity date that have not yet been processed. If there are unprocessed instruments remaining, the process proceeds to step 1112 and the next instrument in the set of instruments expiring today is selected.

At step 1114 positions are selected where the instrument matches the Instrument (i) and the qty is less than zero. This is done by calling the getPositions function to get all positions and filtering (selecting) from the resulting list by the previously mentioned criteria, and assigning the filtered list to a variable named short_positions.

At step 1116 a value is computed by adding the sum, from short_positions, of the values of their qty_delivered fields and assigned to the variable total_qty_delivered.

At step 1118 a value is computed by adding the sum, from short_positions, of the values of: the product of (the difference between qty and qty_delivered from the position, times the difference between cap_px from the instrument associated with the position and px from the position) for each position, and that value is assigned to a variable named total_collateral.

At step 1120 a value is computed by adding the sum, from all short_positions, of the difference between the qty field and the qty_delivered field of each position, and then that value is assigned to a variable named total_qty_undelivered.

At step 1122 a value is computed by dividing total_collateral by total_qty_undelivered, and that value is assigned to a variable named collateral_per_coin.

At step 1124, the central clearing system creates an ExpiryJournal entry and saves it in the Ledger Transaction Database 155. As shown in the flowchart, the ExpiryJournal record includes: a journal_id field with a value of a new unique identifier UUID; a business_date field with a value of the current date; a time field with a value of the current time; an observed_at field with a value of the current time; a description field with a value of the Expiration; an instrument_id field current instrument_id; and a delivery quantity field that is set to zero.

Next, at step 1126, the set of instruments being processed is queried to determine if there are any short positions remaining by checking if the length of the list named short_positions is greater than zero. If no short positions are remaining, then the process proceeds to step 1140. However, if there are short positions remaining, then the process proceeds to step 1128.

At step 1128, the current position being processed is advanced to take the next from the listing of short_positions. Next, at step 1130, the central clearing system created a position posting to close out the short position. As shown in the flowchart, the position posting includes: a posting_id field with a value of a new unique identifier (UUID); a journal_id field with a value of the journal_id from the Expiryjournal created in the previous step; an account_id field with a value of the account_id associated with the position; an asset_type field with the instrument_id associated with the position; an amount field storing the inverse of the position quantity; and a closes field storing p.position_id, (p.qty*−1) which is the data pair including position_id from the Position (p), and the product of the qty from the Position (p) times −1.

Next at step 1132, the central clearing system determines whether the quantity that has already been delivered for the present position is greater than zero, and when it is greater than zero, the process proceeds to step 1138. Conversely, when the quantity that has already been delivered is not greater than zero, the process proceeds to step 1134 and the central clearing system Creates SimplePostings to deliver currency to the Seller for each coin that was delivered. As shown in the flowchart, the postings include: a posting_id field with a value of a new unique identifier (UUID); a journal_id field with a value of the journal_id from the Expiryjournal created in the previous step; an account_id field with a value of the account_id associated with the position; an asset_type field with the p.instrument.quote_type; an amount field storing (p.px*p.qty_delivered)

The second posting includes: a posting_id field with a value of a new unique identifier (UUID); a journal_id field with a value of the journal_id from the Expiryjournal created in the previous step; an account_id field with a value of the clearing reserve account; an asset_type field with the p.instrument.quote_type; an amount storing the inverse of (p.px*p.qty_delivered)

Next, at step 1136, in one embodiment, collateral was not returned at the time of coin reservation. Consequently, the central clearing system creates SimplePostings to return collateral for each coin that was delivered. As shown in the flowchart, the postings include: a posting_id field with a value of a new unique identifier (UUID); a journal_id field with a value of the journal_id from the Expiryjournal created in the previous step; an account_id field with a value of the account_id associated with the position; an asset_type field with the p.instrument.quote_type; an amount field storing ((p.instrument.cap_px−p.px)*p.qty_delivered, where cap_px field from the Instrument associated with the Position(p) (found by looking up the Instrument in the database where the symbol=the instrument_id in the Position) minus the px field from the Position(p), multiplied by the qty_delivered from the Position(p).

The second posting includes: a posting_id field with a value of a new unique identifier (UUID); a journal_id field with a value of the journal_id from the Expiryjournal created in the previous step; an account_id field with a value of the clearing reserve account; an asset_type field with the p.instrument.quote_type; an amount storing the inverse of ((p.instrument.cap_px−p.px)*p.qty_delivered) Again, here, p.instrument.cap_px refers from the cap_px field from the Instrument associated with the Position(p), and p.px refers from the px field from the Position(p), and so on.

Next, at step 1138, in an alternative embodiment including customer reserve accounts, the central clearing system creates simple postings to remove the reserved collateral and coins (USD and BTC) from the reserve account balanced. As shown in the flowchart, the four postings that are generated include: a first posting having a posting_id field with a value of a new unique identifier (UUID); a journal_id field with a value of the journal_id from the Expiryjournal created in the previous step; an account_id field with a value of the account_id associated with the account_id ".reserve" position; an asset_type field with the p.instrument.quote_type; an amount field storing ((p.instrument.cap_px−p.px)*p.qty_delivered).

A second posting including a posting_id field with a value of a new unique identifier (UUID); a journal_id field with a value of the journal_id from the Expiryjournal created in the previous step; an account_id field with a value of the account_id associated with the account_id of the owner of the position; an asset_type field with the p.instrument.quote_type; an amount field storing the inverse of ((p.instrument.cap_px−p.px)*p.qty_delivered)

A third posting including a posting_id field with a value of a new unique identifier (UUID); a journal_id field with a value of the journal_id from the Expiryjournal created in the previous step; an account_id field with a value of the account_id associated with the account_id ".reserve" position; an asset_type field with the p.instrument.base_type; an amount field storing p.qty_delivered).

A fourth posting including a posting_id field with a value of a new unique identifier (UUID); a journal_id field with a value of the journal_id from the Expiryjournal created in the previous step; an account_id field with a value of the account_id associated with the account_id of the owner of the position; an asset_type field with the p.instrument.base_type; an amount field storing the inverse of p.qty_delivered)

The process then proceeds to step 1140. At step 1140, the set of long positions with today as the expiry data is determined by retrieving all positions using the getPositions function, and filtering/selecting the resulting list according to those whose instrument_id matches the Instrument(i) and whose qty is greater than zero.

At step 1142, in one embodiment, a ratio of BTC and USD collateral is delivered such that all recipients receive the same ratio of BTC to USD. This embodiment need not employ the sorting discussed below in steps 1146 and later. As shown in the flowchart, the coin ration is determined by dividing the total quantity delivered by the sum of the total quantity delivered and the total quantity undelivered. the total_qty_delivered may be determined at step 1116; and total_qty_undelivered may be determined at step 1120] Then, at step 1144, the collateral_ratio is determined a 1 minus the coin ratio.

At step 1146, the set of long positions that have been identified as expiring today are automatically sorted according to a predetermined physical delivery selection method. In a first embodiment shown in step 1148, the long positions are sorted according to creation order in a First-In-First-Out model. The creation order is known from the dates in the postings that were created when the long position was initiated. In a second embodiment shown at step 1150, the long positions are sorted in a Last-In-First-Out model according to reverse creation order. In a third embodiment shown at step 1152, the long positions are sorted randomly. In a fourth embodiment shown at step 1154, the long positions are sorted in size priority, with long positions associated with a greater quantity value being ordered first.

Once sorted, the process proceeds to step 1154 where it is determined when there are any unprocessed long positions remaining, and if none are remaining, then the process proceeds to step 1156. However, if at least one unprocessed long position is remaining, then the process proceeds to step 1160. At step 1160, the current position being processed is advanced to the next unprocessed long position in the sorted list of long positions.

Then, at step 1162, the central clearing system generates a position posting to close out the long position. As shown in the flowchart, the position posting includes: a posting_id field with a value of a new unique identifier (UUID); a journal_id field with a value of the journal_id from the Expiryjournal created in the previous step; an account_id field with a value of the account_id associated with the position; an asset_type field with the instrument_id of the current position an amount field storing the inverse of the quantity of the present position, and a closes field storing the data pair of p. position_id and (p.qty*−1).

Next, at step 1164, the central clearing system determined how many physical or individual coins are available to deliver for this position. The delivery_quanitity is determined as the lesser of the quantity of coins in the current long position and the total_quantity_delivered).

At step 1166, in an alternative embodiment where those receiving BTC receive an equal proportional delivery of BTC and USD, instead it is determined how may physical coins to deliver for this position by determining a delivery_quantity equal to the quantity of the current position multiplied by the coin_ratio.

At step 1168, the process determines whether the delivery quantity is less than the quantity of coins associated with the present position, and if not, then the process proceeds to step 1175. However, if the delivery quantity is less than the quantity of coins associated with the present position, then the process proceeds to step 1170 and the central clearing system determines how much USD collateral to deliver. In one embodiment, subtract the value of delivery_qty from the value of the qty field of the Position(p), and multiply that by the value of cap_px from the Instrument associated with the Position, and assign the result to a variable named deliver_collateral.

At step 1172, in the instance of the alternative embodiment where those receiving BTC receive an equal proportional delivery of BTC and USD, instead it is determined how much USD collateral to deliver using the following formula: multiply the value of the qty field from the Position (p) times the value of collateral_ratio (from step 1144), then multiply by the cap_px from the Instrument associated with the Position(p), then assign the result to a variable named deliver_collateral.

At step 1174, the central clearing system creates a pair of simple postings to deliver the collateral. As shown in the flowchart, the first posting includes a posting_id field with a value of a new unique identifier (UUID); a journal_id field with a value of the journal_id from the Expiryjournal created in the previous step; an account_id field with a value of the account_id associated with the position; an asset_type field with the p.instrument.quote_type; an amount field storing the amount of USD collateral to be delivered to the account associated with the position.

The second posting includes: a posting_id field with a value of a new unique identifier (UUID); a journal_id field with a value of the journal_id from the Expiryjournal created in the previous step; an account_id field with a value of the clearing reserve account; an asset_type field with the p.instrument.quote_type; an amount storing the inverse of amount of USD collateral to be delivered to the account associated with the position.

Next, at step 1175, the process determines whether the delivery quantity is greater than zero, and if not, proceeds to step 1180. However, if the deliver quantity is greater than zero, then the process proceeds to step 1176 and the central clearing system generates a pair of simple postings in order to deliver BTC. As shown in the flowchart, the first posting includes a posting_id field with a value of a new unique identifier (UUID); a journal_id field with a value of the journal_id from the Expiryjournal created in the previous step; an account_id field with a value of the account_id associated with the position; an asset_type field with the p.instrument.base_type; an amount field storing the amount of BTC to be delivered to the account associated with the position.

The second posting includes: a posting_id field with a value of a new unique identifier (UUID); a journal_id field with a value of the journal_id from the Expiryjournal created in the previous step; an account_id field with a value of the clearing reserve account; an asset_type field with the p.instrument.base_type; an amount storing the inverse of amount of BTC collateral to be delivered to the account associated with the position.

The process then proceeds to step 1178 and the total_quantity_delivered of BTC is decremented by the delivered quantity of BTC.

Next, step 1180 illustrates an alternative embodiment when customer reserve accounts are employed. In this embodiment, the central clearing system creates two simple postings to remove the reserved collateral (USD) from the account balance associated with the current position. As shown in the flowchart, the first posting includes a posting_id field with a value of a new unique identifier (UUID); a journal_id field with a value of the journal_id from the Expiryjournal created in the previous step; an account_id field with a value of the account_id+"reserve" associated with the position; an asset_type field with the p.instrument.quote_type; and an amount field storing p.px*p.qty.

The second posting includes: a posting_id field with a value of a new unique identifier (UUID); a journal_id field with a value of the journal_id from the Expiryjournal created in the previous step; an account_id field with a value of the account_id associated with the position; an asset_type field with the p.instrument.quote_type; and an amount field storing the inverse of p.px*p.qty.

The process then proceeds to step 1156. At step 1156, the central clearing system sums the amount fields of all of the new postings that have been created in the process and determined whether the sun is equal to zero. If not, the process proceeds to step 1158 and an alert is initiated and passed to the central clearing system and other systems.

The summation in step 1156 operates as a verification because each adjustment creates a pair of postings with equal and opposite amount fields. Therefore, if the sum of all postings does not equal zero, something has gone wrong in the process.

If the sum does equal zero, then the process proceeds to step 1159 and the central clearing system saves the new postings in the Ledger Transaction Database 155.

FIGS. 12A, 12B, 12C, and 12D illustrates a Cryptocurrency Withdrawal Process Flowchart 1200 for withdrawing cryptocurrency (e.g. BTC) from the clearing system according to embodiments of the present invention.

First, at step 1202, the Buyer Computer System 105 authenticates with the Central Clearing System, and identifies the account_id belonging to Buyer Computer System 105. In one embodiment, the authentication data elements of the account_id and password are received from a user.

At step 1204, the central clearing system sends the authentication data to the User Authentication System 135 for verification. The User Authentication System 135 verifies the authentication data by comparing the received authentication data with previously stored authentication data at the User Authentication System 135.

Next, at step 1206, the Buyer Computer System 105 sends a cryptocurrency withdrawal request (r) to the Central Clearing System via API or user interface. The request includes the cryptocurrency type code, for example 'BTC'. This request indicates that a user is attempting to withdraw cryptocurrency from the central clearing system. As shown in the flowchart the request data includes asset_type, such as BTC for Bitcoin; the buyer's account_id; the amount of BTC, and the Buyer's wallet blockchain address.

Then, at step 1208, the Central Clearing System retrieves the ClearingAccount (a) from Ledger Account Database 150 where the clearing account includes an account_id that matches the account_id in the request data.

At step 1210, the central clearing system, for the account_id and specific asset_type, determines the unreserved balance using the getUnreservedBalance function described previously that is associated with the clearing account, as further described herein. Then, at step 1212, the Central Clearing System performs a preliminary check by comparing the requested amount of cryptocurrency to be withdrawn to the account balance for the account_id.

At step 1214, when the requested amount is greater than the account balance, the process proceeds to step 1216 and the central clearing system sends an error message to the Buyer Computer System 105.

Otherwise, when the requested amount is equal to or less than than the account balance, the process proceeds to step 1218, which is one optional embodiment, as indicated in the flowchart. At step 1218, the Central Clearing System sends a message to the Trade Determination System 130 including the requester's account_id, requested amount, and requested asset_type and instructs it to decrease the trading limit.

At step 1220, the Trade Determination System 130 attempts to decrease trading limit. At step 1222, it is determined whether the decrease exceeds the available balance for trading. If so, the process proceeds to step 1224 and the Trade Determination System 130 returns an error message to the central clearing system and then, at step 1226, the Central Clearing System sends and error message to the Buyer Computer System 105.

Otherwise, at step 1222, when the decrease does not exceed the available balance, the process proceeds to step 1228 and the Trade Determination System 130 decreases the trading limit. Next, at step 1230, the Trade Determination System 130 sends a success message to the central clearing system.

Next, at step 1232, Central Clearing System retrieves configuration data information about the custodial wallet (wallet_id) from System Control Database 145. At step 1234, the Central Clearing System retrieves the WalletAccount (w) record from the Ledger Account Database 150 where the wallet account is identified by the wallet_id.

At step 1236, Central Clearing System submits an outbound transaction to the Central Clearing Bitcoin Wallet 117 using the requester's address as a destination. As shown in the flowchart, the wallet transaction data includes the wallet_id of the custodial wallet, the asset_type requested, such as BTC, the address of the requester's wallet and the amount to be transferred.

At step 1240, at the Central Clearing Bitcoin Wallet 117, retrieves blockchain wallet details for the given wallet_id and asset_type from its configuration. At step 1242, the Central Clearing Bitcoin Wallet 117 computes the necessary blockchain fee to be included in the transaction. At step 1244, the Central Clearing Bitcoin Wallet 117 creates a transaction for sending the amount of cryptocurrency indicated in the wallet transaction data to the address of the requester as indicated in the wallet transaction data, and also includes a computed fee. Next, at step 1246, the Central Clearing Bitcoin Wallet 117 signs the transaction using the private wallet signing key.

At step 1248, an alternate embodiment may employ a multisignature wallet. In such an embodiment, the Central Clearing System signs the transaction using an additional 2nd private wallet signing key, and sends the signature to the Central Clearing Bitcoin Wallet 117.

At step 1250, the Central Clearing Bitcoin Wallet 117 sends the fully signed transaction to the Blockchain Network.

Then, at step 1252, the Blockchain Network verifies the signed transaction using standard blockchain technology. At step 1254, the Blockchain Network mines the signed transaction into a block. At step 1256, the Blockchain Network sends the mined block, including the signed transaction, to the Central Clearing Bitcoin Wallet 117. At step 1258, the Blockchain Network sends additional blocks, as they are mined and added to the blockchain, to the Central Clearing Bitcoin Wallet 117.

At step 1260, the Central Clearing Bitcoin Wallet 117 counts the number of blocks in the blockchain following the new transaction. Then, at step 1262, the Central Clearing Bitcoin Wallet 117 sends a Notification Data (n) to the Central Clearing System notifying of the new transfer, including the asset_type, amount, fees paid, destination address, and number of blocks mined following the transaction.

Then, at step 1264, the Central Clearing System generates a WithdrawalJournal record and stores it in the ledger transaction database. The WithdrawalJournal record includes: a journal_id field with a value of a new unique identifier UUID; a business_date field with a value of the current date; a time field with a value of the time from the wire transaction data; an observed_at field with a value of the current time; a description field with a value of the withdrawn amount and/or asset_type; an account_id field with a value of the Withdrawal account_id; an asset_type field with a value of the cryptocurrency type being withdrawn, such as BTC, an amount field with a value of the amount of cryptocurrency being withdrawn, and a fee amount field including data representing the fee amount charged.

At step 1268, the Central Clearing System generates SimplePostings to record the withdrawal and saves them in the Ledger Transaction Database 155. As shown in the flowchart, the first simple posting includes: a posting_id field with a value of a new unique identifier (UUID); a journal_id field with a value of the journal_id from the withdrawal journal created in the previous step; an account_id field with a value of the withdrawal account_id; an asset_type field with the value of the asset_type from the withdrawal journal created in the previous step; and an amount field with a value of the inverse of the amount from the withdrawal journal created in the previous step.

The second posting includes: a posting_id field with a value of a new unique identifier (UUID); a journal_id field with a value of the journal_id from the withdrawal journal created in the previous step; an account_id field with a value of the withdrawal wallet account_id; an asset_type field with the value of the asset_type from the withdrawal journal created in the previous step; and an amount field with a value of the amount from the withdrawal journal created in the previous step.

At step 1270, the Central Clearing System generates SimplePostings to record the fees paid and saves them in the Ledger Transaction Database 155. As shown in the flowchart, the first simple posting includes: a posting_id field with a value of a new unique identifier (UUID); a journal_id field with a value of the journal_id from the withdrawal journal created in the previous step; an account_id field with a value of the clearing fee account; an asset_type field with the value of the asset_type from the withdrawal journal created in the previous step; and an amount field with a value of the inverse of the fee amount from the withdrawal journal created in the previous step.

The second posting includes: a posting_id field with a value of a new unique identifier (UUID); a journal_id field with a value of the journal_id from the withdrawal journal created in the previous step; an account_id field with a value of the withdrawal wallet account_id; an asset_type field with the value of the asset_type from the withdrawal journal created in the previous step; and an amount field with a value of the fee amount from the withdrawal journal created in the previous step.

Alternatively, although the above embodiment was described in terms of a Buyer and Buyer Computer, the above process may also be performed by the Seller Computer System 110, following the same steps but replacing Buyer with Seller.

FIGS. 13A, 13B, 13C, and 13D illustrates a Fiat currency Withdrawal Process Flowchart 1300 for withdrawing fiat currency (e.g. USD) from the clearing system according to embodiments of the present invention.

First, at step 1302, the Seller Computer System 110 authenticates with the Central Clearing System, and identifies the account_id belonging to Seller Computer System 110. In one embodiment, the authentication data elements of the account_id and password are received from a user.

At step 1304, the central clearing system sends the authentication data to the User Authentication System 135 for verification. The User Authentication System 135 verifies the authentication data by comparing the received authentication data with previously stored authentication data at the User Authentication System 135.

Next, at step 1306, the Seller Computer System 110 sends a fiat withdrawal request (r) to the Central Clearing System via API or user interface. The request includes the fiat type code, for example 'USD'. This request indicates that a user is attempting to withdraw fiat currency from the central clearing system. As shown in the flowchart the request data includes asset_type, such as USD for U.S. Dollar; the seller's account_id; the amount of USD, and the Seller's bank account information.

Then, at step 1308, the Central Clearing System retrieves the ClearingAccount (a) from Ledger Account Database 150 where the clearing account includes an account_id that matches the account_id in the request data.

At step 1310, the central clearing system, for the account_id and specific asset_type, determines the unreserved balance using the getUnreservedBalance function as described previously that is associated with the seller's account, as further described herein. Then, at step 1313, the Central Clearing System performs a preliminary check by comparing the requested amount of fiat currency to be withdrawn to the account balance for the account_id.

At step 1314, when the requested amount is greater than the account balance, the process proceeds to step 1316 and the central clearing system sends an error message to the Seller Computer System 110.

Otherwise, when the requested amount is equal to or less than the account balance, the process proceeds to step 1318. At step 1318, the Central Clearing System sends a message to the Trade Determination System 130 including the requester's account_id, requested amount, and requested asset_type and instructs it to decrease the trading limit.

At step 1320, the Trade Determination System 130 attempts to decrease trading limit. At step 1322, it is determined whether the decrease exceeds the available balance for trading. If so, the process proceeds to step 1324 and the Trade Determination System 130 returns an error message to the central clearing system and then, at step 1326, the Central Clearing System sends and error message to the Seller Computer System 110.

Otherwise, at step 1322, when the decrease does not exceed the available balance, the process proceeds to step 1328 and the Trade Determination System 130 decreases the trading limit.

Next, at step 1332, Central Clearing System retrieves configuration data information including the custodial bank account (bank account_number) from the System Control Database 145. At step 1334, the Central Clearing System retrieves the bank account(b) record from the Ledger Account Database 150 where the bank account record is identified by the bank account_number.

At step 1336, Central Clearing System submits an outbound transaction to the Central Clearing Bank according the standard industry conventions. The Bank Transaction Data includes data with regard to the clearing bank account/source_account, destination bank account information including number, destination routing number, amount to be transferred, transfer method, and currency type.

Then, at step 1368, the Central Clearing System generates a WithdrawalJournal record and stores it in the Ledger Transaction Database 155. The WithdrawalJournal record includes: a journal_id field with a value of a new unique identifier UUID; a business_date field with a value of the current date; a time field with a value of the time from the wire transaction data; an observed_at field with a value of the current time; a description field with a value of the withdrawn amount and/or asset type; an account_id field with a value of the Withdrawal account_id; an asset_type field with a value of the fiat currency type being withdrawn, such as USD, and an amount field with a value of the amount of fiat currency being withdrawn.

At step 1370, the Central Clearing System generates two SimplePostings to record the withdrawal and saves them in the Ledger Transaction Database 155. As shown in the flowchart, the first simple posting includes: a posting_id field with a value of a new unique identifier (UUID); a journal_id field with a value of the journal_id from the withdrawal journal created in the previous step; an account_id field with a value of the withdrawal account_id; an asset_type field with the value of the asset_type from the withdrawal journal created in the previous step; and an amount field with a value of the inverse of the amount from the withdrawal journal created in the previous step.

The second posting includes: a posting_id field with a value of a new unique identifier (UUID); a journal_id field with a value of the journal_id from the withdrawal journal created in the previous step; an account_id field with a value of the withdrawal wallet account_id; an asset_type field with the value of the asset_type from the withdrawal journal created in the previous step; and an amount field with a value of the amount from the withdrawal journal created in the previous step.

Alternatively, although the above embodiment was described in terms of a Seller and Seller Computer, the above process may also be performed by the Buyer Computer System 105, following the same steps but replacing Seller with buyer.

FIGS. 14A, 14B, 14C, and 14D illustrate an alternative embodiment of the delivery/expiration notification process flowchart 1400, according to an embodiment of the present invention. In an alternate embodiment, the Deposit Process for Cryptocurrency and the Reserve Process for s Seller to reserve cryptocurrency may be combined into one streamlined process. See the "Delivery/Expiration Notification Process" flowchart, with the optional steps for "combined deposit/reserve" included, for detailed illustration.

The process starts when the Clearing System sends notification to the Seller Computer System 110s that a contract is expiring. In this embodiment, the Clearing System also generates a blockchain address for each unique account & instrument combination, and includes it in the notification. The Seller Computer System 110 may then instruct the Seller Bitcoin Wallet 112 to send cryptocurrency to that address. The Clearing System receives the BTC and associates the BTC with the appropriate account_id according to the process illustrated in the "Cryptocurrency Deposit Process" flowchart (with the "combined deposit/reserve" optional embodiment steps included). Finally, as illustrated in the "Cryptocurrency Deposit Process" flowchart and "Reserve Coins for Delivery" flowchart (with the "combined deposit/reserve" optional embodiment steps included), the Central Clearing System automatically reserves the just-deposited bitcoins for delivery of the associated short position, with no further action necessary by the Seller Computer System 110.

Turning to the delivery/expiration notification process flowchart 1400, first at step 1402, the clearing system retrieves the configuration data including the delivery_notify_time from the System Control Database 145. Next, at step 1404 it is determined whether the current time is the delivery notify time and if not, the process simply waits. However, if the current time is the delivery notify time, the process proceeds to step 1406 where the central clearing system identifies and selects the set of expiring instruments from the Instrument Database 140. Instruments are identified as expiring when the instrument includes a field having a maturity date that is the current day.

Next, at step 1408 set of instruments is checked to see if there are any instruments remaining in the set and when not, the process ends. However, when there are instruments remaining in the set, the process proceeds to step 1410 and the current instrument is incremented to the next instrument in the set.

At step 1412, the set of short positions based on the instruments are identified. The short positions are identified when p.instrument=1 and p.qty<0. This is done by obtaining all positions using the getPositions function, and filtering/selecting from the results only those that match the criteria.

Next, at step 1412, the set of short positions is checked to see if there and any unprocessed short positions remaining, and when not, the process ends. However, when there are short positions remaining, the process proceeds to the next step.

Step 1418 is an alternative embodiment discussed at steps 1434-1444 below.

Next, at step 1420, p.qty_delivered<p.qty is checked (we are looping through each position in short_positions, referring to it as (p), and here we are comparing its qty_delivered to see if it is less than its qty), and when not, the process ends. However, when p.qty_delivered<p.qty, the process proceeds to step 1422.

At step 1422, the central clearing system retrieves configuration data including the delivery window_duration from the System Control Database 145. At step 1424, the delivery deadline is computed. As shown, the delivery time is the maturity date retrieved from the instrument, with the delivery_notify_time retrieved from the System Control Database 145 applied on the maturity date, plus the delivery_window_duration retrieved from the System Control Database 145.

At step 1426, the central clearing system retrieves the associated client clearing account from the Ledger Account Database 150. In one embodiment, the account_id associated with the current position being processed is used to find the ledger account associated with that account_id and return is as variable (a).

Step 1428 presents an alternative embodiment discussed at steps 1450-1452.

Next, at step 1430, Seller Computer System 110 associated with the account_id is sent a notification, for example, by e-mail or displayed in a user interface. As shown in the flowchart, the notification data includes: contact info for the seller computer determined from the ledger account, the delivery time computed above, the instrument data, the position data, and the deposit account address in an alternative embodiment as described at step 1460 below.

Once the Seller Computer System 110 receives the notification data, the Seller Computer System 110 may optionally select to deliver BTC by following the Reserve process starting with step 1002. The seller's selection is then retrieved and implemented when the central clearing system processes the delivery at the delivery time. The user's response to the notification at this point is in fact the "Reserve Coins for Delivery" process—the results of which have an impact on the "Delivery Process" when the contract expires.

Steps 1434-1444 illustrate an alternative embodiment of an auto-reserve coins process. At step 1434, the central clearing system determined the total size foe all positions associated with an instrument and associated with an account. As shown at step 1436, this may be expressed as assigning the variable "positions" all positions that are associated with a specific account_id for a specific instrument where i.symbol is the value of the symbol field of the Instrument(i).

At step 1438, the process determines the total number of coins the need delivers from the set of positions which is the sum of the differences between the qty and qty_delivered fields for each position in the list of positions.

Next, at step 1440, the process determines the available BTC balance for an account_id by calling the getUnreservedBalance function with the value of the account_id field of the Position(p) and the value of the base_type field of the Instrument(i).

At step 1442, when the balance is greater than zero and the total_delivery is greater than zero, the process proceeds to step 1444 and the central clearing system automatically reserves coins for the position specified by the account_id and instrument_id by following the "reserve coins for delivery" process in the reserve coins for delivery flowchart of FIG. 10.

Steps 1450-1452 illustrate an alternative embodiment with a combined deposit/reserve process. In step 1450, the clearing system produces a deposit address that is unique to the account_id and instrument_id combination by following the "Cryptocurrency Deposit Process" flowchart, starting at (P) and ending at (Q), but providing an instrument_id in addition to the account_id to indicate that this deposit address should be used to reserve coins for deliver. As shown in the flowchart, the request data may include: an asset_type field storing the base_type of the instrument, an account_id field associated with the owner of a position in the instrument, and an instrument_id field storing the instrument_id of the instrument.

Then, at step 1452, the Central clearing system generated a depostAddress structure(da) that includes the following as deposit address data: asset_type, account_id, instrument_id, and address.

Finally, at step 1460, an alternative embodiment is presented for the combined deposit/reserve process wherein the seller initiated a cryptocurrency transfer to the deposit address identified in step 1452 according to the process described in the "Cryptocurrency deposit process" flowchart starting at (Q).

Although in the description above, a Bitcoin wallets are used, the bitcoin wallets may be substituted with equivalent wallets for other cryptocurrencies that support the above features. Popular cryptocurrencies supporting the functional equivalents of the above features include: Ethereum, Litecoin, Bitcoin Cash, ERC20 tokens, Zcash, Stellar, Ripple, Dash, Algorand, and others.

One or more of the embodiments of the present invention provide a trading system supporting capped futures which is unique offering and has never before been offered. The trading system provides a fully collateralized method to enter into a short position in futures instruments. The capped nature of the futures in the trading system provides the seller with a limited risk exposure and creates a deterministic risk profile for sellers and buyers such as FCMs (Futures Commissions Merchants) and managers to become comfortable. The trading system allows futures to be cash settled at expiry with original collateral plus profit or losses returned to position holders. Additionally, the trading system allows futures to be fully collateralized using currency such as USD, while providing for physical delivery of the underlying commodity such as BTC so that the settlement process is not subject to potential price manipulation of a derivative and/or reference price index, as a cash-settled instrument might be.

Some aspects that may be attractive in one or more embodiments of the present trading system include: 1) the system allows for trading a futures contract that includes a capped price established as data in the definition of the futures contract, 2) the trading system allows the financial obligations of the buyer and the seller to be fully funded at the time of the trade execution, and 3) at the time of settlement, the trading system may deliver the current value of the futures positions to the respective buyers and/or sellers, and said value may represent either currency or alternatively cryptocurrency provided by the seller. In an alternative embodiment, the trading system prevents trading of futures contracts above the capped price.

FIG. 19 illustrates exemplary futures contract specifications 1900 for trading in the present trading system according to one or more embodiments of the present invention. More specifically, FIG. 19 includes a Bitcoin specification 1910, a Bitcoin Cash specification 1920, an Ethereum specification 1930, and a Litecoin specification 1940. In addition to the cryptocurrencies specified, other popular cryptocurrencies may be employed including: ERC20 tokens, Zcash, Stellar, Ripple, Dash, Algorand, and others.

For each specification 1910-1940, the base currency underlying the futures contract is indicated at row 1950. Row 1955 indicates the symbol for the futures contract, which is composed of a "C" in front of the base currency and followed by the cap price that has been hardwired for the futures contract by establishing the cap_px in the instrument data structure.

Row 1960 lists the currency in which the trading system may quote the futures contract, which in one embodiment constituted U.S. Dollars, but may be any other currency. Row 1965 displays the quote convention which is recorded in the multiplier field of the instrument data structure. In one or more examples above, the multiplier may be 0.1 which indicates a quote convention of 0.1 BTC. However, in the example of FIG. 19, the multiplier is 1.0 which indicates a quote convention of 1.0 BTC.

Row 1970 displays the cap price which is set as the cap_px in the instrument data structure. Row 1975 displays the cap price rounding. For example, cap prices for BTC may be rounded to the nearest $1,000 based on an expected value of BTC in the range of $10,000. The other cryptocurrencies may have cap price increments of $100 or $50 based on their lower expected value ranges.

The collateral withheld in row 1980 illustrates the collateral that is withheld from the buyer and the seller at the time the futures contract is traded, For the buyer, the collateral is the number of contracts times the contract size (multiplier) times the trade price, for example as shown in FIG. 9 around steps 938, 947 and/or 951. Consequently, for a single contract with a size of 1, the collateral is the trade price paid in by the buyer at the time of the trade. Conversely, for the seller, the collateral is the number of contracts times the contract size (multiplier) times a quantity represented by the cap price minus the trade price, for example as shown in FIG. 9 around steps 938, 948 and/or 951. Thus, for a single contract with a size of 1, the collateral is the cap price minus the trade price, and that collateral is paid in by the seller at the time of the trade.

Figure 20:
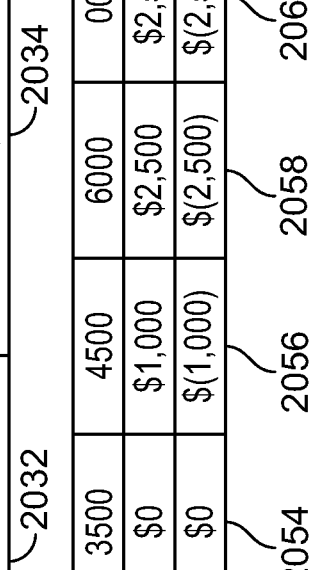
FIG. 20 illustrates a capped futures example for trading in the present trading system according to one or more embodiments of the present invention.

FIG. 20 illustrates a capped futures example 2000 for trading in the present trading system according to one or more embodiments of the present invention. The capped futures example 2000 includes capped future contract specifics 2001, transaction examples 2002, and exemplary profit and loss profiles at final settlement 2003, that illustrate several permutations of results of the trading system.

As mentioned above, the capped future contract specifics 2001 including the base currency 2012, symbol 2014, contract size 2016, and cap price 2018 are defined in the Instrument Data Structure. The current futures price 2020 represents the price at which the buyer agrees to buy and the seller agrees to sell the futures contract. In the present example, the symbol for the instrument may be CBTC-6000, representing that the underlying cryptocurrency is BTC and the cap price is $6,000 USD.

In the transaction examples 2002, in an exemplary transaction the buyer and seller have agreed to trade 10 futures contracts contract of 0.1 BTC each for $3,500. Consequently, for the buyer, as mentioned above, the collateral is the number of contracts (10) times the contract size (0.1 BTC) times the trade price ($3,500). Consequently, the total collateral withheld from the buyer 2032 by the trading system is $3,500.

For the seller, the seller's collateral 2034 is the number of contracts (10) times the contract size (0.1 BTC) times a quantity represented by the cap price minus the trade price ($6,000−$3,500=$2,500). Consequently, the total collateral withheld from the seller by the trading system is $2,500.

In one embodiment, prior to the trade, the buyer deposits US dollars into the trading system (for example $10,000), as described in FIG. 8 flowchart 800. Similarly, the seller deposits US dollars into the trading system (for example $10,000), as described in FIG. 8 flowchart 800. Once the Buyer and Seller agree to trade 10 contracts of BTC-6000 at a price of 3500, the Trade Determination System sends the trade to the Central Clearing Computer System, as described in FIG. 9 flowchart 900. The position postings associated with the buyer are then created by the Central Clearing Computer System so that the account_id of the buyer is associated with a long position of 10 contracts, for example as discussed above around FIG. 9, step 949. Further, position postings are created so that $3,500 from the buyer is placed in reserve, for example as discussed around FIG. 9, step 951, by decrementing the available trading funds associated with the buyer and increasing the available funds associated with the reserve account.

Similarly, position postings associated with the seller are created by the Central Clearing Computer System so that the account_id of the seller is associated with a short position of 10 contracts, for example as discussed above around FIG. 9, step 949. Further, position postings are created so that $2,500 from the seller is placed in reserve, for example as discussed around FIG. 9, step 951, by decrementing the available trading funds associated with the seller and increasing the available funds associated with the reserve account.

As discussed above at final settlement on the expiration date of the futures contract, the seller is notified about the delivery window during which the seller may provide BTC to settle the futures contract instead of currency, for example as shown in FIG. 14 around step 1430. The seller may choose to deposit BTC or settle in cash depending on the settlement price—the price of the underlying BTC as of the date of expiration.

Whether the seller chooses to settle in BTC or cash is further explored in the exemplary profit and loss profiles at final settlement 2003. At the expiry date, if the seller chooses to delivery BTC, the seller must obtain 1 BTC (10 contracts of 0.1 BTC each) at market price. In the scenarios 2052-2060 shown, the market price of 1 BTC varies from $2,500 USD to $7,000 USD and the actions of the seller based on the market price are explored. It is noted that the market value of BTC that the seller must pay to acquire it is considered a "loss" or "cost" by the Seller associated with the transaction when determining the profit or loss.

Once the seller has acquired the BTC, the seller deposits the BTC with the trading system as discussed above in FIG. 7 flowchart 700. The Seller then reserves the BTC for delivery, as discussed above in FIG. 15, flowchart 1500 and FIG. 10, flowchart 1000. When the BTC is placed in reserve (for example as described around step 1044 in FIG. 10), the seller has now fully collateralized the trade, so the $2,500 that was previously withheld as collateral is released to the seller (for example as described around step 1046 in FIG. 10).

At final settlement, the seller receives the contract price that was previously withheld from the buyer, in this case $3,500 (for example as described around step 1134 in FIG. 11). Also, at final settlement, the buyer receives the BTC (for example as described around step 1176 in FIG. 11) or may receive currency.

The end result of the trade in terms of profit or loss to the seller can be considered to be the trade price minus the market value of the BTC on the date of expiration, as explored using different market values in the scenarios 2052-2060 as discussed below.

In the first scenario 2052, the value of BTC on the date of expiration is $2,500. Consequently, the profit and loss for the seller is the $3,500 of collateral that was withheld from the buyer at the time of the trade minus the acquisition value of 1 BTC as of the futures contract expiration date of $2,500. Thus, $3,500-$2,500 represents a gain of $1,000 for the seller.

In the first scenario 2054, the value of BTC on the date of expiration is $3,500. Consequently, the profit and loss for the seller is the $3,500 of collateral that was withheld from the buyer at the time of the trade minus the acquisition value of 1 BTC as of the futures contract expiration date of 3,500. Thus, $3,500-$3,500 represents a gain of zero for the seller.

In the third scenario 2056, the value of BTC on the date of expiration is $4,500. Consequently, the profit and loss for the seller is the $3,500 of collateral that was withheld from the buyer at the time of the trade minus the acquisition value of 1 BTC as of the futures contract expiration date of $4,500. Thus, $3,500-$4,500 represents a loss of $1,000 for the seller.

In the fourth scenario 2058, the value of BTC on the date of expiration is $6,000. Consequently, the profit and loss for the seller is the $3,500 of collateral that was withheld from the buyer at the time of the trade minus the acquisition value of 1 BTC as of the futures contract expiration date of $6,000. Thus, $3,500-$6,000 represents a loss of $2,500 for the seller.

In the fifth scenario 2060, the value of BTC on the date of expiration is $7,000. Consequently, the profit and loss for the seller is the $3,500 of collateral that was withheld from the buyer at the time of the trade minus the acquisition value of 1 BTC as of the futures contract expiration date of $7,000. Thus, $3,500-$7,000 would represent a loss of $3,500 for the seller—if the seller chose to settle the trade using BTC. Alternatively, if the seller failed to deliver a BTC, the seller's would not be credited with the collateral withheld from the buyer at the time of the trade ($3,500) and would sacrifice the value of the collateral previously collected from the seller (which is $2,500 in this case)—for a total loss of $2,500. Consequently, in the fifth scenario, where the price of BTC has risen above the cap rate of $6,000, it is anticipated that a rational seller would simply fail to deliver the BTC, not be credited with the collateral withheld from the buyer, and sacrifice the previously collected collateral of $2,500 because the total loss ($2,500) is less than that if the seller actually delivered the BTC ($3,500). Consequently, the loss to the seller when the value of BTC rises to $7,000 is capped at the seller's collateral value—$2,500. In this fashion, the current futures contracts are said to be "capped" because the maximum loss incurred by a rational seller takes place when the price of the underlying BTC rises to the cap price. Additional increases in the underlying BTC do not generate additional loss for the seller because the seller simply sacrifices the previously withheld collateral.

The end result of the trade in terms of profit or loss to the buyer can be considered to be the market value of BTC minus the collateral withheld from the buyer (for example as described in FIG. 9 around step 951).

For the buyer, in the first scenario 2052, where the value of BTC on the date of expiration is $2,500, the profit and loss for the buyer is the acquisition value of 1 BTC as of the futures contract expiration date of $2,500 minus the $3,500 of collateral that was withheld from the seller at the time of the trade. Thus, $2,500-$3,500 represents a loss of $1,000 for the buyer.

In the second scenario 2054, where the value of BTC on the date of expiration is $3,500, the profit and loss for the buyer is the acquisition value of 1 BTC as of the futures contract expiration date of $3,500 minus the $3,500 of collateral that was withheld from the seller at the time of the trade. Thus, $3,500-$3,500 represents a loss of zero for the buyer.

In the third scenario 2056, where the value of BTC on the date of expiration is $4,500, the profit and loss for the buyer is the acquisition value of 1 BTC as of the futures contract expiration date of $4,500 minus the $3,500 of collateral that was withheld from the seller at the time of the trade. Thus, $4,500-$3,500 represents a gain of $1,000 for the buyer.

In the fourth scenario 2056, where the value of BTC on the date of expiration is $6,000, the profit and loss for the buyer is the acquisition value of 1 BTC as of the futures contract expiration date of $6,000 minus the $3,500 of collateral that was withheld from the seller at the time of the trade. Thus, $6,000-$3,500 represents a gain of $2,500 for the buyer.

In the fifth scenario 2056, where the value of BTC on the date of expiration is $7,000, the profit and loss for the buyer is the acquisition value of 1 BTC as of the futures contract expiration date of $7,000 minus the $3,500 of collateral that was withheld from the seller at the time of the trade. Thus, $7,000-$3,500 would represent a gain of $3,500 for the buyer—if the seller chose to actually acquire and deliver the BTC. However, as discussed above, once the value of BTC has passed the $6,000 cap price, it is economically rational for the seller to decline to acquire and deliver the BTC and simply sacrifice their previously withheld collateral ($2,500) to the buyer, and the buyer's previously collected collateral of $3,500 would be returned, thus providing the buyer with a gain of $2,500.

As mentioned above, when the value of the underlying BTC exceeds the cap price, the seller would not be economically rational to deliver a BTC because it would result in a greater loss. As a result, the seller would receive nothing (for example, in FIG. 11, around step 1132, the p.qty_delivered=0). The seller would forfeit their reserve, which is the $2,500 of collateral collected from the seller at the time that the futures contract trade with the buyer took place (for example, as described in FIG. 11, around steps 1132 and 1138). The buyer would receive a total of $6,000 (for example, as described in FIG. 11, around step 1174) representing a return of the collateral previously collected from the buyer of $3,500 and the collateral previously collected from the seller of $2,500. As can be appreciated, regardless of additional increases in the underlying BTC beyond the cap price, the seller would economically rationally merely decline to deliver the BTC, do regardless of increase in BTC, the seller loses at most $2,500 and the buyer gains at most $2,500.

Consequently, in one embodiment, the capped future trading system is designed to limit the risk for the seller by using a capped price for the future. In essence when a seller enters into a short position of a capped future the monetary risk to which the seller exposed is limited by the cap. Additionally, in one embodiment, the fully collateralized nature of the capped future require the seller of the regular physical delivered future to post coins as collateral before they can place a selling order and as such this does not represent a short position. However, the capped future design allows for the seller to use their fiat currency such as USD as the collateral providing a true short position. The capped futures trading system may appeal to traders who wish to capitalize on any downward moves in the underlying crypto coins.

In one embodiment, the value of the cap may be determined by the historical volatility of the underlying cryptocurrency prior to making the contract active for trading. For example, the cap price may be set to 2 or 3 standard deviations higher than the current underlying price. In one embodiment, the cap may be set high enough that it will not be reached during the life of the contract.

In one embodiment, when the price of the underlying cryptocurrency gets close to the cap or exceeds the cap before the expiry of the futures contract, the trading system may list a new future contract with the same expiration date at a higher cap price. The trading system may proactively monitor so that if needed a new instrument may be listed before the cap is reached.

In one embodiment, the trading system may determine the daily and final settlement prices based on a weighted average price of executed trades in the futures contract during 15:30 CST and 16:00 CST on each trading day and the final trading day.

Additionally, both capped and uncapped (regular) futures contracts may be listed for each product/cryptocurrency.

In one embodiment, expiry periods may be similar to regular physical futures which include daily, weekly, monthly, and quarterly expirations.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A blockchain enabled electronic futures trading system comprising:
a central clearing computer system comprising one or more processors configured to:
obtain data indicative of a match between a buy instruction associated with a buyer computer system and a sell instruction associated with a seller computer system from a trade determination system for a futures instrument represented by futures instrument data stored in a futures instrument database, wherein said futures instrument is a future based on a value of a bitcoin;
transmit a first notification to the seller computer system to indicate the central clearing computer system is enabled to accept an electronic transfer of bitcoin from a seller bitcoin wallet associated with the seller computer system to a central clearing bitcoin wallet associated with the central clearing computer system;
receive authentication data from the seller computer system for verification;
accept, through the central clearing bitcoin wallet from the seller bitcoin wallet, an amount of bitcoin equal to the amount of bitcoin represented by the futures instrument data;
perform the electronic transfer using a blockchain by:
receiving a deposit address associated with the blockchain from the central clearing bitcoin wallet, wherein the deposit address is generated by retrieving a last address index from a memory and incrementing the last address index;
creating a deposit address record comprising a first field storing an identifier of a ledger account associated with the deposit address, and a second field storing the deposit address;
providing a string or a quick response (QR) code representing the deposit address to the seller computer system;
receiving a second notification from the central clearing bitcoin wallet informing the amount of bitcoin recorded at the deposit address indicated in the deposit address record, in response to a transaction signed by the seller bitcoin wallet using a private wallet signing key and submitted to a blockchain network that verifies and mines the signed transaction into a block of the blockchain, wherein the second notification includes the amount of bitcoin and a number of mined blocks following the transaction in the blockchain;
in response to the number of mined blocks being larger than a predefined threshold, generating a deposit journal that is saved in a ledger transaction database, wherein the deposit journal includes the amount of bitcoin and time of the transaction; and
in response to expiration of the futures instrument, controlling transfer of the amount of bitcoin represented by the futures instrument data from the central clearing bitcoin wallet to a buyer bitcoin wallet associated with the buyer computer system.

2. The system of claim 1 wherein the trade determination system includes a seller trading limit associated with the seller computer system.

3. The system of claim 2 wherein the trade determination system is configured to automatically deny sell instructions from the seller computer system when the sell instructions exceed the seller trading limit.

4. The system of claim 1 wherein the central clearing computer system additionally includes a seller computer system deposited bitcoin amount representing bitcoin previously transmitted to the central clearing bitcoin wallet by the seller computer system.

5. The system of claim 4 wherein, in response to obtaining data indicative of the match between the buy instruction and the sell instruction from the trade determination system, the central clearing computer system is configured to deduct from the deposited bitcoin amount an amount of bitcoin equal to the amount of bitcoin represented by the futures instrument data.

6. The system of claim 1, wherein the deposit address is rendered into the QR code and provided to the seller computer system.

7. The system of claim 1, wherein the deposit address is a destination address of the transaction on the blockchain.

8. The system of claim 1, wherein in response to a bitcoin withdrawal request from the buyer computer system, the trade determination system is configured to decrease a trading limit.

9. The system of claim 8, wherein the central clearing computer system is configured to generate a withdrawal journal that is stored as an immutable record in the ledger transaction database.

10. The system of claim 1, wherein in response to transferring the amount of bitcoin from the central clearing bitcoin wallet to the buyer bitcoin wallet, the central clearing computer system is configured to return a collateral for the amount of bitcoin.

11. The system of claim 1, wherein in response to obtaining data indicative of the match between the buy instruction and the sell instruction, the central clearing computer system is configured to produce a trade journal that is recorded in the ledger transaction database, wherein the trade journal includes a journal identifier, a trade time, a buyer account identifier, a seller account identifier, an instrument identifier, a trade capture report, a trade price, and trade quantity.

12. A futures trading method, comprising:
receiving, by a central clearing computer system, authentication data from a seller computer system for verification;
in response to obtaining data indicative of a match between a buy instruction associated with a buyer computer system and a sell instruction associated with the seller computer system from a trade determination system for a futures instrument represented by futures instrument data stored in a futures instrument database, wherein the futures instrument is a future based on a value of a bitcoin, performing, by the central clearing computer system, an electronic transfer of an amount of bitcoin equal to the amount of bitcoin represented by the futures instrument data, from a seller bitcoin wallet associated with the seller computer system to a central clearing bitcoin wallet using a blockchain by:
receiving a deposit address associated with the blockchain from the central clearing bitcoin wallet, wherein the deposit address is generated by retrieving a last address index from a memory and incrementing the last address index;
creating a deposit address record comprising a first field storing an identifier of a ledger account associated with the deposit address, and a second field storing the deposit address;
providing a string or a quick response (QR) code representing the deposit address to the seller computer system;
receiving a notification from the central clearing bitcoin wallet informing the amount of bitcoin recorded at the deposit address indicated in the deposit address record, in response to a transaction signed by the seller bitcoin wallet using a private wallet signing key and submitted to a blockchain network that verifies and mines the signed transaction into a block of the blockchain, wherein the notification includes the amount of bitcoin and a number of mined blocks following the transaction in the blockchain;
in response to the number of mined blocks being larger than a predefined threshold, generating a deposit journal that is saved in a ledger transaction database, wherein the deposit journal includes the amount of bitcoin and time of the transaction; and
in response to expiration of the futures instrument, controlling transfer, by the central clearing computer system, of the amount of bitcoin represented by the futures instrument data from the central clearing bitcoin wallet to a buyer bitcoin wallet associated with the buyer computer system.

13. The futures trading method of claim 12, further comprising:
automatically denying sell instructions from the seller computer system when the sell instructions exceed a seller trading limit associated with the seller computer system.

14. The futures trading method of claim 12, wherein in response to obtaining data indicative of the match between the buy instruction and the sell instruction, deducting, from a deposited bitcoin amount in the central clearing bitcoin wallet, an amount of bitcoin equal to the amount of bitcoin represented by the futures instrument data.

15. The futures trading method of claim 12, wherein the deposit address is a destination address of the transaction on the blockchain, and the deposit address is rendered into the QR code and provided to the seller computer system.

16. The futures trading method of claim 12, wherein in response to a bitcoin withdrawal request from the buyer computer system, decreasing a trading limit.

17. The futures trading method of claim 16, further comprising:
generating a withdrawal journal that is stored as an immutable record in the ledger transaction database.

18. The futures trading method of claim 12, further comprising:
in response to transferring the amount of bitcoin from the central clearing bitcoin wallet to the buyer bitcoin wallet, returning a collateral for the amount of bitcoin.

19. The futures trading method of claim 12, further comprising:
in response to obtaining data indicative of the match between the buy instruction and the sell instruction, producing a trade journal that is recorded in the ledger transaction database, wherein the trade journal includes a journal identifier, a trade time, a buyer account identifier, a seller account identifier, an instrument identifier, a trade capture report, a trade price, and trade quantity.

20. A non-transitory, computer-readable storage medium having instructions stored thereon, that when executed by a central clearing computer system included in a blockchain enabled electronic futures trading system, cause the central clearing computer system to perform operations, comprising:
receiving, by the central clearing computer system, authentication data from a seller computer system for verification;
in response to obtaining data indicative of a match between a buy instruction associated with a buyer computer system and a sell instruction associated with the seller computer system from a trade determination system for a futures instrument represented by futures instrument data stored in a futures instrument database, wherein the futures instrument is a future based on a value of a bitcoin, performing, by the central clearing computer system, an electronic transfer of an amount of bitcoin equal to the amount of bitcoin represented by the futures instrument data, from a seller bitcoin wallet associated with the seller computer system to a central clearing bitcoin wallet using a blockchain by:
receiving a deposit address associated with the blockchain from the central clearing bitcoin wallet, wherein the deposit address is generated by retrieving a last address index from a memory and incrementing the last address index;

creating a deposit address record comprising a first field storing an identifier of a ledger account associated with the deposit address, and a second field storing the deposit address;

providing a string or a quick response (QR) code representing the deposit address to the seller computer system;

receiving a notification from the central clearing bitcoin wallet informing the amount of bitcoin recorded at the deposit address indicated in the deposit address record, in response to a transaction signed by the seller bitcoin wallet using a private wallet signing key and submitted to a blockchain network that verifies and mines the signed transaction into a block of the blockchain, wherein the notification includes the amount of bitcoin and a number of mined blocks following the transaction in the blockchain;

in response to the number of mined blocks being larger than a predefined threshold, generating a deposit journal that is saved in a ledger transaction database, wherein the deposit journal includes the amount of bitcoin and time of the transaction; and in response to expiration of the futures instrument, controlling transfer, by the central clearing computer system, of the amount of bitcoin represented by the futures instrument data from the central clearing bitcoin wallet to a buyer bitcoin wallet associated with the buyer computer system.

* * * * *